United States Patent
Luther et al.

(10) Patent No.: US 9,376,971 B2
(45) Date of Patent: Jun. 28, 2016

(54) ENERGY MANAGEMENT SYSTEM AND METHOD FOR VEHICLE SYSTEMS

(71) Applicant: GENERAL ELECTRIC COMPANY, Schenectady, NY (US)

(72) Inventors: Juli-Ann Luther, Lawrence Park, PA (US); Jeffrey Twichel, Erie, PA (US); Brian Nedward Meyer, Fairview, PA (US); Joseph Daniel Wakeman, Lawrence Park, PA (US); Swapna Rameshbabu Gaikwad, Bangalore (IN); John William Brand, Melbourne, FL (US); James Brooks, Niskayuna, NY (US); David Allen Eldredge, Melbourne, FL (US); Robert James Foy, Melbourne, FL (US); Kevin Kapp, Melbourne, FL (US); Ajith Kuttannair Kumar, Erie, PA (US); William Martin, Erie, PA (US); James Andrew Napolitano, Lawrence Park, PA (US); Saravanan Thiyagarajan, Erie, PA (US); Eric Vorndran, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/696,124

(22) Filed: Apr. 24, 2015

(65) Prior Publication Data

US 2015/0232097 A1 Aug. 20, 2015

Related U.S. Application Data

(63) Continuation-in-part of application No. 14/491,339, filed on Sep. 19, 2014, now Pat. No. 9,229,448, and a continuation-in-part of application No. 12/061,486, filed on Apr. 2, 2008, now abandoned, and a (Continued)

(51) Int. Cl.
*B61L 3/00* (2006.01)
*F02D 29/02* (2006.01)
(Continued)

(52) U.S. Cl.
CPC ............. *F02D 29/02* (2013.01); *B61L 3/006* (2013.01); *B61L 3/008* (2013.01); *B61L 27/0027* (2013.01); *B61L 3/16* (2013.01)

(58) Field of Classification Search
CPC ..... B61L 27/0027; B61L 3/006; F02D 29/02; G08G 1/22
USPC ............. 701/19, 20, 23–36, 93–98, 116, 121, 701/123, 400, 411, 416, 423, 300, 302
See application file for complete search history.

(56) References Cited

U.S. PATENT DOCUMENTS 5,928,294 A * 7/1999 Zelinkovsky ........ G05D 1/0265
180/168
6,427,114 B1 * 7/2002 Olsson .................... H04L 47/10
340/934

(Continued)

*Primary Examiner* — Thomas Tarcza
*Assistant Examiner* — Tyler J Lee
(74) *Attorney, Agent, or Firm* — GE Global Patent Operation

(57) ABSTRACT

An energy management system and method for a vehicle system operate the vehicle system according to a current trip plan as the vehicle system travels along a route during a trip. The current trip plan designates operational settings of the vehicle system. The system and method also revise the current trip plan into a revised trip plan responsive to current, actual operation of the vehicle system differing from the current trip plan by at least a designated threshold amount. The revised trip plan designates operational settings of the vehicle system and includes an initial designated operational setting that matches the current, actual operation of the vehicle system.

23 Claims, 34 Drawing Sheets

Related U.S. Application Data continuation-in-part of application No. 14/457,304, filed on Aug. 12, 2014, and a continuation-in-part of application No. 13/653,440, said application No. 12/061,486 is a continuation-in-part of application No. 11/765,443, filed on Jun. 19, 2007, now abandoned, and a continuation-in-part of application No. 11/669,364, filed on Jan. 31, 2007, now Pat. No. 9,266,542, which is a continuation-in-part of application No. 11/385,354, filed on Mar. 20, 2006.

(60) Provisional application No. 60/894,039, filed on Mar. 9, 2007, provisional application No. 60/939,852, filed on May 24, 2007, provisional application No. 60/849,100, filed on Oct. 2, 2006, provisional application No. 60/850,885, filed on Oct. 10, 2006.

(51) Int. Cl.
*B61L 27/00* (2006.01)
*B61L 3/16* (2006.01)

(56) References Cited

U.S. PATENT DOCUMENTS

| | | | | |
|---|---|---|---|---|
| 7,734,387 | B1 * | 6/2010 | Young | G05D 1/0214 701/23 |
| 7,895,135 | B2 * | 2/2011 | Norris | F02D 41/1404 701/44 |
| 8,195,364 | B2 * | 6/2012 | Norris | B62D 1/28 701/19 |
| 8,498,762 | B2 * | 7/2013 | Wills | B61L 27/0027 340/928 |
| 2003/0060968 | A1 * | 3/2003 | MacPhail | G08G 1/0104 701/117 |
| 2004/0034556 | A1 * | 2/2004 | Matheson | B61L 27/0016 705/7.24 |
| 2005/0004723 | A1 * | 1/2005 | Duggan | G05D 1/0061 701/24 |
| 2006/0074544 | A1 * | 4/2006 | Morariu | B61L 27/0027 701/117 |
| 2006/0235584 | A1 * | 10/2006 | Fregene | G05D 1/104 701/23 |
| 2007/0260367 | A1 * | 11/2007 | Wills | B61L 27/0027 701/19 |

* cited by examiner

ENERGY MANAGEMENT SYSTEM AND METHOD FOR VEHICLE SYSTEMS

CROSS-REFERENCE TO RELATED APPLICATIONS

This application claims priority to and is a continuation-in-part of U.S. patent application Ser. No. 14/491,339, which was filed on 19 Sep. 2014, and is titled "Energy Management System And Method For Vehicle Systems" (the "'339 application"). This application also claims priority to and is a continuation-in-part of U.S. patent application Ser. No. 12/061,486, which was filed on 2 Apr. 2008, and is titled "Method And Computer Software Code For Implementing A Revised Mission Plan For A Powered System" (the "'486 application"). This application also claims priority to and is a continuation-in-part of U.S. patent application Ser. No. 14/457,304, which was filed on 12 Aug. 2014, and is titled "System And Method For Vehicle Operation" (the "'304 application"). This application also claims priority to and is a continuation-in-part of U.S. patent application Ser. No. 13/653,440, which was filed on 17 Oct. 2012, and is titled "Systems And Methods For Operating A Vehicle System In Response To A Plan Deviation" (the "'440 application").

The '486 application claims priority to and is a continuation-in-part of U.S. patent application Ser. No. 11/765,443, which was filed on 19 Jun. 2007, and is titled "System And Method For Optimized Fuel Efficiency And Emission Output Of A Diesel Powered System" (the "'443 application"), and is now abandoned. The '443 application claims priority to U.S. Provisional Application No. 60/894,039, which was filed on 9 Mar. 2007 (the "'039 application"), and to U.S. Provisional Application No. 60/939,852, which was filed on 24 May 2007 (the "'852 application").

The '443 claims priority to and is a continuation-in-part of U.S. patent application Ser. No. 11/669,364, which was filed on 31 Jan. 2007, and is titled "System And Method For Optimized Fuel Efficiency And Emission Output Of A Diesel Powered System" (the "'364 application"). The '364 application claims priority to and is a continuation-in-part of U.S. patent application Ser. No. 11/385,354, which was filed on 20 Mar. 2006, and is titled "Trip Optimization System And Method For A Train" (the "'354 application"). The '364 application also claims priority to U.S. Provisional Application No. 60/849,100, which was filed on 2 Oct. 2006 (the "'100 application"), and to U.S. Provisional Application No. 60/850,885, which was filed on 10 Oct. 2006 (the "'885 application").

The entire disclosures of the foregoing applications (e.g., the '339 application, the '486 application, the '304 application, the '440 application, the '443 application, the '039 application, the '852 application, the '364 application, the '354 application, the '100 application, and the '885 application) are incorporated herein by reference.

FIELD

Embodiments of the subject matter disclosed herein relate to determining operational settings of vehicle systems for travel along one or more routes.

BACKGROUND

Some powered systems such as, but not limited to, off-highway vehicles, marine diesel powered propulsion plants, stationary powered system, transport vehicles such as transport buses, agricultural vehicles, and rail vehicle systems or trains, are typically powered by one or more power units, or power generating units. With respect to rail vehicle systems, a power unit is usually a part of at least one locomotive powered by at least one internal combustion engine and the train further includes a plurality of rail cars, such as freight cars. Usually more than one locomotive is provided wherein the locomotives are considered a locomotive consist. Locomotives are complex systems with numerous subsystems, with each subsystem being interdependent on other subsystems.

An operator is usually aboard a locomotive to insure the proper operation of the locomotive, and when there is a locomotive consist, the operator is usually aboard a lead locomotive. A locomotive consist is a group of locomotives that operate together in operating a train. In addition to ensuring proper operations of the locomotive, or locomotive consist, the operator also is responsible for determining operating speeds of the train and forces within the train that the locomotives are part of To perform this function, the operator generally must have extensive experience with operating the locomotive and various trains over the specified terrain. This knowledge is needed to comply with prescribeable operating parameters, such as speeds, emissions and the like that may vary with the train location along the track. Moreover, the operator is also responsible for assuring in-train forces remain within acceptable limits.

In marine applications, an operator is usually aboard a marine vehicle to insure the proper operation of the vessel, and when there is a vessel consist, the lead operator is usually aboard a lead vessel. As with the locomotive example cited above, a vessel consist is a group of vessels that operate together in operating a combined mission. In addition to ensuring proper operations of the vessel, or vessel consist, the lead operator also is responsible for determining operating speeds of the consist and forces within the consist that the vessels are part of. To perform this function, the operator generally must have extensive experience with operating the vessel and various consists over the specified waterway or mission. This knowledge is needed to comply with prescribeable operating speeds and other mission parameters that may vary with the vessel location along the mission. Moreover, the operator is also responsible for assuring mission forces and location remain within acceptable limits.

In the case of multiple power powered systems, which by way of example and limitation, may reside on a single vessel, power plant or vehicle or power plant sets, an operator is usually in command of the overall system to insure the proper operation of the system, and when there is a system consist, the operator is usually aboard a lead system. Defined generally, a system consist is a group of powered systems that operate together in meeting a mission. In addition to ensuring proper operations of the single system, or system consist, the operator also is responsible for determining operating parameters of the system set and forces within the set that the system are part of. To perform this function, the operator generally must have extensive experience with operating the system and various sets over the specified space and mission. This knowledge is needed to comply with prescribeable operating parameters and speeds that may vary with the system set location along the route. Moreover, the operator is also responsible for assuring in-set forces remain within acceptable limits.

Based on a particular train mission, when building a train, it is common practice to provide a range of locomotives in the train make-up to power the train, based in part on available locomotives with varied power and run trip mission history. This typically leads to a large variation of locomotive power available for an individual train. Additionally, for critical trains, such as Z-trains, backup power, typically backup locomotives, is typically provided to cover an event of equipment failure, and to ensure the train reaches its destination on time.

Furthermore, when building a train, locomotive emission outputs are usually determined by establishing a weighted average for total emission output based on the locomotives in the train while the train is in idle. These averages are expected to be below a certain emission output when the train is in idle. Typically, however, there is no further determination made regarding the actual emission output while the train is in idle. Thus, though established calculation methods may suggest that the emission output is acceptable, in actuality the locomotive may be emitting more emissions than calculated.

When operating a train, train operators typically call for the same notch settings when operating the train, which in turn may lead to a large variation in fuel consumption and/or emission output, such as, but not limited to, $No_x$, $CO_2$, etc., depending on a number of locomotives powering the train. Thus, the operator usually cannot operate the locomotives so that the fuel consumption is minimized and emission output is minimized for each trip since the size and loading of trains vary, and locomotives and their power availability may vary by model type.

With respect to a locomotive, however, even with knowledge to assure safe operation, the operator cannot usually operate the locomotive so that the fuel consumption and emissions is minimized for each trip. For example, other factors that must be considered may include emission output, operator's environmental conditions like noise/vibration, a weighted combination of fuel consumption and emissions output, etc. This is difficult to do since, as an example, the size and loading of trains vary, locomotives and their fuel/emissions characteristics are different, and weather and traffic conditions vary.

A train owner usually owns a plurality of trains wherein the trains operate over a network of railroad tracks. Because of the integration of multiple trains running concurrently within the network of railroad tracks, wherein scheduling issues must also be considered with respect to train operations, train owners would benefit from a way to improve fuel efficiency and/or emission output so as to save on overall fuel consumption, while reducing emission output of multiple trains while meeting mission trip time constraints.

When planning a mission that may be performed autonomously, which includes little to no input from the operator, planning the mission may be difficult if the planning is not robust enough to accept various user inputs. In standard optimization theory, constraints are used to restrict the system to behave in a given way. However, this can lead to situations where a physically reasonable problem is rendered unsolvable because it is not strictly feasible given the mathematical constraints specified on the optimization problem. This can cause the whole optimization to fail. For example, with respect to a rail vehicle, to constrain the rail vehicle notch to behave smoothly, a rate limit may be imposed on the notch. However in exceptional cases, such as but not limited to abrupt grade variations, it may be impossible to satisfy this constraint while avoiding over speeding and/or stalling. In another example if a certain speed is imposed but the rail vehicle does not have sufficient power to reach the specified speed, the optimization may fail.

Another concern with planning the mission occurs when re-plan missions are identified to replace a currently used mission plan. A mission planner typically uses algorithms, and/or computer-readable instructions executable by a processor that are computationally complex and require a high percentage of computer processing utilization. Therefore processing time is a concern, especially when multiple re-plans are identified. When re-plans are identified they are usually cued to be implemented in the order they are prepared. Doing so may result in more urgent re-plans not occurring in a timely fashion. Furthermore, there may be times during a mission when implementing a re-plan mission is not preferred.

Owners and/or operators of rail vehicles, off-highway vehicles, marine powered propulsion plants, transportation vehicles, agricultural vehicles, and/or stationary powered systems would appreciate the financial and operational benefits realized when these powered system produce optimized fuel efficiency, emission output, fleet efficiency, and mission parameter performance so as to save on overall fuel consumption while reducing emission output and meeting operating constraints, such as but not limited to mission time constraints, where re-planning of a mission plan is accomplished to reduce processor utilization and to insure higher priority re-plans are implemented first.

Some existing energy management systems can be used to control operations of vehicle systems during a trip to "optimize" performance of the vehicle systems. For example, Trip Optimizer™ provided by General Electric Company can be used to automatically control or direct an operator to control throttles of locomotives in a rail vehicle system to assist in keeping the rail vehicle systems on schedule while reducing fuel consumption and/or emission generation (relative to operating the locomotives without using Trip Optimizer™) These types of energy management systems can take into account factors such as length of the rail vehicle system, weight of the rail vehicle system, grade of the route being traveled upon, conditions of the route, weather conditions, and performance characteristics of the vehicles. The energy management systems create trip profiles or trip plans that reduce braking and can reduce the fuel consumed and/or emissions generated.

During travel according to a trip plan, various factors may cause the vehicle system to be unable to continue traveling according to the trip plan. For example, deteriorating health of a propulsion-generating vehicle in the vehicle system, damage to the vehicle system, damage to a route being traveled upon, adverse weather conditions, operator action (e.g., manual control) of the vehicle system, or the like, can cause the vehicle system to fall behind or otherwise be unable to follow the trip plan.

Some known systems and methods can "re-plan" the trip plan by revising the trip plan to account for the vehicle system falling behind the prior trip plan. But, these re-plans may generate a transitional plan that causes operations of the vehicle system to rapidly increase to return to operating according to the prior trip plan. Or, these re-plans can create new trip plans that begin with operational settings that are significantly different from the prior trip plan. As a result, the vehicle system may need to rapidly increase output in order to attempt to travel according to the revised trip plan. Either of these scenarios can cause the vehicle systems to significantly increase the amount of fuel consumed and/or emissions generated, in contradiction to the goals sought to be achieved by the trip plans.

A vehicle system may include one or more powered vehicles that may be mechanically linked (directly or indirectly) to non-powered vehicles. The powered and non-powered vehicles of the vehicle system may travel as a group along a designated route. In cases where the vehicle system includes multiple powered vehicles, the vehicle system may coordinate operations of the powered vehicles to move the vehicle system. For example, a rail vehicle system may include a powered unit consist that has one or more powered units mechanically coupled to one or more non-powered rail cars. Vehicles in a consist may include a lead powered unit and one or more remote powered units and/or trail powered units. (Remote powered units are those that are spaced apart from the lead powered unit by one or more non-powered vehicles. Trail powered units are those that are in the same powered unit consist as the lead powered unit, and thereby not spaced apart from the lead powered unit by one or more non-powered rail vehicles, but that are subordinate to control by the lead powered unit.) The lead vehicle may control operation of one or more remote vehicles.

Various control actions for all or a portion of a mission or trip may be planned in advance. The control actions may be planned in advance using expected values of parameters, for example values expected based on train makeup and/or locomotive type. However, factors beyond the control and/or knowledge of a planner may result in characteristics of the vehicle system, such as mass, horsepower, or braking capability, among others, being different than the expected values. The difference between the expected and actual values may cause a calculated plan to be inaccurate and/or inefficient due to being calculated using incorrect values. Such inaccuracy may cause customer dissatisfaction and potential losses in fuel savings.

A transportation network for powered vehicles includes interconnected routes on which powered vehicles travel between locations. The routes connect to one another at intersections, which may also be referred to junctions, interchanges, crossovers, or turnouts. Powered vehicles can be capable of changing routes at such intersections. By way of one example, a transportation network may be formed from interconnected railroad tracks that are configured to have rail vehicle systems traveling along the tracks. At some intersections, a rail vehicle system (e.g., one or more locomotives optionally coupled with one or more rail cars) may be guided by a turnout switch to change from one route to another route.

Some powered vehicle systems may operate according to a trip or mission plan (also referred to as operating plan) while traveling along a route. The trip plan may be used, for example, to control operation of the vehicle system so that the vehicle system achieves or operates within certain parameters during the trip. These parameters can include fuel usage, which can be a significant expense in operating a vehicle system, and regulations that limit operation of the vehicle system in some manner. For example, regulations may require that the vehicle system does not exceed speed limits for certain segments of a route, exceed noise for certain areas or regions, or exceed national or regional fuel emission standards. Accordingly, the trip plan may be configured to operate the vehicle system in a manner that optimizes one or more parameters (e.g., fuel consumption) while also satisfying other conditions (e.g., speed limits, emissions, arrival time). With respect to a rail vehicle system, the trip plan may be used to automatically control tractive effort and/or braking of the rail vehicle system to arrive at a destination within a designated time while also minimizing the fuel consumption and/or emissions of the trip.

During operation of a vehicle system, however, the vehicle system may receive instructions or be commanded by an operator to deviate from the current trip plan. For instance, when approaching an intersection between two or more tracks, the operator (e.g., engineer) of a rail vehicle system may be notified by a divergence signal that the rail vehicle system should or will change to another track at a turnout switch. But the alternative track may not be part of the original route that was used to determine the trip plan. Presently, the operator may remove the rail vehicle system from automatic control and manually control the vehicle system as rail vehicle system transitions from one track to the next. Some time after the vehicle system changes to a different track, a new trip plan may be generated, which may take a significant period of time to generate. During this manual operation and delay for trip plan generation, however, the vehicle system may lose fuel saving opportunities and/or time in which the vehicle system could have been automatically controlled. Additionally, this manual operation and delay for trip plan generation can interfere with the schedules of other vehicle systems traveling on the same routes. For example, the trip plans for several vehicle systems traveling within and/or through the same transportation network during the same or overlapping time periods may be based on each other so as to avoid collision or other interferences between two or more moving vehicle systems. If one of the vehicle systems deviates from the trip plan of the vehicle system and is delayed during generation of a new or revised trip plan, then the trip plans of other vehicle systems may be interfered with by the vehicle system that deviates from the trip plan.

BRIEF DESCRIPTION

One or more embodiments of the inventive subject matter described herein include a method and computer software code for determining when to request a revised mission plan from a computer-readable instruction that when executed by the processor cause the processor to generate a mission plan for a powered system. The method discloses identifying whether at least one revised mission plan request a mandatory mission plan request, an optional mission plan request, and/or a confirmation required mission plan request which may replace a current mission plan.

The computer software code discloses a computer software module for identifying whether at least one revised mission plan request a mandatory mission plan request, an optional mission plan request, and/or a confirmation required mission plan request which may replace a current mission plan.

In one embodiment, a method (e.g., for revising a trip plan of a vehicle system) includes operating a vehicle system according to a current trip plan as the vehicle system travels along a route during a trip. The current trip plan designates operational settings of the vehicle system. During movement of the vehicle system along the route, a current, actual operation of the vehicle system differs from the current trip plan by at least a designated threshold amount. The method also can include revising the current trip plan into a revised trip plan responsive to the current, actual operation of the vehicle system differing from the current trip plan by at least the designated threshold amount. The revised trip plan designates operational settings of the vehicle system and includes an initial designated operational setting that matches the current, actual operation of the vehicle system.

In another embodiment, a system (e.g., an energy management system) includes or more processors configured to at least one of direct an operator to control or autonomously control a vehicle system according to a current trip plan as the vehicle system travels along a route during a trip. As used herein, the terms "system," "unit," and "module" may include circuitry, including a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit or system may include a hard-wired device that performs operations based on hard-wired logic of the device. The modules, units, or systems shown in the attached figures may represent the hardware that operates based on software or hardwired instructions, the software that directs hardware to perform the operations, or a combination thereof.

The current trip plan designates operational settings of the vehicle system. During movement of the vehicle system along the route, a current, actual operation of the vehicle system differs from the current trip plan by at least a designated threshold amount. The one or more processors also are configured to revise the current trip plan into a revised trip plan responsive to the current, actual operation of the vehicle system differing from the current trip plan by at least the designated threshold amount. The revised trip plan designates operational settings of the vehicle system that include an initial designated operational setting that matches the current, actual operation of the vehicle system.

In another embodiment, a method (e.g., for revising a trip plan) includes operating a vehicle system according to a first trip plan that designates operational settings of the vehicle system as a function of one or more of time or distance along a route, determining an actual operational setting of the vehicle system, and, based at least in part on the actual operating setting, changing the operational settings designated by the first trip plan into revised operational settings of a revised trip plan. The revised trip plan includes a first operational setting of the revised operational settings that matches a current operational setting of the vehicle system during a time period that the revised trip plan is implemented in place of the first trip plan. The method also can include operating the vehicle system according to the operational settings designated by the revised trip plan.

In one embodiment, a system includes an energy management processing unit. The energy management processing unit is configured to be disposed onboard a vehicle system, and includes a trip planning module, a plurality of estimator modules, and an arbiter module. The trip planning module is configured to plan a trip profile specifying power settings for performing a mission based on trip data including a plurality of parameters having expected values. The estimator modules are configured to estimate an experienced value of at least one parameter of the plurality of parameters used by the trip planning module to plan the trip profile; to determine a difference between the experienced value of the at least one parameter and the expected value of the at least one parameter; and to generate an estimation re-plan request of the trip profile when the difference exceeds a threshold. The arbiter module is configured to receive at least one estimation re-plan request from the plurality of estimator modules; to determine whether a re-plan is to be performed pursuant to the at least one estimation re-plan request based on at least one of a state of the vehicle system or an additional estimation re-plan request; and to provide an arbitrated re-plan request to the trip planning module for re-planning the trip profile when the determination is made that the re-plan is to be performed.

In another embodiment, a method is provided. The method includes obtaining, with one or more processors, an estimation re-plan request, the estimation re-plan request based on a difference between an expected value and an experienced value of a parameter used to generate a trip profile for a vehicle. The method also includes determining, with the one or more processors, whether a re-plan is to be performed pursuant to the estimation re-plan request based on at least one of a state of the vehicle or additional estimation re-plan requests. Further, the method includes generating an arbitrated re-plan request for re-planning the trip profile when it is determined to perform a re-plan.

In another embodiment, a tangible and non-transitory computer readable medium is provided that includes one or more computer software modules configured to direct one or more processors to obtain an estimation re-plan request, the estimation re-plan request based on a difference between an expected value and an experienced value of a parameter used to generate a trip profile for a vehicle. The one or more computer software modules are also configured to direct the one or more processors to determine whether a re-plan is to be performed pursuant to the estimation re-plan request based on at least one of a state of the vehicle or additional estimation re-plan requests. The one or more computer software modules configured to direct one or more processors to generate an arbitrated re-plan request for re-planning the trip profile when it is determined to perform a re-plan.

In one embodiment, a system is provided that includes a vehicle control module that is configured to control a vehicle system during a trip according to an operating plan. The operating plan designates one or more first tractive operations or braking operations to be implemented by the vehicle system along a route of the trip. The system also includes a planning module that is configured to generate a transition plan in response to a deviation of the vehicle system from the operating plan. The transition plan designates one or more second tractive operations or braking operations to be implemented by the vehicle system to achieve a designated operating parameter prior to an approaching location along the route. The vehicle control module is configured to control operation of the vehicle system according to the transition plan as the vehicle system travels toward the approaching location from a location where the vehicle system deviates from the operating plan. The planning module is configured to generate a prospective plan in response to the deviation. The prospective plan designates one or more third tractive operations or braking operations to be implemented by the vehicle system when the vehicle system at least one of moves past the approaching location or completes the transition plan. With respect to the tractive operations and braking operations of the plans, the terms first, second, and third are merely labels to distinguish the operations of one plan from operations of another plan, and are not meant to indicate a particular order or that the operations of a given plan are necessarily the same.

In one embodiment, a method is provided that includes controlling a vehicle system according to an operating plan. The operating plan designates one or more first tractive operations or braking operations to be implemented by the vehicle system along a route of a trip. The method also includes generating a transition plan in response to a deviation of the vehicle system from the operating plan. The transition plan designates one or more second tractive operations or braking operations to be implemented by the vehicle system to achieve a designated operating parameter prior to an approaching location along the route. The method also includes generating a prospective plan in response to the deviation from the operating plan. The prospective plan designates one or more third tractive operations or braking operations to be implemented by the vehicle system when the vehicle system at least one of moves past the approaching location or completes the transition plan.

In one embodiment, a tangible and non-transitory computer readable medium that includes one or more software modules is provided. The computer readable medium is configured to direct a processor to control a vehicle system according to an operating plan. The operating plan designates one or more first tractive operations or braking operations to be implemented by the vehicle system along a route of a trip. The computer readable medium is configured to direct the processor to generate a transition plan in response to a deviation of the vehicle system from the operating plan. The transition plan designates one or more second tractive operations or braking operations to be implemented by the vehicle system to achieve a designated operating parameter prior to an approaching location along the route. The computer readable medium is also configured to direct the processor to generate a prospective plan in response to the deviation from the operating plan. The prospective plan designates one or more third tractive operations or braking operations to be implemented by the vehicle system when the vehicle system at least one of moves past the approaching location or completes the transition plan.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
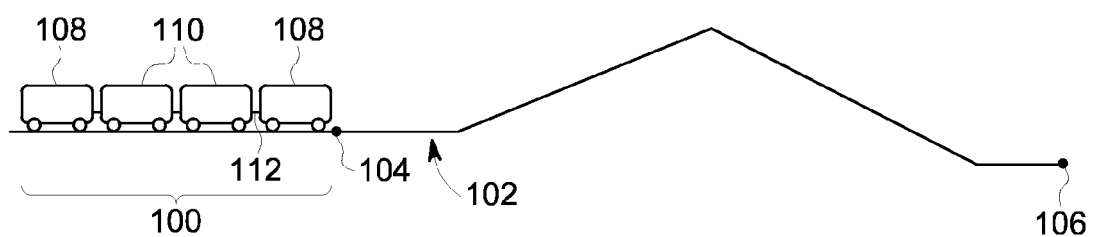
FIG. 1 schematically illustrates a trip of a vehicle system along a route according to one embodiment.

One or more embodiments of the systems and methods described herein provide trip plans for vehicle systems to travel along one or more routes during a trip. The trip plans designate operational settings of the vehicle systems during travel along the routes. These trip plans can designate speeds, accelerations, power outputs, brake settings, throttle positions, or the like, of the vehicle systems as a function of time and/or distance along the routes. In one aspect, the trip plans can designate the operational settings so that travel of a vehicle system according to the trip plan causes the vehicle system to consume less fuel and/or generate fewer emissions than the vehicle system traveling along the same route with different operational settings.

During travel according to the trip plan, the vehicle system may be unable to exactly follow the operational settings designated by the trip plan. For example, damage to a propulsion-generating vehicle of the vehicle system, damage to the route, adverse weather conditions, other vehicle systems impeding travel of the vehicle system, among other factors, can cause the vehicle system to not travel using the same operational settings of the trip plan. In response to the actual travel of the vehicle system deviating from the trip plan (e.g., such as where a difference between actual operating conditions of the vehicle system and the designated operational settings of the trip plan exceeds a designated, non-zero threshold), the trip plan may be revised by changing the operational settings designated by the trip plan for at least a portion of a remainder of the trip of the vehicle system. For example, the actual operating conditions can include the actual speeds, actual accelerations, actual throttle positions, actual brake settings or pressures, or the like, of the vehicle system. These conditions may be the same or within a designated threshold range of the operational settings designated by the trip plan when the vehicle system is able to follow the trip plan. But, the actual operating conditions may differ from the operational settings designated by the trip plan by more than the designated threshold range when the vehicle system is not able to follow the trip plan.

The revised trip plan may have designated operational settings that begin with a current, actual operational condition of the vehicle system. For example, the trip plan can be revised so that the operational setting that is designated by the trip plan to be implemented first by the vehicle system is the same as a current operational condition of the vehicle system. The revised trip plan may then be followed by the vehicle system, starting with the current operational condition of the vehicle system. As one example, if the trip plan designates a speed of ninety kilometers per hour for the vehicle system to travel at a particular location, but the vehicle system is only able to travel at seventy kilometers per hour at that location, then the trip plan can be revised with the revised trip plan beginning with a designated speed of seventy kilometers per hour.

Using the current operational condition of the vehicle setting as a starting operational setting for the revised trip plan instead of another operational setting can reduce fuel consumption and/or emission generation relative to revising the trip plan according to other known manners of revising trip plans. For example, some known systems and methods revise the trip plan in such a way as to return the vehicle system back to operating on the previously used trip plan. These systems and methods may generate a transitional plan that gets the operations of the vehicle system from a current state back to the trip plan or may generate a revised trip plan that does not start with the current operational conditions of the vehicle system. But, these transitional plans and revised trip plans may be mechanically impossible or improbable for the vehicle system, and/or may actually cause the vehicle system to rapidly increase operations to get back to the trip plan, and thereby consume more fuel and/or generate increased emissions relative to not following the trip plan.

FIG. 1 schematically illustrates a trip of a vehicle system 100 along a route 102 according to one embodiment. The vehicle system 100 can travel from a first location 104 to a different, second location 106 along the route 102 according to a trip plan. The vehicle system 100 can include one or more propulsion-generating vehicles 108 and optionally may include one or more non-propulsion-generating vehicles 110. The vehicles 108, 110 may be mechanically coupled with each other, such as by couplers 112, such that the vehicles 108, 110 travel together. Optionally, the vehicle system 100 may include propulsion-generating vehicles 108 that are logically connected to each other without being mechanically coupled with each other. For example, the propulsion-generating vehicles 108 may communicate with each other to coordinate the movements of the vehicles 108 with each other such that the vehicles 108 travel together in a platoon.

The propulsion-generating vehicles 108 can represent one or more different vehicles that generate tractive effort or power to move the vehicle system 100 along the route 102. For example, the vehicles 108 can represent automobiles, locomotives, other off-highway vehicles (e.g., vehicles that are not designed and/or not permitted to travel on public roadways), marine vessels, aircraft, or the like. The non-propulsion-generating vehicles 110 can represent vehicles that do not generate tractive effort or power. For example, the vehicles 110 can represent railcars, trailers, barges, or the like.

The vehicle system 100 travels along the route 102 according to a trip plan. The trip plan can designate operational settings of the vehicle system 100 as a function of time and/or distance along the route 102. These operational settings can include speeds, accelerations, throttle positions, brake settings (e.g., brake pressures), or the like. Traveling according to the trip plan can cause the vehicle system 100 to reduce the amount of fuel consumed and/or emissions generated by the vehicle system 100 relative to the vehicle system 100 traveling according to other, different operational settings.

Figure 2:
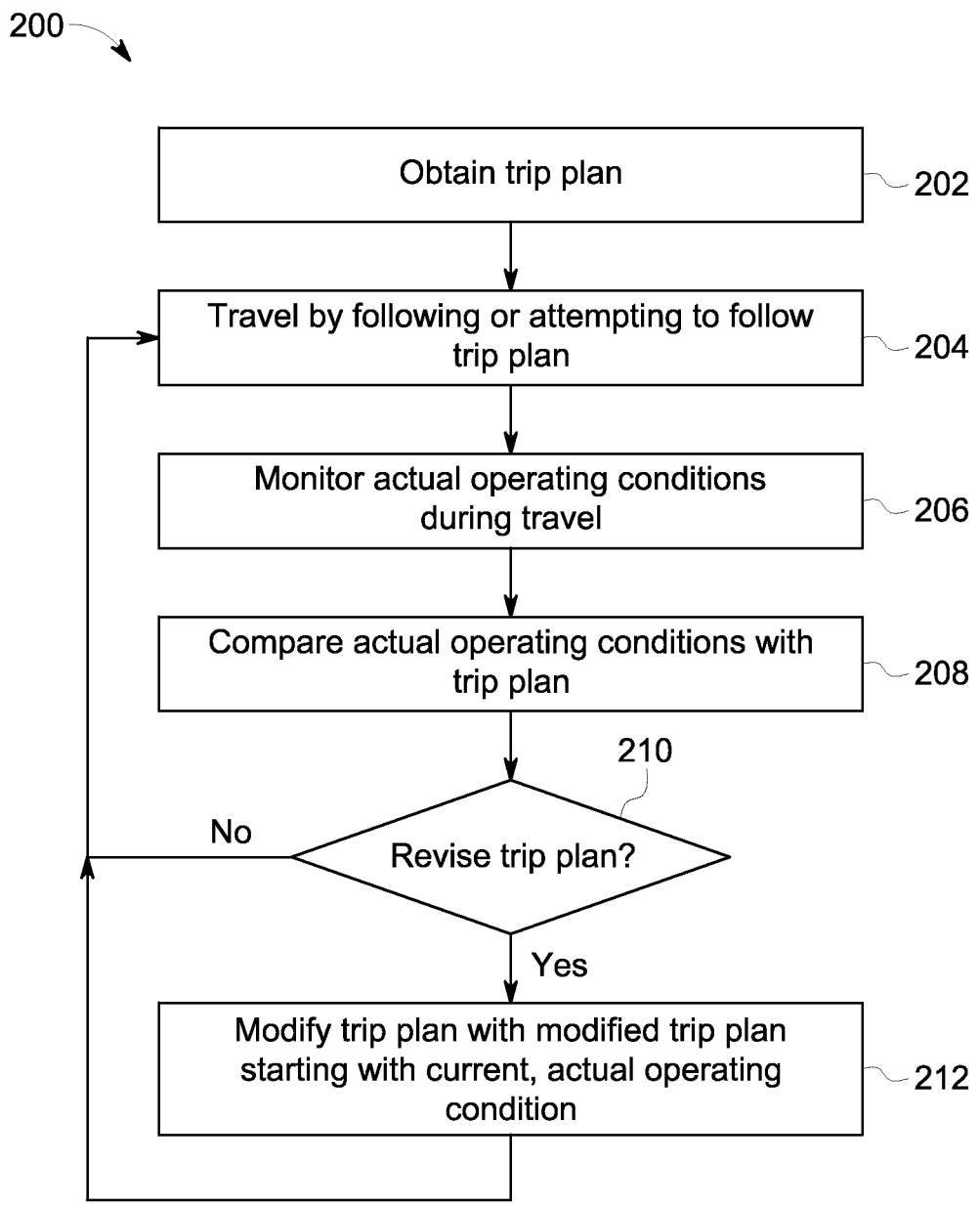
FIG. 2 illustrates a flowchart of a method for revising a trip plan of a vehicle system according to one embodiment.

FIG. 2 illustrates a flowchart of a method 200 for revising a trip plan of a vehicle system according to one embodiment. The method 200 may be practiced by an energy management system and/or controller disposed onboard the vehicle system 100 (shown in FIG. 1) and/or disposed off-board the vehicle system 100. At 202, a trip plan is obtained. The trip plan can be received from an off-board location, such as a dispatch facility, another vehicle system, an off-board operator control unit (e.g., a handheld remote control), or the like. Optionally, the trip plan may be created and/or obtained onboard the vehicle system 100. The trip plan may be created by an energy management system or obtained from a computer readable memory (e.g., a hard drive, flash drive, or the like) that stores previously created trip plans.

At 204, the vehicle system 100 travels along the route 102 (shown in FIG. 1) according to the trip plan. The vehicle system 100 may attempt to change the actual operational settings used by the vehicle system 100 to control movement of the vehicle system 100 so that actual operating conditions of the vehicle system 100 match the designated operational settings of the trip plan. For example, an operator of the vehicle system 100 may be informed of the operational settings designated by the trip plan as the vehicle system 100 travels along the route 102. The operator may then attempt to manually change the operational settings of the vehicle system 100 so that the actual operating conditions (e.g., the actual speed, actual acceleration, actual brake settings or pressures, etc.) of the vehicle system 100 follow the designated operational settings of the trip plan. Optionally, the vehicle system 100 may autonomously control the actual operating conditions of the vehicle system 100 according to the trip plan.

At 206, actual operating conditions of the vehicle system 100 are monitored as the vehicle system 100 travels along the route 102. For example, the speed at which the vehicle system 100 is actually moving may be measured by tachometers, global positioning system (GPS) circuitry, cellular communication circuitry, or the like, and/or may be determined based on data obtained from roadside transponders, rotation speeds of wheels, airspeed, or the like. As another example, the actual accelerations, actual power outputs, actual throttle positions, actual brake settings or pressures, or other conditions may be measured or determined during travel of the vehicle system 100.

At 208, the actual operating conditions of the vehicle system 100 are compared with the operational settings designated by the trip plan. The actual operating conditions can be compared with the designated operational settings to determine if differences exist. If the differences are sufficiently large, then the trip plan may need to be revised.

Figure 3:
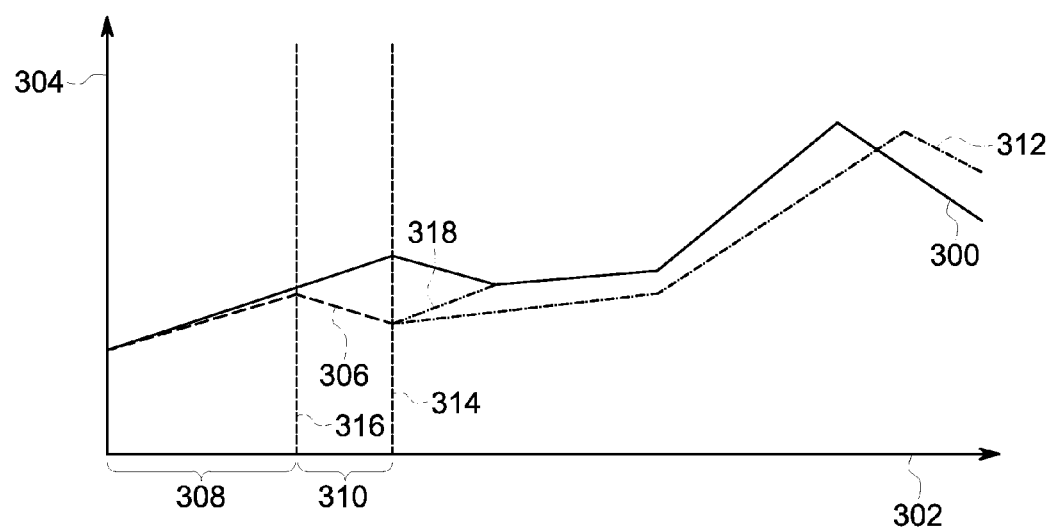
FIG. 3 illustrates operational settings designated by a trip plan for the vehicle system shown in FIG. 1 according to one example.

With continued reference to the method 200 shown in FIG. 2, FIG. 3 illustrates operational settings 300 designated by a trip plan for the vehicle system 100 (shown in FIG. 1) according to one example. The designated operational settings 300 are shown alongside a horizontal axis 302 representative of time elapsed during the trip and/or distance along the route 102 (shown in FIG. 1) during the trip. The designated operational settings 300 also are shown alongside a vertical axis 304 representative of different operational settings.

Actual operating conditions 306 of the vehicle system 100 also are shown in FIG. 3. The designated operational settings 300 and the actual operating conditions 306 may represent similar operations of the vehicle system 100. For example, the designated operational settings 300 can represent designated speeds of a trip plan while the actual operating conditions 306 represent actual speeds of the vehicle system 100. As another example, the designated operational settings 300 can represent designated accelerations of a trip plan while the actual operating conditions 306 represent actual accelerations of the vehicle system 100. As another example, the designated operational settings 300 can represent designated throttle positions, brake settings, or the like, of a trip plan while the actual operating conditions 306 represent corresponding actual throttle positions, brake settings, or the like, of the vehicle system 100.

During a first time period or distance range 308 of the trip plan, the actual operating conditions 306 of the vehicle system 100 are the same as or approximately the same as the designated operational settings 300 of the trip plan. For example, the actual operating conditions 306 may be within a designated threshold range (e.g., 1%, 5%, 10%, or another value) of the designated operational settings 300 of the trip plan. Subsequent to the first time period or distance range 308, the actual operating conditions 306 begin to deviate from the designated operational settings 300 of the trip plan by increasing amounts during a second time period or distance range 310.

The actual operational conditions 306 may be compared to the designated operational settings 300 in order to identify differences there between. For example, during the time period or distance range 308, these differences may be relatively small. During the subsequent time period or distance range 310, however, the differences increase and may become relatively large.

Returning to the description of the method 200 shown in FIG. 2, at 210, a determination is made as to whether to revise the trip plan. If the differences between the actual operating conditions 306 of the vehicle system 100 and the designated operational settings 300 of the trip plan become sufficiently large, then these differences may indicate that the vehicle system 100 is unable to follow the trip plan and/or that the trip plan needs to be revised to account for the differences.

If the differences between the actual operating conditions 306 and the designated operational settings 300 are relatively small (e.g., no larger than a designated, non-zero threshold amount or range), then flow of the method 200 may return to 204. For example, the vehicle system 100 may continue traveling along the route 102 according to the trip plan while monitoring the actual operating conditions 306 of the vehicle system 100.

On the other hand, if the differences between the actual operating conditions 306 and the designated operational settings 300 are relatively large (e.g., at least as large as the designated, non-zero threshold amount or range), then flow of the method 200 may proceed to 212.

At 212, the trip plan is modified. The trip plan may be modified by changing the designated operational settings of the trip plan and/or by creating a new trip plan for at least a portion or all of a remainder of the trip of the vehicle system 100.

Designated operational settings 312 of a revised trip plan also are shown in FIG. 3. The designated operational settings 312 (also referred to as revised designated operational settings 312) differ from the operational settings 300 previously designated by the trip plan. As shown in FIG. 3, the revised designated operational settings 312 may differ from the designated operational settings 300 of the previous trip plan throughout all or at least a portion of the remainder of the trip plan. Alternatively, the revised designated operational settings 312 eventually may match up to the designated operational settings 300 of the previous trip plan at a later time.

In one embodiment, the revised trip plan begins with designated operational settings 312 that are the same as the actual operating conditions 306 of the vehicle system 100. The revised trip plan may be implemented at an implementation time or an implementation location 314 during the trip. The first or initial operational setting that is designated by the revised trip plan at or soon after the implementation time or location 314 may match the operational condition 306 of the vehicle system 100 at or just prior to the implementation time or location 314. For example, the revised trip plan may begin with a designated operational setting 312 at the implementation time or location 314 that is the same as the actual operating condition 306 of the vehicle system 100.

The designated operational setting 312 that begins the revised trip plan may be the same as or match the actual operating condition 306 of the vehicle system 100 when the designated operational setting 312 is equivalent to the actual operating condition 306 of the vehicle system 100 or within a designated range of the actual operating condition 306 (e.g., 0.1%, 1%, 5%, 10%, or another value). Because the actual operating conditions 306 of the vehicle system 100 may be changing with respect to time or distance traveled during the trip as the trip plan is being revised, one or more actual operating conditions 306 may be selected as the initial designated operational setting 312. For example, in one embodiment, the actual operating condition 306 at the implementation time or location 314 may be used as the initial designated operational setting 312 of the revised trip plan. Alternatively, the initial designated operational setting 312 of the revised trip plan may be selected from several prior actual operating conditions 306. Due to computer processing requirements for generating the revised trip plan, the actual operating condition 306 of the vehicle system 100 at the implementation time or location 314 may not be able to instantaneously become the first designated operational setting 312 of the revised trip plan.

Instead, one or more of the actual operating conditions 306 of the vehicle system 100 prior to the implementation time or location 314 may be used as the first designated operational setting 312 of the revised trip plan. For example, the actual operating condition 306 that exists or is determined when the revised trip plan is created may be used as the first designated operational setting 312 of the revised trip plan. As another example, an average, median, moving average, or the like, of the actual operating conditions 306 prior to the implementation time or location 314 may be used as the first designated operational setting 312 of the revised trip plan. One or more of the actual operating conditions 306 occurring between a deviation time or location 316 where the actual operating conditions 306 began differing from the designated operational settings 300 of the previous trip plan by more than the designated threshold or range and the implementation time or location 314 may be used as the initial designated operational setting 312 of the revised trip plan.

Revising trip plans using some known systems or methods can involve generating transitional designated operational settings 318 that act as a bridge between the actual operating conditions 306 and the operational settings 300 designated by the previous trip plan. These transitional operational settings 318 cause the vehicle system 100 to return to the operational settings 300 designated by the previous trip plan. In contrast, the operational settings 312 of the revised trip plan may not match or be equivalent to the previous trip plan such that the previous trip plan and the revised trip plan differ for all or at least a portion of the remainder of the trip. The transitional operational settings 318 may return the vehicle system 100 to operating according to the previous trip plan, but implementing these operational settings 318 can cause the vehicle system 100 to consume more fuel and/or generate more emissions than if the vehicle system 100 were to travel according to the operational settings 312 of the revised trip plan. For example, the vehicle system 100 may consume less fuel and/or generate fewer emissions traveling according to the operational settings 300 of the initial trip plan than by traveling according to the operational settings 312 of the revised trip plan. But, traveling according to the operational settings 312 of the revised trip plan can result in the vehicle system 100 consuming less fuel and/or generating fewer emissions than traveling according to the transitional operational settings 318 and the operational settings 300 of the initial trip plan following the transitional operational settings 318.

Flow of the method 200 shown in FIG. 2 may return to 204 from 212. For example, the vehicle system 100 may continue to travel along the route 102 according to the operational settings 312 of the revised trip plan. The method 200 may continue in a loop-wise manner to repeatedly determine whether to modify a trip plan or revised trip plan, revise the trip plan, and continue traveling until the vehicle system 100 reaches a destination or implementation of the trip plan is otherwise stopped.

Figure 4:
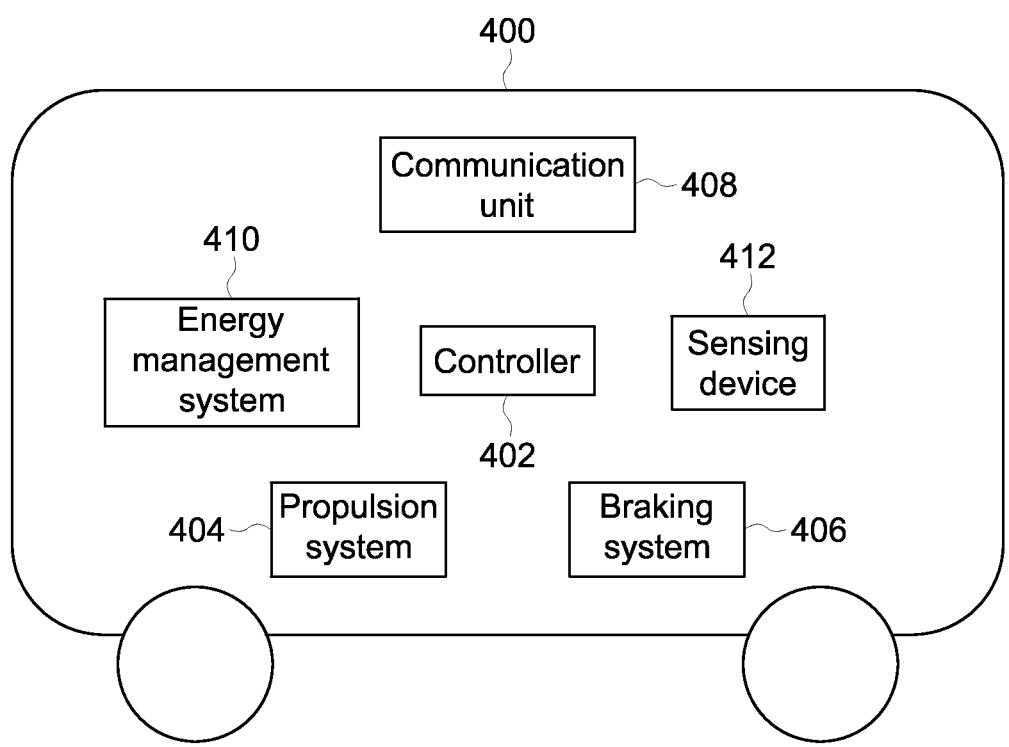
FIG. 4 is a schematic illustration of a vehicle according to one embodiment.

FIG. 4 is a schematic illustration of a vehicle 400 according to one embodiment. The vehicle 400 may represent one or more of the vehicles 108, 110 shown in FIG. 1. For example, the components shown in FIG. 4 as being onboard the vehicle 400 may be disposed onboard two or more different vehicles 108, 110 of the vehicle system 100 shown in FIG. 1.

A controller 402 of the vehicle 400 includes or represents hardware circuits or circuitry that include and/or are connected with one or more computer processors, such as one or more computer microprocessors. The controller 402 can control operations of the vehicle 400 and/or vehicle system 100, such as by autonomously controlling a propulsion system 404 and/or a braking system 406 of the vehicle 400 according to a trip plan or revised trip plan, and/or by receiving input from an operator to manually control the propulsion system 404 and/or the braking system 406 according to the trip plan or revised trip plan. For example, the controller 402 may represent or include one or more input devices, such as a throttle, pedal, touchscreen, electronic mouse, stylus, microphone, or the like, to receive commands from an operator to control operations of the vehicle 400.

The propulsion system 404 represents one or more components that work to generate tractive effort or power. For example, the propulsion system 400 can represent one or more motors, engines, or the like, that propel the vehicle 400. The braking system 406 represents one or more components that work to slow or stop movement of the vehicle 400, such as airbrakes, friction brakes, or the like.

A communication unit 408 of the vehicle 400 represents hardware circuits or circuitry that include and/or are connected with one or more computer processors (e.g., microprocessors) and communication devices (e.g., wireless antenna and/or wired connections) that operate as transmitters and/or transceivers for communicating signals with one or more locations disposed off-board the vehicle 400. For example, the communication unit 408 may wirelessly communicate signals with a facility and/or another vehicle system, or the like. The communication unit 408 may receive trip plans or revised trip plans from off-board locations and/or may communicate trip plans or revised trip plans to off-board locations.

An energy management system 410 of the vehicle 400 includes or represents hardware circuits or circuitry that include and/or are connected with one or more computer processors, such as one or more computer microprocessors. The energy management system 410 creates and/or revises the operational settings designated by trip plans to form and/or revise the trip plans. One example of an energy management system 410 includes the Trip Optimizer™ system of the General Electric Company, but alternatively may be another type of energy management system.

The energy management system 410 can create and/or revise a trip plan based on trip planning data, such as trip data, vehicle data, and/or route data. Trip data includes information about an upcoming trip by the vehicle 400 or vehicle system 100. By way of example only, trip data may include station information (such as the location of a beginning station where the upcoming trip is to begin and/or the location of an ending station where the upcoming trip is to end), restriction information (such as work zone identifications, or information on locations where the track is being repaired or is near another track being repaired and corresponding speed/throttle limitations on the rail vehicle), and/or operating mode information (such as speed/throttle limitations on the vehicle system in various locations, slow orders, and the like). Vehicle data includes information about the vehicle 400, vehicle system 100, and/or cargo being carried by the vehicle 400 and/or vehicle system 100. For example, vehicle data may represent cargo content (such as information representative of cargo being transported by the vehicle) and/or vehicle information (such as model numbers, manufacturers, horsepower, and the like, of the vehicle). Route data includes information about the route upon which the vehicle or vehicle system travels. For example, the route data may include information about locations of damaged sections of a route, locations of route sections that are under repair or construction, the curvature and/or grade of a route, and the like. The route data is related to operations of the vehicle as the route data includes information about the route that the vehicle is or will be traveling on. However, other types of data can be recorded as the data and/or the data may be used for other operations. The trip plans optionally may be referred to as trip profiles or speed profiles, and can be formed in accordance with one or more embodiments described in U.S. patent application Ser. No. 13/545,271, the entire disclosure of which is incorporated herein by reference.

A sensing device 412 of the vehicle 400 represents one or more components that determine (e.g., measure, sense, calculate, estimate, model, or otherwise obtain) the operating conditions of the vehicle 400 and/or vehicle system 100 that includes the vehicle 400. For example, the sensing device 412 can include one or more sensors, such as tachometers, accelerometers, coupler force sensors, global positioning system receivers, air pressure sensors, sensors that detect throttle positions, or the like. These sensors can measure operating conditions of the vehicle system 100 and generate data representative of the operating conditions. Optionally, the sensing device 412 can include hardware circuits or circuitry that include and/or are connected with one or more computer processors (e.g., microprocessors) that are configured to determine the actual operating conditions of the vehicle 400 and/or vehicle system 100 based on a mathematical or physics-based model of the vehicle 400 and/or vehicle system 100. For example, based on relative speeds, locations, and/or accelerations of different vehicles in the vehicle system 100, a spring model, lumped mass model, or other type of model may be used to calculate or estimate the operating conditions of the vehicle system 100 (e.g., coupler forces, slack in the couplers, or the like). As another example, based on measured air pressures in the brake system of the vehicle 400 or another brake system of the vehicle system 100, a hydraulic model of the brake system(s) can be used to calculate or estimate air pressures and/or air flows in one or more locations of the brake system(s) as the operating conditions of the vehicle 400 or vehicle system 100.

This data can be communicated from the sensing device 412 to the controller 402 and/or energy management system 410. The controller 402 can use this data as feedback to determine how to control the vehicle 400 and/or vehicle system 100 in order to follow the trip plan. The energy management system 410 can use this data to determine when to revise the trip plan and/or to determine the initial operational settings designated by the revised trip plan, as described herein.

In one embodiment, a method (e.g., for revising a trip plan of a vehicle system) includes operating a vehicle system according to a current trip plan as the vehicle system travels along a route during a trip. The current trip plan designates operational settings of the vehicle system. During movement of the vehicle system along the route, a current, actual operation of the vehicle system differs from the current trip plan by at least a designated threshold amount. The method also can include revising the current trip plan into a revised trip plan responsive to the current, actual operation of the vehicle system differing from the current trip plan by at least the designated threshold amount. The revised trip plan designates operational settings of the vehicle system and includes an initial designated operational setting that matches the current, actual operation of the vehicle system.

In one aspect, revising the current trip plan occurs during movement of the vehicle system along the route during the trip.

In one aspect, the initial designated operational setting of the revised trip plan matches a current, actual operational setting of the vehicle system.

In one aspect, the current, actual operation of the vehicle system differs from the current trip plan during a time period that the initial designated operational setting of the revised trip plan is scheduled to be implemented by the vehicle system.

In one aspect, the current trip plan and the revised trip plan designate the operational settings of the vehicle system as a function of one or more of time or distance along the route.

In one aspect, the method also can include determining the current, actual operation of the vehicle system using one or more sensing devices.

In one aspect, the method also can include determining the current, actual operation of the vehicle system based on one or more models of the vehicle system.

In one aspect, the current trip plan is revised such that the operational settings designated by the revised trip plan differ from the operational settings designated by the current trip plan over an upcoming segment of the trip.

In one aspect, the operational settings designated by the current trip plan, the operational settings of the revised trip plan, and the current, actual operation of the vehicle system include one or more of a speed, a throttle position, a brake setting, or an acceleration of the vehicle system.

In one aspect, the method also includes operating the vehicle system according to the operational settings designated by the revised trip plan. Operating the vehicle system according to the revised trip plan can cause the vehicle system to one or more of consume more fuel and/or generate increased emissions relative to the vehicle system operating according to the operational settings designated by the current trip plan. But, operating the vehicle system according to the revised trip plan also can cause the vehicle system to one or more of consume less fuel and/or generate fewer emissions relative to the vehicle system returning to operating according to the operational settings designated by the current trip plan.

In another embodiment, a system (e.g., an energy management system) includes or more processors configured to at least one of direct an operator to control or autonomously control a vehicle system according to a current trip plan as the vehicle system travels along a route during a trip. The current trip plan designates operational settings of the vehicle system. During movement of the vehicle system along the route, a current, actual operation of the vehicle system differs from the current trip plan by at least a designated threshold amount. The one or more processors also are configured to revise the current trip plan into a revised trip plan responsive to the current, actual operation of the vehicle system differing from the current trip plan by at least the designated threshold amount. The revised trip plan designates operational settings of the vehicle system that include an initial designated operational setting that matches the current, actual operation of the vehicle system.

In one aspect, the one or more processors are configured to revise the current trip plan during movement of the vehicle system along the route during the trip.

In one aspect, the one or more processors are configured to revise the current trip plan into the revised trip plan such that the initial designated operational setting of the revised trip plan matches a current, actual operational setting of the vehicle system.

In one aspect, the current, actual operation of the vehicle system differs from the current trip plan during a time period that the initial designated operational setting of the revised trip plan is scheduled to be implemented by the vehicle system.

In one aspect, the current trip plan and the revised trip plan designate the operational settings of the vehicle system as a function of one or more of time or distance along the route.

In one aspect, the one or more processors are configured to revise the current trip plan such that the operational settings designated by the revised trip plan differ from the operational settings designated by the current trip plan over an upcoming segment of the trip.

In one aspect, the operational settings designated by the current trip plan, the operational settings designated by the revised trip plan, and the current, actual operation of the vehicle system include one or more of a speed, a throttle position, a brake setting, or an acceleration of the vehicle system.

In another embodiment, a method (e.g., for revising a trip plan) includes operating a vehicle system according to a first trip plan that designates operational settings of the vehicle system as a function of one or more of time or distance along a route, determining an actual operational setting of the vehicle system, and, based at least in part on the actual operating setting, changing the operational settings designated by the first trip plan into revised operational settings of a revised trip plan. The revised trip plan includes a first operational setting of the revised operational settings that matches a current operational setting of the vehicle system during a time period that the revised trip plan is implemented in place of the first trip plan. The method also can include operating the vehicle system according to the operational settings designated by the revised trip plan.

In one aspect, the operational settings designated by the first trip plan and designated by the revised trip plan include a speed of the vehicle system.

In one aspect, operating the vehicle system according to the operational settings designated by the revised trip plan causes the vehicle system to one or more of consume more fuel or generate increased emissions relative to the vehicle system operating according to the operational settings designated by the first trip plan, but also cause the vehicle system to one or more of consume less fuel or generate fewer emissions relative to the vehicle system returning to operating according to the operational settings designated by the first trip plan.

As used herein, a vehicle consist or vehicle system may be a group of two or more vehicles that are coupled to travel together along a route. Optionally, the vehicles may not be coupled with each other and/or a vehicle consist or system may have a single propulsion-generating unit or vehicle. The vehicles in a vehicle consist or system can be propulsion-generating units (e.g., vehicles capable of generating propulsive force, which also are referred to as propulsion-generating units, powered units, or powered vehicles) that may be in succession and connected together so as to provide motoring and/or braking capability for the vehicle consist. The propulsion-generating units may be connected together with or without other vehicles or cars between the propulsion-generating units. One example of a vehicle consist is a locomotive consist that includes locomotives as the propulsion-generating units. Other vehicles may be used instead of or in addition to locomotives to form the vehicle consist. A vehicle consist can also include non-propulsion generating units, such as where two or more propulsion-generating units are connected with each other by a non-propulsion-generating unit, such as a rail car, passenger car, or other vehicle that cannot generate propulsive force to propel the vehicle consist. A larger vehicle consist, such as a train, can have sub-consists. Specifically, there can be a lead consist (of propulsion-generating units), and one or more remote consists (of propulsion-generating units), such as midway in a line of cars and another remote consist at the end of the train.

The vehicle consist may have a lead propulsion-generating unit and a trail or remote propulsion-generating unit. The terms "lead," "trail," and "remote" are used to indicate which of the propulsion-generating units control operations of other propulsion-generating units, and which propulsion-generating units are controlled by other propulsion-generating units, regardless of locations within the vehicle consist. For example, a lead propulsion-generating unit can control the operations of the trail or remote propulsion-generating units, even though the lead propulsion-generating unit may or may not be disposed at a front or leading end of the vehicle consist along a direction of travel. A vehicle consist can be configured for distributed power operation, wherein throttle and braking commands are relayed from the lead propulsion-generating unit to the remote propulsion-generating units by a radio link or physical cable. Toward this end, the term vehicle consist should be not be considered a limiting factor when discussing multiple propulsion-generating units within the same vehicle consist.

A vehicle system may include one or more powered vehicles (or powered units) and one or more non-powered vehicles (or non-powered units). In certain embodiments, the vehicle system is a rail vehicle system that includes one or more locomotives and, optionally, one or more rail cars. In other embodiments, however, the vehicle system may include non-rail type vehicles, including off-highway vehicles (e.g., vehicles that are not designed or allowed by law or regulation to travel on public roads, highways, and the like), automobiles, marine vessels, and the like. In some cases, at least a plurality of the vehicles in a vehicle system may each include a separate vehicle network.

One or more examples of the inventive subject matter described herein provide methods and systems for modifying control strategies (e.g., trip plans or trip profiles) for energy management of a consist performing a mission. For example, in various embodiments, physics and/or feedback based calculations are employed to determine the actual or experienced mass, horsepower, dynamic brake capability, and air brake capability present for a vehicle system during a trip or performance of a mission. Physics based calculations may utilize, for example, one or more of a determined force, speed, or acceleration of the vehicle system. Feedback based calculations may utilize information from one or more sensors. The expected values used in generating a trip plan are then compared to the actual or experienced values to determine if the plan was created using correct values (or values within an acceptable range of correct values). An arbiter module may be configured to receive input regarding the comparison of the expected values to the correct or experienced values, and determine which (if any) parameters used in planning may be adjusted for creation of a new or revised plan. Once the arbiter module has determined which estimate re-plans are to be performed, the arbiter module may output all necessary data (e.g., the actual or experienced values and/or modified values based on the actual or experienced values) for performing the re-plan.

Various embodiments provide a logic machine that may be implemented, for example, in a simulation or model based environment. The logic machine (e.g., arbiter module) may receive inputs from estimators (e.g., estimators configured to estimate experienced values for mass, horsepower, dynamic braking capability and air brake capability, among others, experienced during a trip or mission) and determine when to perform a re-plan. In some embodiments, after the arbiter module receives a re-plan request from an estimator, the arbiter module begins a countdown during which the arbiter module waits to see if any other estimators request a re-plan in the same time period. If more than one estimator requests a re-plan during the same time period, the arbiter module may determine which estimator requested re-plan(s) will be performed, and further may determine which estimators may need to perform a subsequent estimation. For example, in one example scenario, a mass estimator (e.g., estimator that estimates an experienced mass) and a dynamic brake estimator (e.g., estimator that estimates an experienced dynamic brake capability) each request a re-plan during a common time period. The arbiter module may select the mass estimator requested re-plan for performance, and not the dynamic brake estimator requested re-plan, because the dynamic brake information may be based on the expected mass and thus considered not reliable (as the expected mass is indicated as incorrect by the mass estimator). The experienced mass determined by the mass estimator may be provided to the dynamic brake estimator, and used by the dynamic brake estimator to generate a subsequent estimate of dynamic brake capability. Further, the arbiter module may take the state or condition of a vehicle system into consideration when determining if a requested re-plan is to be performed. Further still, the arbiter module may consider information from a supervisor subsystem or other subsystem of a vehicle system when determining if a requested re-plan is to be performed. Certain types of re-plans may only be performed when a vehicle system is in a particular state (or when a vehicle system is not in a particular state). For example, if an air brake system is currently being applied, a re-plan based on a request from an air brake estimator may not be performed.

At least one technical effect of various examples of the inventive subject matter described herein may include improved accuracy in re-planning a trip. At least one technical effect of various examples of the inventive subject matter described herein may include improved efficiency in vehicle operation. Another technical effect may include improved fuel savings. Another technical effect may include improved customer satisfaction. Another technical effect may include reduction of abrupt or overly frequent throttle setting changes.

Figure 5:
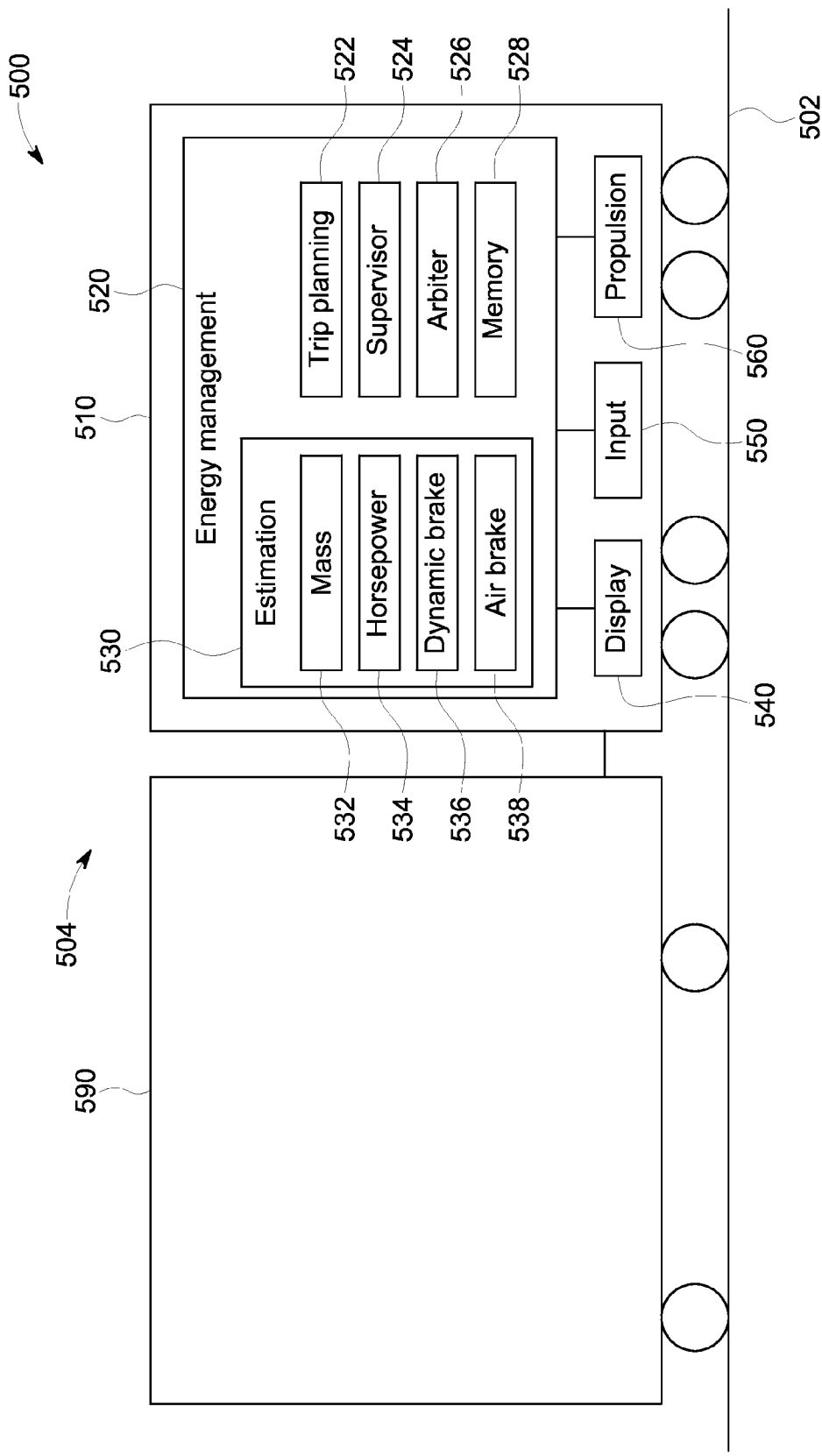
FIG. 5 is a schematic diagram of a transportation system, according to an embodiment of the invention.

FIG. 5 illustrates a schematic block diagram of a transportation system 500 (which also can be referred to as a vehicle system) formed according to one example of the present inventive subject matter. The transportation system 500 depicted in FIG. 5 includes a consist 504 that is configured to traverse a route 502, for example to perform a mission. All or a portion of the consist 504 may be scheduled to arrive at one or more destinations along the route 502 pursuant to the mission. In the illustrated example, the consist 504 includes a powered vehicle 510 and a cargo (or non-propulsion-generating) unit 590. It may be noted that additional propulsion-generating vehicles and/or non-propulsion-generating units (e.g., powered vehicles, cargo vehicles, fuel cars or tenders) may be included in the consist 504 in various embodiments. Thus, while one propulsion-generating vehicle and cargo unit are shown in FIG. 5, it should be understood that the consist 504 may include additional vehicles or cars. Further, the energy management processing unit as discussed herein may be configured to develop and/or modify trip plans configured for the operation of plural propulsion-generating vehicles (e.g., lead and remote propulsion-generating vehicles, lead and remote propulsion-generating consists of a consist). It may be noted that, as used herein, powered or un-powered when used to describe a vehicle or unit refers to the ability to generate propulsion, and does not necessarily refer to the ability to receive and/or generate electrical energy or current, for example.

The powered vehicle 510 in the illustrated embodiment is configured as a powered rail vehicle or locomotive, and the route 502 includes one or more railroad tracks. Other types of vehicles or routes may be used in other embodiments. The powered vehicle 510 may include throttle levels set as notches from 0-8. The notches may be adjusted by integer values in some examples (e.g., 0, 1, 2, 3, 4, and so on), or by finer adjustments in other embodiments.

The powered vehicle 510 depicted in FIG. 5 includes an energy management processing unit 520, a display unit 540, an input unit 550, and a propulsion system 560. Generally, the energy management processing unit 520 determines a trip plan or other specification of settings used to control the consist 504 to perform a mission. The depicted energy management processing unit 520 includes a trip planning module 522, a supervisor module 524, an arbiter module 526, a memory 528, and an estimation unit 530 (which includes a plurality of estimator modules). The energy management processing unit 520 may include processing circuitry configured to perform one or more tasks, functions, or steps discussed herein, for example as specified by one or more software modules. For example, the energy management processing unit 520 may generate an initial trip plan based on expected values of a number of parameters, estimate or otherwise determine an actual or experienced value of at least one of the parameters, determine whether to re-plan a trip using the determined actual or experienced value, and, if a re-plan is determined appropriate, re-plan the trip. The depicted display unit 540 is configured to provide a display to a user. For example, the display unit 540 may display a command or setting called for by a trip profile, display an experienced value of a parameter as determined by the estimation unit 530, and/or display information describing a proposed or suggested re-plan. The depicted input unit 550 is configured to obtain an input, such as a user input. For example, a user may request a re-plan, modify an indicated re-plan, or deny performance of a suggested or proposed re-plan. It may be noted that the particular units or modules shown in FIG. 5 are meant by way of example, and that other arrangements of units or sub-units of the processing unit 520 may be employed in various embodiments.

Generally, in various embodiments, the trip planning module 522 is configured to plan a trip profile for use by the consist 504 (e.g., the powered vehicle 510 and/or other powered vehicles of the consist 504). The trip profile may specify power settings for performing a mission based on trip planning data. The trip planning data may include a plurality of parameters having expected values. For example, the trip planning data, which may be provided before commencing a mission or trip, may include expected values for mass of the consist 504, dynamic braking capability of the consist 504, air braking capability of the consist 504, or horsepower of the consist 504, among others. The expected values may be estimated based upon, for example, an identification of the units (e.g., locomotives identified by type of locomotive, cargo units identified by type of unit, type of cargo, and amount of cargo) of units in the consist 504. However, it may be noted that the actual values or values of the parameters experienced and measured during performance of a mission may differ from the estimated values used to develop an initial trip plan (e.g., a trip plan developed before commencing a mission). The estimation unit 530 may request an estimation re-plan if one or more experienced values differs by more than a threshold from one or more corresponding expected values. If the estimation unit 530 requests one or more estimation re-plans, the arbiter module 526 determines which, if any re-plans are to be provided to the trip planning module 522 for implementation.

The trip planning module 522 in the illustrated example is configured to determine or develop a trip plan specifying operational settings to be utilized by the consist 504 (e.g., the powered vehicle 510 and/or any other powered vehicles in the consist) during performance of a mission to achieve one or more desired results.

Generally, the energy management processing unit 520 (e.g., the trip planning module 522) may be configured to operate as a control system disposed on-board the powered vehicle 510. For example, the trip planning module 522 may receive one or more schedules from an off-board scheduling or dispatch system, and generate control signals that may be used to control propulsion of the consist 504 (e.g., the powered vehicle 510) over the route 502. For example, the powered vehicle 510 may include one or more wireless antennas (and associated transceiving equipment), such as RF or cellular antennas, that receive the schedules from the scheduling system. The energy management processing unit 520 may examine the schedule, such as by determining the scheduled destination location and scheduled arrival time, and generate control signals based on the schedule. Optionally, part or all of the energy management processing unit 520 can be disposed off-board the vehicle 510 and/or the consist 504 and communicate the trip plan to the vehicle 510.

The control signals may be used to automatically control tractive efforts and/or braking efforts of the consist 504 (e.g., the powered vehicle 510) such that the consist 504 (e.g., the powered vehicle 510) self-propels along the route 502 to the destination location. For example, the energy management processing unit 520 may be operatively coupled with a propulsion system 560 of the powered vehicle 510. The propulsion system 560 may include motors (such as traction motors), engines, brakes (such as air brakes and/or regenerative brakes), and the like, that generate tractive energy to propel the powered vehicle 510 and/or slow movement of the powered vehicle 510. The energy management processing unit 520 may generate control signals that automatically control the propulsion system 560, such as by automatically changing throttle settings and/or brake settings of the propulsion system 560. (As used herein, self-propulsion includes automatic operation under the purview of an operator, who may have the option to take over manual control of the vehicle.)

In another example aspect, the control signals may be used to prompt an operator of the powered vehicle 510 to manually control the tractive efforts and/or braking efforts of the powered vehicle 510. For example, the energy management processing unit 520 may include or be operably coupled to an output device, such as a computer monitor, touchscreen, acoustic speaker, or the like, that generates visual and/or audible instructions based on the control signals. In the depicted example, the display unit 540 may be employed as the output device. The instructions may direct the operator to manually change throttle settings and/or brake settings of the propulsion system 560.

The trip planning module 522 may form a trip profile for a trip of the consist 504 to travel to a scheduled destination location at a scheduled arrival time (or within a designated time period of the scheduled arrival time). The trip profile may be formed by the energy management processing unit 520 (e.g., the trip planning module 522 of the energy management module 520) to reduce one or more of fuel, emission, or time of a mission relative to traveling according to another trip profile. The trip profile may include throttle settings, brake settings, designated speeds, or the like, of the powered vehicle 510 for various sections of the trip of the powered vehicle 510. The trip profile can designate one or more of these operational settings as a function of time and/or distance along the route for the trip. For example, the trip profile may include one or more velocity curves that designate various speeds of the powered vehicle 510 along various sections of the route 502.

The trip profile may be formed based on information related to the consist 504, the route 502 over which the consist 504 will traverse during the upcoming trip, and/or other information. The information related to the consist 504 can include the type of powered vehicle 510, the tractive energy generated by the powered vehicle 510 (and any other powered vehicles in the consist 504), the weight or mass of the powered vehicle 510, the cargo unit 590, any other powered vehicles or fuel cars, and/or cargo being carried by the consist 504, the length and/or other size of the consist 504 (e.g., how many powered and non-powered units are mechanically coupled with each other in the consist 504), the horsepower generated by the powered vehicle 510 (and any other powered vehicles in the consist 504), a braking capability of the powered vehicle 510 and/or the consist 504 (e.g., dynamic braking capability, air braking capability), locations or distributions of the propulsion-generating vehicles in the consist 504, and the like.

The information related to the vehicle may be based on expected values. For example, an expected mass value may be based on the number and type of powered units as well as the number and type of cargo units (including mass of cargo). However, the expected values may deviate from the values actually experienced during the mission. The information related to the route 502 may include the curvature, grade (e.g., inclination), existence of ongoing repairs, speed limits, and the like, for one or more sections of the route 502. The other information may include information regarding the cost of each type of fuel used by the consist 504, information related to conditions that impact how much fuel (e.g., how much of each type of fuel available for use) is used while traveling, such as the air pressure, temperature, humidity, and the like, information related to emission produced at the various throttle settings employed during a mission, and the like.

The energy management processing unit 520 may form the control signals based on a trip plan. It may be noted that, while a single powered vehicle 510 is shown in the example of FIG. 5, the energy management processing unit 520 may also be configured to control additional vehicles of a consist and/or provide a trip plan including settings for additional powered vehicles in a consist (e.g., when the powered vehicle 510 is utilized as a lead vehicle of a consist). The trip profile may be determined using a system such as the Trip Optimizer™ system of the General Electric Company, or another energy management system.

The trip profile may be based on trip planning data, including the various data discussed above. The trip planning data used to form the trip profile may include trip data, train data, track data, and/or an update to trip data, train data, or track data. Train data includes information about the rail vehicle and/or cargo being carried by the rail vehicle. For example, train data may represent cargo content (such as information representative of cargo being transported by the rail vehicle) and/or rail vehicle information (such as model numbers, manufacturers, horsepower, and the like, of locomotives and/or other railcars in the rail vehicle). Trip data includes information about an upcoming trip by the rail vehicle. By way of example only, trip data may include station information (such as the location of a beginning station where the upcoming trip is to begin and/or the location of an ending station where the upcoming trip is to end), restriction information (such as work zone identifications, or information on locations where the track is being repaired or is near another track being repaired and corresponding speed/throttle limitations on the rail vehicle), and/or operating mode information (such as speed/throttle limitations on the rail vehicle in various locations, slow orders, and the like). Track data includes information about the track or rails upon which the rail vehicle travels. For example, the track data may include information about locations of damaged sections of a track, locations of track sections that are under repair or construction, the curvature and/or grade of a track, GPS coordinates of the track, and the like. The track data is related to operations of the rail vehicle as the track data includes information about the track that the rail vehicle is or will be traveling on. However, other types of data can be recorded as the data and/or the data may be used for other operations. The term "trip planning data" may refer to trip data, train data, and track data, only one of trip data, train data, or track data, or another type of data.

The depicted estimation unit 530 includes a plurality of estimator modules. The estimator modules are configured to estimate one or more experienced values of one or more parameters used by the trip planning module 522. As used herein, an experienced value may be understood as a value determined during performance of a mission, using either information from a sensor or detector and/or information derived from a calculation based on other measured or detected parameters during performance of a mission. The estimator modules can be further configured to compare the experienced value of the at least one parameter to a corresponding expected value (or previously determined experienced value) used to generate a current trip plan to determine a difference between the experienced value and the expected or currently used value. An estimation re-plan request of the trip profile can be generated responsive to this difference exceeding a threshold, such as a designated, non-zero threshold. As used herein, an estimation re-plan is a modification to a currently implemented trip plan that corresponds to a difference between an expected and experienced value of a parameter used in trip planning. In contrast, other types of re-plans include a recoverability re-plan that is undertaken, for example, after manual control of a vehicle deviates from a trip plan, or as another example, to a configuration re-plan that may be performed after units are added to and/or removed from the consist 504.

For example, an initial trip plan may be formed before a mission is performed (or during an earlier portion of the mission). The initial trip plan may be developed based on an expected mass (or an experienced mass from the earlier portion of the mission). The expected mass may be estimated based on a number of cargo units and an average expected mass for each cargo unit. However, during performance of the mission, an experienced mass may be determined, for example using a calculation based on the speed and acceleration of the vehicle during performance of the mission. The experienced mass may differ from the expected mass, for example, if the cargo units are under- or over-loaded, or, as another example, the experienced mass may appear different under the influence of a relatively constant and sufficient head wind or tail wind. If the expected and experienced mass are relatively close (e.g., the difference is less than a predetermined threshold), no estimation re-plan may be requested. However, if the expected and experienced mass are not relatively close (e.g., the difference is greater than a predetermined threshold), an estimation re-plan may be requested (e.g., an estimation re-plan request may be provided to the arbiter module 526 of the processing unit 520) by the estimation unit 530. The threshold may be selected in various embodiments to avoid the computational and/or implementation considerations required for a re-plan for a relatively small difference, while allowing a re-plan to be performed for a relatively large difference.

As another example, an expected horsepower for the powered vehicle 510 may be estimated based on ideal, standard, or expected conditions of temperature and pressure. However, the temperature and pressure encountered during a mission may differ from the ideal, standard, or expected conditions. As another example, a motor, engine, or other mechanical aspect may malfunction, reducing horsepower from an expected value. Accordingly, the horsepower produced or experienced by the consist 504 (e.g., by the powered vehicle 510 and/or other powered vehicles) during performance of a mission may differ from the expected value. If the expected and experienced horsepower are not relatively close (e.g., the difference is greater than a predetermined threshold), an estimation re-plan may be requested (e.g., a re-plan request may be provided to the arbiter module 526 of the processing unit 520), while, if the expected and experienced horsepower are relatively close (e.g., the difference is less than a predetermined threshold) an estimation re-plan may not be requested by the estimation unit 530. In the illustrated embodiment, the estimation unit 530 includes a mass estimator module 532, a horsepower estimator module 534, a dynamic brake (DB) estimator module 536, and an air brake estimator module 538. It may be noted that the particular units or modules of the estimation unit 530 shown in FIG. 5 are meant by way of example, and that other arrangements of units or sub-units of the estimation unit 530 may be employed in various embodiments. For example, additional or alternative estimator units (e.g., estimator units configured to estimate experienced values for one or more additional or alternative parameters to those discussed in connection with FIG. 5) may be utilized in various embodiments.

The mass estimator module 532 is configured to estimate an experienced or actual value of mass (e.g., total mass of the consist 504) experienced during performance of a mission or trip. For example, the mass estimator module 532 may obtain information regarding speed, acceleration, and/or tractive force and determine the mass of the consist 504 during performance of a mission using a physics based calculation. After estimating the actual or experienced mass, the mass estimator module 532 may determine if an estimation re-plan request is appropriate. For example, the mass estimator module 532 may obtain a currently used value of mass (e.g., an expected value of mass or an experienced value of mass from previous in the trip used to plan the currently implemented trip profile) from the trip planning module 522, and compare the currently used value to the experienced value. If the values are within a predetermined threshold (e.g., are relatively close), no estimation re-plan request may be made. However, if the values differ by more than the predetermined threshold, the mass estimator module 532 provides an estimation re-plan request to the arbiter module 526. The estimation re-plan request may specify one or more of an indication that an estimation re-plan request is being requested, an identification of the type of estimation re-plan request (e.g., a mass estimation re-plan request), and a value to be used pursuant to the requested estimation re-plan (e.g., a proposed or suggested value of mass for the consist 504 to be used for re-planning or modifying a trip profile, for example a value of mass set to the actual or experienced valued determined or estimated by the mass estimator module 532).

The horsepower estimator module 534 is configured to estimate an experienced or actual value of horsepower experienced (e.g., actual horsepower produced by the powered vehicle 510 and/or other powered vehicles of the consist 504) during performance of a mission or trip. For example, the horsepower estimator module 534 may obtain information from one or more sensors, for example sensors detecting torque, rotational speed, or the like of an output of one more powered vehicles, and determine horsepower during performance of a mission. The actual horsepower produced may differ from an expected value to changes in environmental conditions (e.g., temperature or pressure) or malfunction of one more engines or components thereof, for example. It may be noted that the horsepower estimator module 534 may only perform an estimation at certain times or when the consist 504 is in particular states. For example, the horsepower estimator module 534 may perform an estimate of experienced horsepower only at one or more throttle settings, such as relatively high throttle settings. Relatively high throttle settings may provide more consistent or reliable estimates of horsepower than estimates performed at relatively low throttle settings. In some embodiments, throttle settings may vary from 0-8, with the horsepower estimator module 534 only estimating horsepower when the notch settings are at 7 or above. After estimating the actual or experienced horsepower, the horsepower estimator module 534 may determine if an estimation re-plan request is appropriate. For example, the horsepower estimator module 534 may obtain a currently used value for horsepower (e.g., an expected value of horsepower based on predetermined ratings of powered vehicles in a consist) or an experienced value of horsepower from previous in the trip used to plan the currently implemented trip profile) from the trip planning module 522, and compare the currently used value to the experienced value. If the values are within a predetermined threshold (e.g., are relatively close), no estimation re-plan request may be made. However, if the values differ by more than the predetermined threshold, the horsepower estimator module 534 provides an estimation re-plan request to the arbiter module 526. The estimation re-plan request may specify one or more of an indication that an estimation re-plan request is being requested, an identification of the type of estimation re-plan request (e.g., a horsepower estimation re-plan request), and a value to be used pursuant to the requested estimation re-plan (e.g., a proposed or suggested value of horsepower to be used in re-planning, for example a value of horsepower set to the actual or experienced valued determined or estimated by the horsepower estimator module 534).

The DB estimator module 536 is configured to estimate an experienced or actual value of dynamic braking capability experienced during performance of a mission or trip. The dynamic braking capability may be expressed, for example, in terms of an available braking force or a required distance (or distances) for braking from a given speed (or speeds). For example, the DB estimator module 536 may obtain information regarding speed, acceleration, and/or braking force provided by a dynamic braking system and determine the dynamic braking capability of the consist 504 during performance of a mission using a physics based calculation. The particular relationships used to calculate estimated values may vary or be tailored by application. The relationships may be expressed as part of a mathematical formula and/or in look-up tables. It may be noted that the DB estimator module 536 may only perform an estimation at certain times or when the consist 504 is in particular states. For example, the DB estimator module 536 may estimate DB braking capability only when a dynamic braking activity is taking place. After estimating the actual or experienced dynamic braking capability, the DB estimator module 536 may determine if an estimation re-plan request is appropriate. For example, the DB estimator module 536 may obtain a currently used value for dynamic braking capability (e.g., an expected value or an experienced value from previous in the trip used to plan the currently implemented trip profile) from the trip planning module 522, and compare the currently used value to the experienced value. If the values are within a predetermined threshold (e.g., are relatively close), no estimation re-plan request may be made. However, if the values differ by more than the predetermined threshold, the DB estimator module 536 provides an estimation re-plan request to the arbiter module 526. The estimation re-plan request may specify one or more of an indication that an estimation re-plan request is being requested, an identification of the type of estimation re-plan request (e.g., a DB estimation re-plan request), and a value to be used pursuant to the requested estimation re-plan (e.g., a proposed or suggested value of dynamic braking capability, for example a value of dynamic braking capability set to the actual or experienced valued determined or estimated by the DB estimator module 536).

The air brake estimator module 538 is configured to estimate an experienced or actual value of air braking capability experienced during performance of a mission or trip. The air braking capability may be expressed, for example, in terms of an available braking force or a required distance (or distances) for braking from a given speed (or speeds). For example, the air brake estimator module 538 may obtain information regarding speed, acceleration, and/or braking force provided by an air braking system and determine the air braking capability of the consist 504 during performance of a mission using a physics based calculation. The particular relationships used to calculate estimated values may vary or be tailored by application. The relationships may be expressed as part of a mathematical formula and/or in look-up tables. It may be noted that the air brake estimator module 538 may only perform an estimation at certain times or when the consist 504 is in particular states. For example, the air brake estimator module 538 may estimate air braking capability only when an air braking activity is taking place. After estimating the actual or experienced air braking capability, the air brake estimator module 538 may determine if an estimation re-plan request is appropriate. For example, the air brake estimator module 538 may obtain a currently used value for air braking capability (e.g., an expected value or an experienced value from previous in the trip used to plan the currently implemented trip profile) from the trip planning module 522, and compare the currently used value to the experienced value. If the values are within a predetermined threshold (e.g., are relatively close), no estimation re-plan request may be made. However, if the values differ by more than the predetermined threshold, the air brake estimator module 538 provides an estimation re-plan request to the arbiter module 526. The estimation re-plan request may specify one or more of an indication that an estimation re-plan request is being requested, an identification of the type of estimation re-plan request (e.g., an air brake estimation re-plan request), and a value to be used pursuant to the requested estimation re-plan (e.g., a proposed or suggested value of air braking capability, for example a value of air braking capability set to the actual or experienced valued determined or estimated by the air brake estimator module 538).

The arbiter module 526 is configured to receive estimation re-plan requests from the plurality of estimator modules, and to determine if a re-plan is to be performed pursuant to any estimation re-plan requests received. For example, the arbiter module 526 may determine if an estimation re-plan is to be performed based on a state of the consist 504 (e.g., if the consist 504 is traveling above a predetermined speed, if the throttle of powered vehicles in the consist is above a predetermined threshold, or if air brakes are being applied, for example). Additionally or alternatively, the arbiter module 526 may determine whether an estimation re-plan is to be performed based on additional estimation re-plan requests. For example, the various estimator modules may be ranked in a priority, with requests from lower priority modules passed over in favor of requests from higher priority modules. The arbiter module 526 is also configured to provide an arbitrated re-plan request to the trip planning module 522 for re-planning the trip profile when it is determined that a re-plan is to be performed. An arbitrated re-plan request for example may include the re-plan request that was selected from a group of re-plan requests, for example a re-plan request selected based on a priority ranking.

Additionally or alternatively, an arbitrated re-plan request may include a re-plan request that has been modified or adjusted from an estimation re-plan request generated by one or more of the estimator modules. For example, an estimation re-plan request may specify a relatively large change in a parameter that may result in a relatively large change in settings such as throttle once a re-plan using the new parameter value is implemented; however, the arbitrated re-plan request may adjust for a smaller change in the parameter to provide a smaller change in settings resulting from a re-plan to provide smoother operation. For example, at relatively high throttle settings, a value suggested by an estimator module may be modified to provide a smaller amount of change from a value used for a current trip profile, so that any changes in operation (e.g., throttle setting) called for by a re-planned trip profile will not be overly abrupt. After an arbitrated value provided by the arbiter module 526 is implemented by the trip planning module 522, the "expected value" may be re-set to the arbitrated value used to modify the trip plan. If the smaller adjustment specified by the arbiter module 526 is not sufficient to bring the expected value (e.g., the value used in generating or modifying the trip plan) within the threshold of the experienced value, subsequent estimation re-plans may be performed to smoothly and gradually bring the expected and experienced values in line.

As indicated herein, in various embodiments, the arbiter module 526 is configured to select among a plurality of estimation re-plan requests based on a predetermined priority ranking. The plurality of estimation re-plan requests may be received with a predetermined time period. For example, the arbiter module 526 may check for estimation re-plan requests accrued at regular time intervals (e.g., every minute, every two minutes, every five minutes, or every ten minutes, among others). As another example, after receiving an estimation re-plan request from a given estimator module, the arbiter module 526 may initiate a countdown or timing period to see if any additional requests are received from other estimator modules within a given time period (e.g., within one minute after a first request, within two minutes after a first request, with five minutes after a first request, or with ten minutes after a first request, among others). When more than one estimation re-plan request is received, a request (or requests) having a higher priority may be selected preferentially over a request (or requests) having a lower priority.

For example, the priority may be based upon whether a given re-plan request from a given estimator module has one or more parameters that are dependent upon one or more parameters provided by a different estimator module. For example, a DB or air brake capability estimation may use a mass (from the trip planning module 522 and/or mass estimator module 532) as an input. Thus, the DB or air brake capability estimation may be dependent on the mass estimation. However, if the mass estimator module 532 indicates the mass estimate may need adjustment, the reliability of a DB or air brake estimation request based upon a mass estimate identified as being at issue may be questioned. Accordingly, the mass estimate re-plan request may be given priority over the DB or air brake estimate request (where the DB or air brake estimates include parameters that depend upon the mass estimate), so that a re-plan may be performed to correct the mass, with the corrected mass then used for subsequent evaluation (e.g., by the estimation unit 530) regarding whether a DB or air brake capability re-plan is appropriate in light of the revised mass value. It may be noted that, in some embodiments, some estimation re-plan requests may be ordered in a dependency-based hierarchy or priority, while others may not. For example, horsepower estimation may be independent or unrelated to air brake capability estimation, and, accordingly, horsepower estimation and air brake capability estimation may not be ordered with respect to each other as part of dependency based priority, while other estimation requests may be (e.g., a mass estimation re-plan request may be given priority over an air brake estimation re-plan request).

Additionally or alternatively, the arbiter module 526 may select re-plan requests based on reliability of re-plan requests. For example, the arbiter module 526, when receiving a first and second estimation re-plan requests within a given time period, may select the first re-plan request over the second re-plan request when the first re-plan request is determined to be more reliable than the second re-plan request. In some embodiments, re-plan requests that are based upon (or more heavily based upon) feedback or direct information from sensors may be deemed more reliable than re-plan requests that are based upon (or more heavily based upon) physics based calculations to provide estimates. For example, in some embodiments, estimates of mass and/or braking capabilities may be generated using physics based models of train motion, while horsepower estimates may be generated using sensors and/or feedback, with horsepower estimates thus measured more directly than mass and/or braking capability estimates. Accordingly, horsepower estimates may be deemed more reliable than estimates of mass and/or braking capability and assigned a higher priority in various embodiments.

As indicated herein, estimation re-plan requests received by the arbiter module 526 may include a specification of a new value of an estimated parameter from an estimator module. However, it may be noted that the arbiter module 526 may modify or adjust the specified value of the parameter before providing the trip planning module 522 with a request (either directly to the trip planning module 522, or indirectly via the supervisor module 524) for an estimation re-plan. Thus, the arbiter module 526 may be configured to adjust a value of an estimation re-plan request received from the estimation unit 530 (e.g., one of the estimator modules of the estimation unit 530) to provide a corresponding modified value for an arbitrated re-plan request provided to the trip planning module 522. An arbitrated re-plan request accordingly may include an estimation request that has been selected or approved by the arbiter module 526 as well as one or more values of parameters to be used by the trip planning module 522 in performing the re-plan.

For example, the arbiter module 526 may adjust the value of one or more parameters of an estimation re-plan request originally provided by an estimator module based on a state of the vehicle. In one example, the consist 504 may be traveling at a relatively high rate of speed or at a relatively high throttle setting. If a parameter used for trip planning is changed by a relatively large amount, the trip plan may specify a relatively large change in operating parameters, such as throttle setting. If such a large change is implemented while operating a high throttle setting, the consist 504 may be subject to an abrupt change in speed. To avoid such abrupt changes in speed, the arbiter module 526 may modify one or more parameters specified by an estimation re-plan request to provide a smaller change from a current value, helping to maintain smooth or consistent operation of the consist 504 when at a high speed or throttle setting. For example, if the mass estimator module 532 request a re-plan using a value of mass that differs about 50% from a currently used value, the resulting trip profile may cause an abrupt change in throttle when operating at a high throttle setting. The arbiter module 526 may limit the amount of change in mass estimate, for example, to about 10% when operating at a high throttle setting (e.g., 7 or 8). It may be noted that the amount of change permitted at lower throttle settings may be larger.

It may further be noted that the arbiter module 526 may deny certain types of re-plan requests based on the state of the consist 504. For example, an air brake estimation request may not be permitted when the air brakes are applied. As another example, the arbiter module 526 may receive information from another system, sub-system, unit, or module (e.g., supervisor module 524), and the arbiter module 526 may deny an estimation re-plan request based on the received information. For example, the supervisor module 524 may determine that a recoverability re-plan is being performed, and inform the arbiter module 526, with the arbiter module 526 denying estimation re-plan requests received during performance of a recoverability re-plan. In other embodiments, the arbiter module 526 may provide an arbitrated re-plan request to the supervisor module 524, and the supervisor module 524 may determine whether to forward the arbitrated re-plan request from the arbiter module 526 to the trip planning module 522.

The depicted supervisor module 524 is configured to receive an arbitrated re-plan request from the arbiter module 526, and to determine whether to forward the arbitrated re-plan request to the trip planning module 522. For example, the supervisor module 524 may determine whether to forward the arbitrated re-plan request based on a planning state of the consist 504. A planning state of a vehicle or vehicle system may specify whether a trip planner is actively planning or re-planning a trip profile, and may specify the type of re-plan being performed (e.g., estimation re-plan or recoverability re-plan, among others). In various embodiments, the supervisor module 524 may deny an arbitrated re-plan request (and/or instruct the arbiter module 526 to deny estimation re-plan requests from the estimation unit 530) during performance of a recoverability re-plan, or, as another example, during a re-plan performed responsive to adding and/or removing units from the consist 504.

Figure 6:
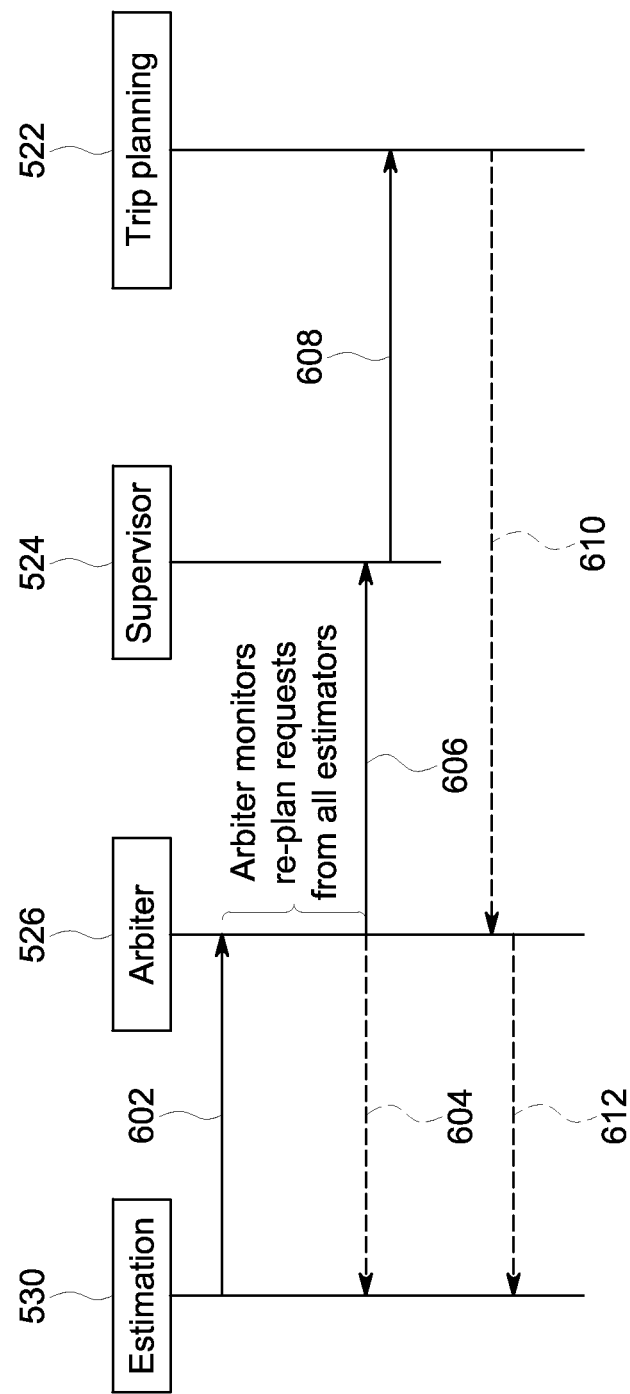
FIG. 6 illustrates various messages and/or requests that may be transmitted between aspects of an energy management processing unit, according to an embodiment of the invention.

FIG. 6 illustrates various messages and/or requests that may be transmitted between aspects of the energy management processing unit 520. In the illustrated embodiment, the estimation unit 530 has determined that at least one value used to generate a current trip plan (e.g., an expected value or a previously estimated experienced value) differs from a determined experienced value by more than a threshold amount. The estimation unit 530 thus generates an estimation re-plan request 602 that is transmitted to the arbiter module 526. The estimation re-plan request 602 may identify the type of estimation re-plan being requested (e.g., mass, horsepower, dynamic brake capability, or air brake capability, among others) as well as one or more parameters or scale factors associated with the request, for example an experienced value of at least one variable determined by the estimation unit (e.g., an experienced mass based on a physics based calculation based on vehicle motion).

The arbiter module 526 receives and evaluates the estimation re-plan request 602. For example, the arbiter module 526 may select among two or more received requests, or determine whether to forward a re-plan request to the trip planning module 522 based on a state of the consist 504 as discussed herein. If the arbiter module 526 denies the estimation re-plan request, the arbiter module 526 may transmit a re-evaluate direction 604 to the estimation unit 530. The estimation re-plan request 602 may be denied, for example, because a different received re-plan request was given a higher priority, or, as another example, because the consist 504 was in a state inappropriate for performing the requested re-plan. The re-evaluation direction 604 may direct the estimation unit 530 to re-perform or re-evaluate an estimate previously resulting in the denied estimation re-plan request, for example at a given time in the future and/or after receiving an instruction re-setting one or more parameters used by the estimation unit 530. If the arbiter module 526 grants or selects the estimation re-plan request 602, the arbiter module 526 forwards an arbitrated re-plan request 606 to the supervisor module 524. The arbitrated re-plan request 606 may specify a type of re-plan request (e.g., mass estimation re-plan request), and may also specify one or more parameters or scale factors to be used as part of the re-plan (e.g., an estimate of mass). It may be noted that the value of parameter specified by the arbitrated re-plan request 606 may differ from a value of the original estimation re-plan request 602. For example, the arbiter module 526 may adjust the value to avoid a sudden or abrupt change in operation at a high throttle setting.

The supervisor module 524 receives the arbitrated re-plan request 606 and evaluates whether to forward the arbitrated re-plan request 606 to the trip planning module 522. For example, if the supervisor module 524 determines that the trip planning module 522 is performing a different type of re-plan (e.g., a recoverability re-plan), the supervisor module 524 may deny the arbitrated re-plan request 606. If the supervisor module 524 determines the arbitrated re-plan request 606 is appropriate for implementation, the supervisor module 524 forwards a plan request message 608 corresponding to the arbitrated re-plan request 606 to the trip planning module 522.

The trip planning module 522 receives the plan request message 608. Responsive to receiving the plan request message 608, the trip planning module 522 re-plans the trip profile using at least one parameter that has a value differing from a value used to plan the current or previous trip profile (e.g., a revised mass estimate). After performing the re-plan, the trip planning module 522 transmits a plan data message 610 to the arbiter module 526. The plan data message 610, for example, may indicate values used to perform the re-plan. For example, for a re-plan performed due to a revision of a mass estimate, the plan data message 610 may specify the most recent mass estimate used as part of the re-plan, along with other values used in performing the re-plan (which may be changed or un-changed from a previous plan). In various embodiments, the arbiter module 526 may receive plural plan data messages 610.

Responsive to receiving the plan data message 610, the arbiter module 526 prepares an estimator reset message 612 and forwards the estimator reset message 612 to the estimation unit 530 (e.g., to one or more estimation modules of the estimation unit 530). The depicted estimator reset message 612 may instruct one or more estimator modules to reset the values of certain variables and calculations, and to re-initialize or re-perform estimates if certain re-plans or changes to the consist 504 occur. For example, if a re-plan is performed due to a revised estimate of mass, the air brake estimator module 538 and the DB estimator module 536 may be reset, as the air brake estimator module 538 and the DB estimator module 536 previously made estimates using a value for mass that has been changed. As another example, if units are added to the consist 504 (or removed from the consist 504), the air brake estimator module 538 will be reset as the consist 504 is now longer (or shorter), with the length of the consist 504 affecting the air brake force.

Figure 7:
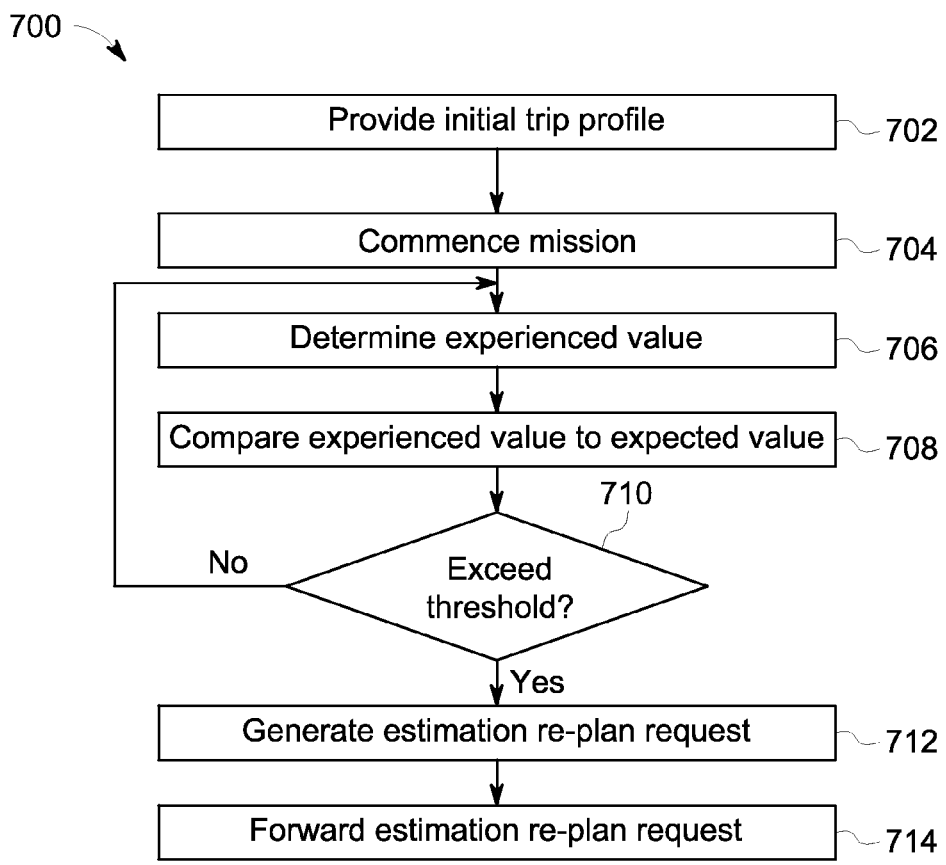
FIG. 7 illustrates a flowchart of a method for generating an estimation re-plan request, according to an embodiment of the invention.

FIG. 7 illustrates a flowchart of a method 700 for generating an estimation re-plan request in accordance with one example of the present inventive subject matter. The method may be performed, for example, using certain components, equipment, structures, or other aspects of embodiments discussed above. In certain embodiments, certain steps may be added or omitted, certain steps may be performed simultaneously or concurrently with other steps, certain steps may be performed in different order, and certain steps may be performed more than once, for example, in an iterative fashion. In various embodiments, portions, aspects, and/or variations of the method may be able to be used as one or more algorithms to direct hardware to perform operations described herein.

At 702, an initial trip profile is provided. The trip profile may be based on expected values for one or more estimated parameters, such as mass, horsepower, air braking capability, or dynamic braking capability. The trip profile may specify power settings at various portions along a route for one or more powered vehicles. At 704, a mission is commenced pursuant to the trip profile.

At 706, during performance of the mission, an experienced value for one of the parameters used to plan the trip profile is estimated or determined using information acquired or obtained during the performance of the mission. As just one example, information regarding speed, acceleration, or the like may be collected or detected during the mission, and used to determine an experienced mass of a vehicle system using physics based calculations regarding the motion of the vehicle system. The experienced value may be determined continuously, at predetermined intervals, or responsive to an event. For example, a dynamic braking capability estimate may be determined during application of dynamic brakes, but not at times when the dynamic brakes are not activated. As another example, a horsepower estimate may be determined when a throttle is at a relatively high setting (e.g., 7 or 8), but not when the throttle is at lower settings.

At 708, the experienced value is compared to the corresponding expected or previous value used to plan the trip profile currently used (e.g., the trip profile in use during acquisition of the information used to determine or estimate the experienced value). Thus, an expected value may be a value used to prepare an initial trip profile before commencement of a mission, or may be a value used in a subsequent re-plan of a trip profile currently in use. An estimator module may obtain the expected value or value used by the most recent trip plan, and compare the expected value to the corresponding value determined at 706.

At 710, it is determined if the difference satisfies a threshold criterion. For example, if the difference between the expected and experienced values is relatively small (e.g., small enough so that a re-plan may not be desired), the method 700 may return to 706 for continued monitoring of one or more estimated parameters. If the difference satisfies the threshold criterion (e.g., the difference is large enough to justify the effort required for a re-plan or a re-plan is otherwise desirable), then at 712 the estimation re-plan request is generated. The re-plan request may specify the type of re-plan (e.g., an identification of the estimated parameter on which the re-plan is based, such as mass), as well as a suggested or requested parameter value (e.g., a value of the mass corresponding to the experienced value) to be used as part of the request re-plan. At 714, the estimation re-plan request is forwarded, for example, to an arbiter module (e.g., arbiter module 526).

Figure 8:
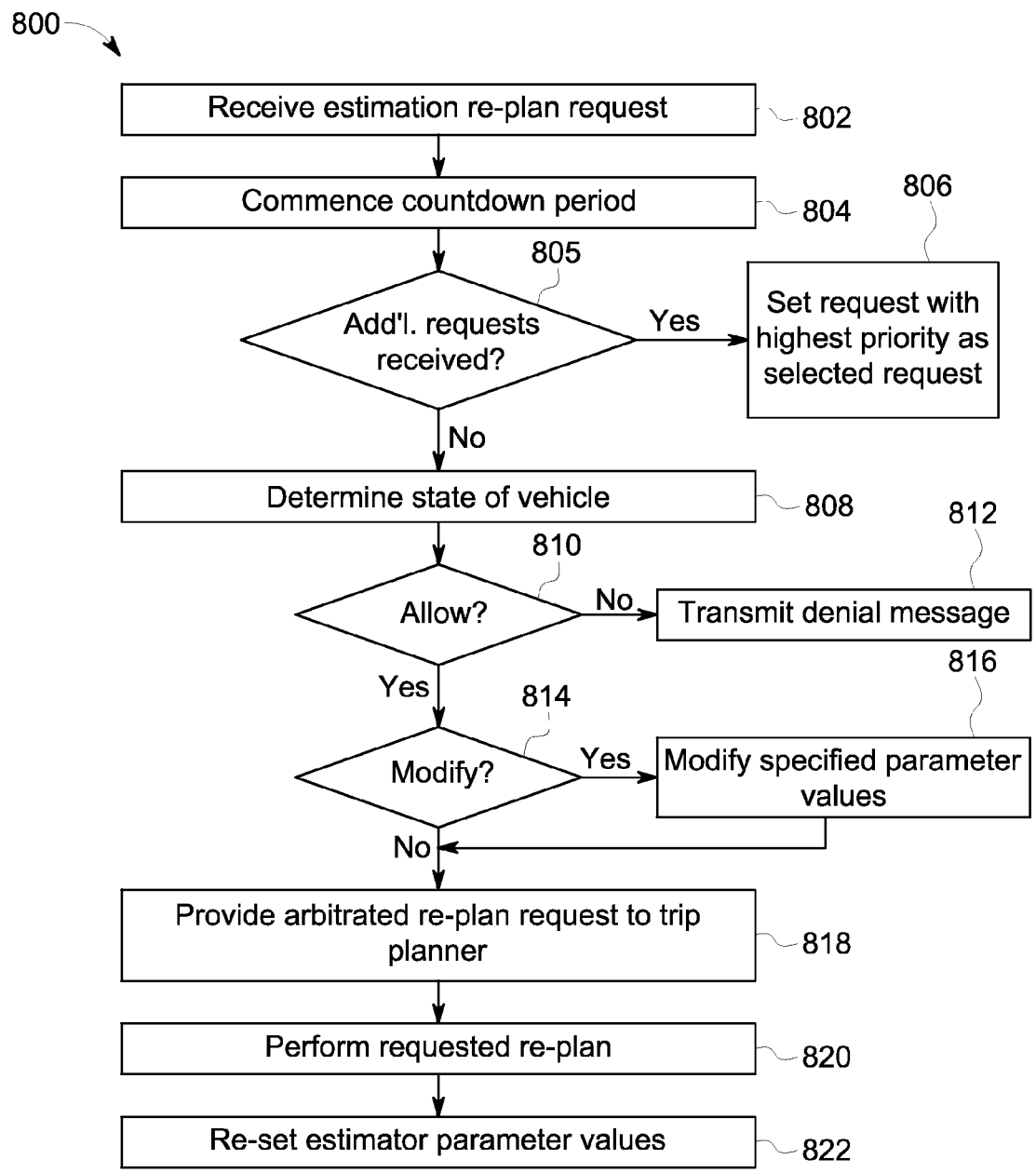
FIG. 8 illustrates a flowchart of a method for determining whether to perform an estimation re-plan, according to an embodiment of the invention.

FIG. 8 illustrates a flowchart of a method 800 for determining whether to perform an estimation re-plan in accordance with one example of the present inventive subject matter. The method may be performed, for example, using certain components, equipment, structures, or other aspects of embodiments discussed above. In certain embodiments, certain steps may be added or omitted, certain steps may be performed simultaneously or concurrently with other steps, certain steps may be performed in different order, and certain steps may be performed more than once, for example, in an iterative fashion. In various embodiments, portions, aspects, and/or variations of the method may be able to be used as one or more algorithms to direct hardware to perform operations described herein.

At 802, an estimation re-plan request is received. For example, an estimation re-plan request (e.g., a request generated at 712 and forwarded at 714) may be received by an arbiter module of an energy management processing unit as discussed herein. The estimation re-plan request may specify a type of request (e.g., based on parameter to be modified for re-planning such as mass or horsepower, among others) and a suggested or proposed new value to be used in re-planning. For example, a mass estimation request based on a determined or estimated experienced mass may specify the value of the experienced mass as a value to be used in re-planning a trip.

At 804, a countdown period is commenced. The countdown period may have a predetermined duration, such as one minute or two minutes, among others. During the countdown period, any additional estimation re-plan requests (e.g., requests from a different estimator module and/or corresponding to a different planning parameter to be varied than the request received at 802) are collected.

At 805, it is determined if one or more additional estimation re-plan requests have been received during the countdown period. If other estimation re-plan requests were received, the method 800 proceeds toward 806. At 806, the estimation re-plan request having a highest priority is selected for further evaluation. A message may be sent to any estimators providing requests having a lower priority, informing the estimators that the corresponding requests were denied, and the estimators having denied request may re-evaluate the requests (e.g., using new parameters corresponding to the selected request). The priority may be based, for example, on reliability of the estimates, and/or on whether a given estimator module uses a value from another estimate as discussed herein. It may be noted that, in some embodiments, more than one request may be selected. For example, certain estimates may not conflict with, depend upon, or otherwise relate to each other so that corresponding re-plan requests for each estimate may be implemented at or near the same time. If no other requests are received during the countdown period, the only received request may be identified as the selected request and the method 800 may proceed toward 808.

At 808, the state of the vehicle is determined. The state of the vehicle may be utilized, for example, to determine whether to deny, accept, or modify the selected estimation re-plan request. The state of the vehicle may describe, for example, whether the air brakes are currently applied (and/or would be applied at the time of a requested re-plan), whether the dynamic brakes are currently applied (and/or would be applied at the time of a requested re-plan), whether the throttle is in a relatively high state, or the like (and/or would be applied at the time of a requested re-plan).

At 810, it is determined if the selected request is to be allowed. For example, if the selected request is for an air brake re-plan and the air brakes are expected to be applied during the re-plan or at a close period in time to the re-plan (e.g., shortly after the re-plan at a time when control signals from the re-plan will be initially implemented in controlling the vehicle), the selected request may be denied, and the method 800 may proceed to 812. At 812, a message indicating the denial of the request is transmitted to the appropriate estimator module(s). The appropriate estimator module(s) may re-evaluate the request, for example at a later time after the vehicle is no longer in the state preventing the implementation of the re-plan request.

If, at 810, it is determined to allow the selected request, the method 800 may proceed to 814, where it is determined if one or more parameters specified by the estimation re-plan request are to be modified. For example, if the vehicle system is operating at a relatively high throttle level, requests specifying changes to parameters that would result in undesirably abrupt changes in vehicle operation may be modified to specify values that may provide slightly less accurate estimates but provide for smoother operation of the vehicle system. If modification is to be performed, the method 800 proceeds to 816 and the specified parameter value(s) are modified. If modification is not to be performed, the method 800 proceeds to 818.

At 818, an arbitrated re-plan request is provided to a trip planner. The arbitrated re-plan request may include one or more requests received during a countdown period, and may specify a parameter value that is the same as a value specified by an estimation re-plan request, or that may be modified from the value of the estimation re-plan request. It may be noted that the re-plan request may be provided directly to the trip planner in some embodiments, and indirectly in others (e.g., the request may be provided to a supervisor module as discussed herein for determination of whether or not the request is forwarded to a trip planner).

At 820, the requested re-plan is performed. The re-plan may be performed using a value of a parameter specified by the arbitrated re-plan request (e.g., a value that has been modified at 816). At 822, after the requested re-plan is implemented, one or more values of parameters used by estimators may be re-set to values used in implementing the re-plan at 820. For example, if a mass estimate is revised, one or more estimator modules (e.g., air brake estimator module) may receive the revised mass estimate value and use the mass estimate for future estimates. As another example, the "expected" or "current" value to which an estimator compares an experienced value to may be changed to reflect the value used for the most recent re-plan. For instance, after a mass estimate re-plan, the mass estimator module may use the most recent mass estimate used in a re-plan as the "expected" mass.

Thus, various examples of the inventive subject matter provide for improved trip planning, for example by improving the accuracy or reliability of values used to plan or re-plan a trip.

In an embodiment, a system comprises a processing unit (e.g., an energy management processing unit) configured to be disposed onboard a vehicle system. The processing unit comprises a first module (e.g., a trip planning module) configured to plan a trip profile specifying power settings (and/or other settings) for performing a mission based on trip data. The trip data includes a plurality of parameters having expected values. The processing unit further comprises one or more second modules (e.g., estimator modules) configured to: estimate respective experienced values of the plurality of parameters used by the first module to plan the trip profile; determine respective differences between the experienced values and the expected values; and generate respective re-plan requests (e.g., estimation re-plan requests) of the trip profile when any of the differences exceed respective thresholds. The processing unit further comprises a third module (e.g., an arbiter module) configured to: receive the re-plan requests from the one or more second modules; determine whether a re-plan is to be performed pursuant to a first one of the re-plan requests based on at least one of a state of the vehicle system and/or an additional one or more of the re-plan requests; and provide an arbitrated re-plan request to the first module for re-planning the trip profile when a determination is made by the third module that the re-plan is to be performed.

In one example of the inventive subject matter, a system includes an energy management processing unit. The energy management processing unit is configured to be disposed onboard a vehicle system, and includes a trip planning module, a plurality of estimator modules, and an arbiter module. The trip planning module is configured to plan a trip profile specifying power settings for performing a mission based on trip data including a plurality of parameters having expected values. The estimator modules are configured to estimate respective experienced values of the plurality of parameters used by the trip planning module to plan the trip profile, determine respective differences between the experienced values and the expected values, and generate respective estimation re-plan requests of the trip profile when any of the differences exceed respective thresholds. The arbiter module is configured to receive the estimation re-plan requests from the plurality of estimator modules, determine whether a re-plan is to be performed pursuant to a first one of the estimation re-plan requests based on at least one of a state of the vehicle system or an additional one or more of the estimation re-plan requests, and provide an arbitrated re-plan request to the trip planning module for re-planning the trip profile when a determination is made by the arbiter module that the re-plan is to be performed.

In one aspect, the arbiter module is configured to select among the estimation re-plan requests based on a predetermined priority ranking.

In one aspect, the arbiter module is configured to select the first estimation re-plan request over a second one of the estimation re-plan requests when one or more of the parameters corresponding to the second estimation re-plan request depend on one or more of the parameters specified by the first estimation re-plan request.

In one aspect, the arbiter module is configured to select the first estimation re-plan request over a second one of the estimation re-plan requests when the first estimation re-plan request is determined to be more reliable than the second estimation re-plan request.

In one aspect, the arbiter module is configured to adjust a value of the first estimation re-plan request to provide a corresponding modified value for the arbitrated re-plan request. For example, in one aspect, the arbiter module is configured to adjust the value of the first estimation re-plan request based on the state of the vehicle system.

In one aspect, the system further includes a supervisor module. The supervisor module is configured to receive the arbitrated re-plan request from the arbiter module and determine whether to forward the arbitrated re-plan request to the trip planning module based on a planning state of the vehicle system.

In one example of the inventive subject matter, a method includes obtaining, with one or more processors, a first estimation re-plan request, the first estimation re-plan request based on a difference between an expected value and an experienced value of a parameter used to generate a trip profile for a vehicle system. The method also includes determining, with the one or more processors, whether a re-plan is to be performed pursuant to the first estimation re-plan request based on at least one of a state of the vehicle system or one or more additional estimation re-plan requests. Further, the method includes generating an arbitrated re-plan request for re-planning the trip profile when it is determined to perform the re-plan.

In one aspect, determining whether a re-plan is to be performed includes selecting among a plurality of estimation re-plan requests, the plurality of estimation re-plan requests including the first estimation re-plan requests and the one or more additional estimation re-plan requests, based on a predetermined priority ranking.

In one aspect, the method includes selecting the first estimation re-plan request over a second estimation re-plan request of the one or more additional estimation re-plan requests when one or more parameters corresponding to the second estimation re-plan request depend on one or more parameters specified by the first estimation re-plan request.

In one aspect, the method includes selecting the first estimation re-plan request over a second estimation re-plan request of the one or more additional estimation re-plan requests when the first estimation re-plan request is determined to be more reliable than the second estimation re-plan request.

In one aspect, the method includes adjusting a value of the first estimation re-plan request to provide a corresponding modified value for the arbitrated re-plan request. For example, in one aspect, the adjusting the value is performed based on the state of the vehicle system.

In one aspect, the method includes determining, with the one or more processors, whether the arbitrated re-plan request is implemented based on a planning state of the vehicle system.

In one example of the inventive subject matter, a tangible and non-transitory computer readable medium includes one or more computer software modules configured to direct one or more processors to obtain a first estimation re-plan request, the first estimation re-plan request based on a difference between an expected value and an experienced value of a parameter used to generate a trip profile for a vehicle system. The one or more computer software modules are also configured to direct the one or more processors to determine whether a re-plan is to be performed pursuant to the first estimation re-plan request based on at least one of a state of the vehicle system or one or more additional estimation re-plan requests. The one or more computer software modules configured to direct one or more processors to generate an arbitrated re-plan request for re-planning the trip profile when it is determined to perform the re-plan.

In one aspect, the one or more computer software modules are configured to direct the one or more processors to select among a plurality of estimation re-plan requests, the plurality of estimation re-plan requests including the first estimation re-plan requests and the one or more additional estimation re-plan requests, based on a predetermined priority ranking.

In one aspect, the one or more computer software modules are configured to direct the one or more processors to select the first estimation re-plan request over a second estimation re-plan request of the one or more additional estimation re-plan requests when one or more parameters corresponding to the second estimation re-plan request depend on one or more parameters specified by the first estimation re-plan request.

In one aspect, the one or more computer software modules are configured to direct the one or more processors to select the first estimation re-plan request over a second estimation re-plan request of the one or more additional estimation re-plan requests when the first estimation re-plan request is determined to be more reliable than the second estimation re-plan request.

In one aspect, the one or more computer software modules are configured to adjust a value of the first estimation re-plan request to provide a corresponding modified value for the arbitrated re-plan request. For example, in one aspect, the one or more computer software modules are configured to adjust the value based on a state of the vehicle system.

Although some embodiments of the inventive subject matter are described with respect to rail vehicles, or railway transportation systems (specifically trains and locomotives having diesel engines), embodiments of the inventive subject matter also may be applicable for other uses, such as, but not limited to, off-highway vehicles (e.g., vehicles that are not designed or legally permitted for travel on public roadways), marine vessels, stationary units, agricultural vehicles, transport buses, etc., each which may use at least one engine (e.g., a diesel engine, an electric engine, a hybrid engine, or an internal combustion engine). Toward this end, when discussing a specified mission, this includes a task or requirement to be performed by the powered system. Therefore, with respect to railway vehicles, marine, transport vehicles, agricultural vehicles, or off-highway vehicle applications, this may refer to the movement of the system from a present location to another location, such as a destination. In the case of stationary applications, such as but not limited to a stationary power generating station or network of power generating stations, a specified mission may refer to an amount of wattage (e.g., MW/hr) or other parameter or requirement to be produced by the powered system. Likewise, operating condition of the generating unit may include one or more of speed, load, fueling value, timing, etc. Furthermore, though diesel powered systems are disclosed, the inventive subject matter described herein may also be utilized with non-diesel powered systems, such as but not limited to natural gas powered systems, bio-diesel powered systems, electric powered systems, hybrid systems, etc. Furthermore, as disclosed herein such non-diesel powered systems, as well as diesel powered systems, may include multiple engines, other power sources, and/or additional power sources, such as, but not limited to, battery sources, voltage sources (such as but not limited to capacitors), chemical sources, pressure based sources (such as but not limited to spring and/or hydraulic expansion), current sources (such as but not limited to inductors), inertial sources (such as but not limited to flywheel devices), gravitational-based power sources, and/or thermal-based power sources.

In one exemplary example involving marine vessels, a plurality of tugs may be operating together where all are moving the same larger vessel, where each tug is linked in time to accomplish the mission of moving the larger vessel. In another exemplary example a single marine vessel may have a plurality of engines. Off highway vehicles (OHV) may involve a fleet of vehicles that have a same mission to move earth, from location A to location B, where each OHV is linked in time to accomplish the mission. With respect to a stationary power generating station, a plurality of stations may be grouped together collectively generating power for a specific location and/or purpose. In another embodiment, a single station is provided, but with a plurality of generators making up the single station. In one example involving locomotive vehicles, a plurality of diesel powered systems may be operating together where all are moving the same larger load, where each system is linked in time to accomplish the mission of moving the larger load. In another embodiment, a locomotive vehicle may have more than one diesel powered system.

Embodiments of the inventive subject matter provide methods, systems, and computer implemented methods, such as a computer software code, for determining when to request a revised mission plan from a computer-readable instruction that, when executed by one or more processors, cause the one or more processors to generate a mission plan for a powered system. With respect to locomotives, embodiments of the inventive subject matter are can be operable when the locomotive consist is in distributed power (DP) operation.

An apparatus, such as a data processing system, including a computer (CPU), memory, input/output (I/O), program storage, a connecting bus, and other appropriate components, could be programmed or otherwise designed to facilitate the practice of the methods described herein. Such a system would include appropriate program means for executing the methods described herein.

An article of manufacture, such as a pre-recorded disk or other similar computer program product, for use with a data processing system, could include a storage medium and program means recorded thereon for directing the data processing system to facilitate the practice of the methods described herein. Such apparatus and articles of manufacture also fall within the spirit and scope of the inventive subject matter described herein.

At least one technical effect is to determine when to request a revised mission plan from a computer-readable instruction that, when executed by one or more processors, cause the one or more processors to generate a mission plan for a powered system. To facilitate an understanding of one or more embodiments of the inventive subject matter, the embodiments are described with reference to specific implementations thereof. Embodiments of the inventive subject matter may be described in the general context of computer-executable instructions, such as program modules, being executed by any device, such as but not limited to a computer, designed to accept data, perform prescribed mathematical and/or logical operations usually at high speed, where results of such operations may or may not be displayed. Generally, program modules include routines, programs, objects, components, data structures, etc. that performs particular tasks or implement particular abstract data types. For example, the software programs that underlie one or more embodiments of the inventive subject matter can be coded in different programming languages, for use with different devices, or platforms. In the description that follows, examples of the inventive subject matter may be described in the context of a web portal that employs a web browser. It will be appreciated, however, that the principles that underlie one or more embodiments of the inventive subject matter can be implemented with other types of computer software technologies as well.

One or more embodiments of the inventive subject matter may be practiced with other computer system configurations, including hand-held devices, multiprocessor systems, microprocessor-based or programmable consumer electronics, minicomputers, mainframe computers, and the like. One or more embodiments of the inventive subject matter described herein may be practiced in distributed computing environments where tasks are performed by remote processing devices that are linked through a communications network. In a distributed computing environment, program modules may be located in both local and remote computer storage media including memory storage devices. These local and remote computing environments may be contained entirely within the locomotive, or adjacent locomotives in consist, or off-board in wayside or central offices where wireless communication is used.

As used herein, a vehicle consist or vehicle system may be described as having one or more vehicles in succession, connected together so as to provide motoring and/or braking capability. In one aspect, the propulsion-generating vehicles can be connected together with no non-propulsion-generating vehicles between the propulsion-generating vehicles. Optionally, the vehicles may not be connected but may travel with other vehicles in a group. A vehicle system may have one or more vehicle consists within the vehicle system. For example, a vehicle system can include a first consist formed from one or more propulsion-generating vehicles, a second consist formed from one or more propulsion-generating vehicles, and one or more non-propulsion-generating vehicles disposed between the first and second consists. With respect to rail vehicles, a train can have more than one locomotive consist in the train.

In a vehicle system having multiple consists, there can be a lead consist and more than one remote consists, such as midway in the line of non-propulsion-generating vehicles and another remote consist at the end of the vehicle system. Each consist may have a first propulsion-generating vehicle and one or more trail propulsion-generating vehicles. The first vehicle along a direction of travel may be referred to as the lead locomotive or may be located in a trailing position within the vehicle system. Although a consist is usually viewed as successive propulsion-generating vehicles, a consist also may be recognized as a consist even when at least one non-propulsion-generating vehicle separates the propulsion-generating vehicles in the consist, such as when the consist is configured for DP operation with throttle and braking commands being relayed from the lead vehicle to the remote vehicles by a radio link or physical cable. Toward this end, the term "consist" may not be considered a limiting factor when discussing multiple propulsion-generating vehicles within the same vehicle system.

As disclosed herein, a consist may also be applicable when referring to other powered systems, but not limited to, as marine vessels, off-highway vehicles, transportation vehicles, agricultural vehicles, and/or stationary power plants, that operate together so as to provide motoring, power generation, and/or braking capability. Therefore even though locomotive consist is used herein, this term may also apply to other powered systems. Similarly, sub-consists may exist. For example, the powered system may have more than one power generating unit. A power plant may have more than one electric power unit where planning may occur at the sub-consist level. Likewise, a vehicle may have more than one power unit.

Referring now to the drawings, embodiments of the inventive subject matter is described. Example embodiments of the inventive subject matter can be implemented in numerous ways, including as a system (including a computer processing system), a method (including a computerized method), an apparatus, a computer readable medium, a computer program product, a graphical user interface, including a web portal, or a data structure tangibly fixed in a computer readable memory. Several embodiments of the inventive subject matter are discussed below.

Figure 9:
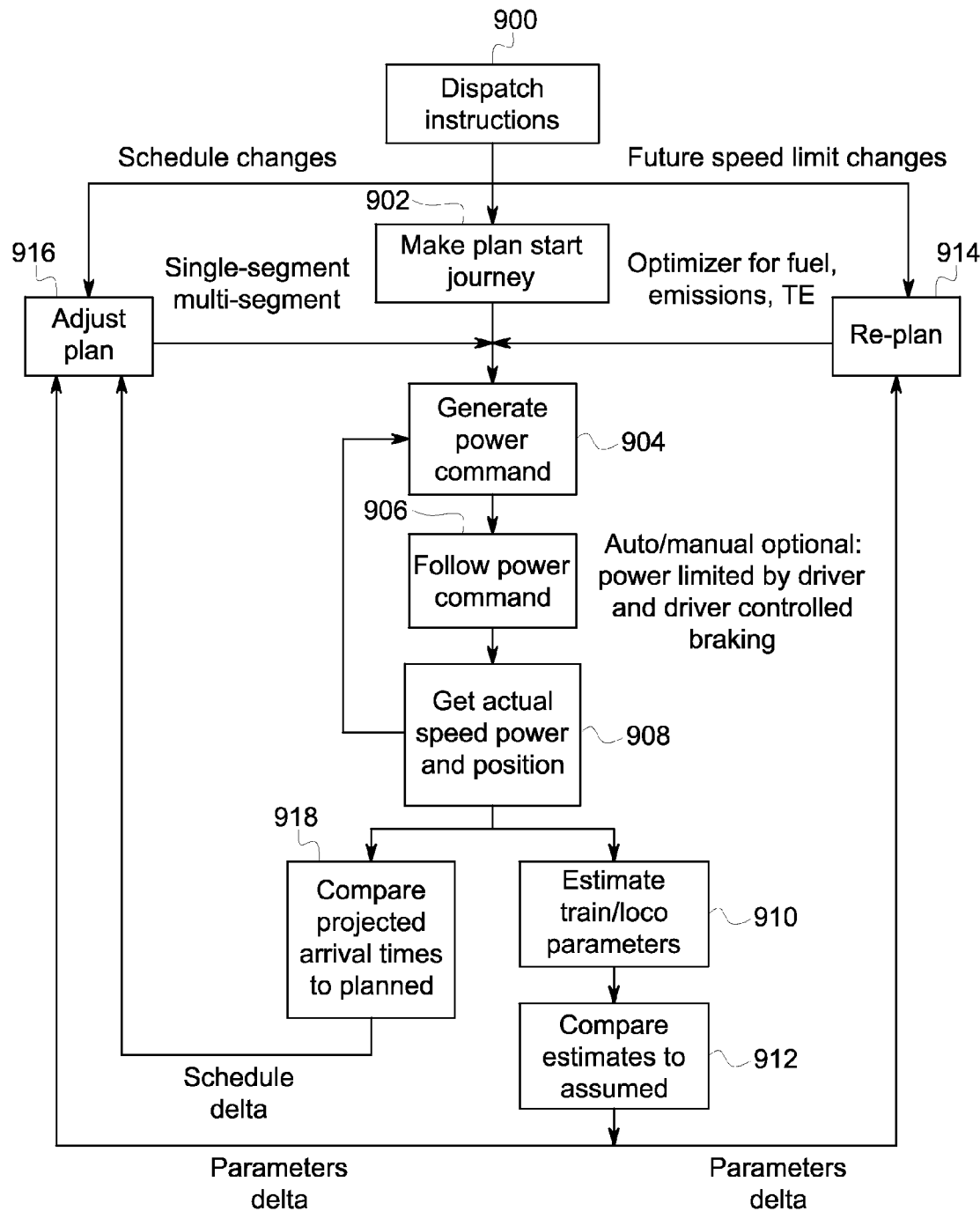
FIG. 9 depicts an exemplary illustration of a flow chart of a method for trip planning.
Figure 10:
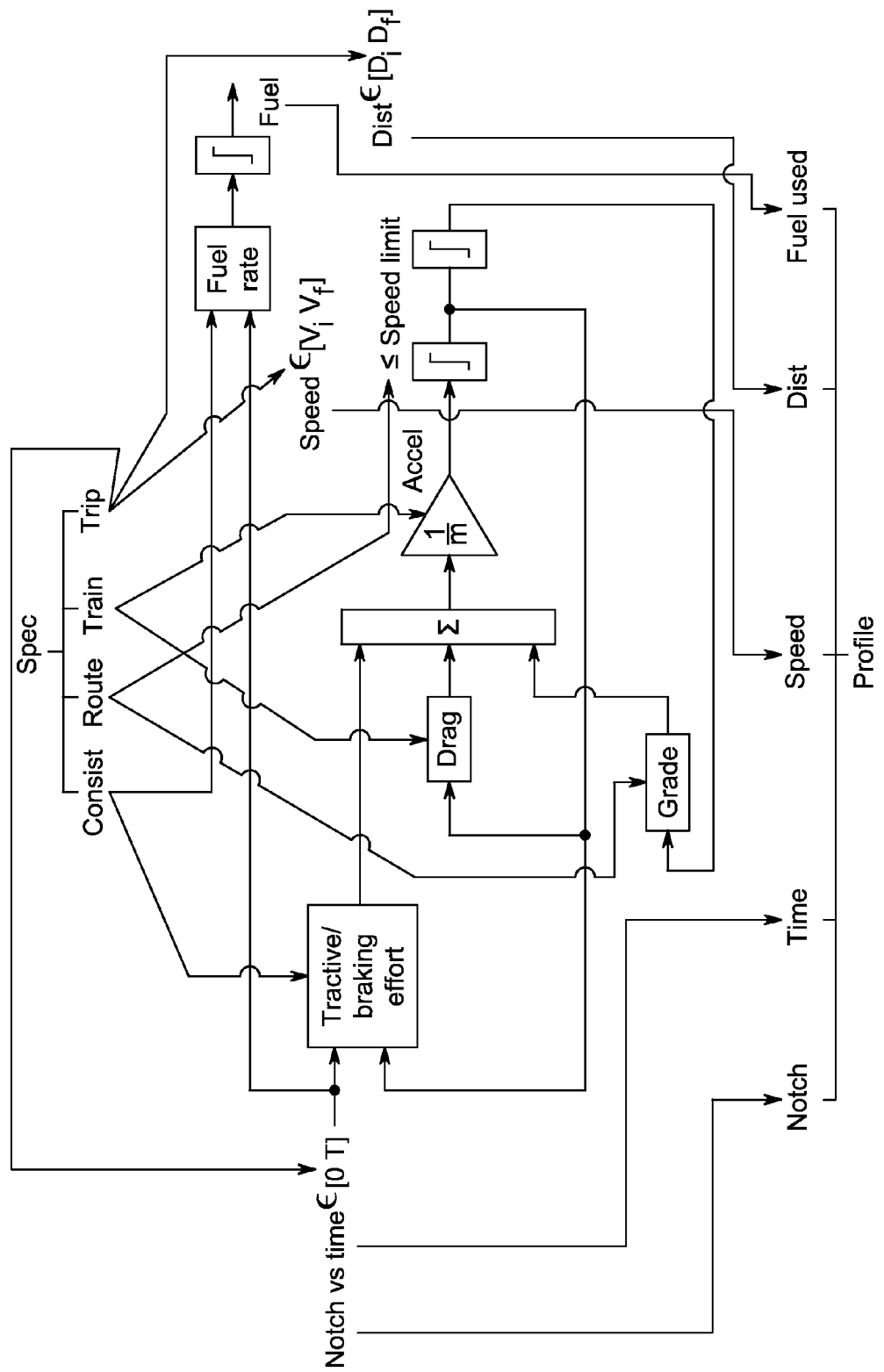
FIG. 10 depicts a mathematical model of a vehicle system that may be employed in connection with one or more embodiments of the subject matter described herein.

FIG. 9 illustrates a flow chart of one embodiment of a method for planning a mission of a powered system. The mission that is planned may be a trip of a vehicle system. As illustrated, instructions are input specific to planning a trip either onboard or from a remote location, such as a dispatch center 900. Such input information includes, but is not limited to, vehicle system position, consist description (such as vehicle models), vehicle power description, performance of vehicle traction transmission, consumption of engine fuel as a function of output power, cooling characteristics, the intended trip route (effective track grade and curvature as function of milepost or an "effective grade" component to reflect curvature following standard railroad practices), the vehicle system represented by makeup of non-propulsion-generating vehicles and loading together with effective drag coefficients, trip desired parameters including, but not limited to, start time and location, end location, desired travel time, crew (user and/or operator) identification, crew shift expiration time, and route.

This data may be provided to an energy management system of a propulsion-generating vehicle 1142 in a number of ways, such as, but not limited to, an operator manually entering this data into the vehicle 1142 via an onboard display, inserting a memory device such as a hard card and/or USB drive containing the data into a receptacle aboard the locomotive, and transmitting the information via wireless communication from a central or wayside location 1141, such as a route signaling device and/or a wayside device, to the vehicle 1142. Load characteristics (e.g., drag) of the vehicle 1142 and the vehicle system 1131 (that includes the vehicle 1142) may change over the route (e.g., with altitude, ambient temperature, and condition of the route and vehicles), and the plan may be updated to reflect such changes as needed by any of the methods discussed above and/or by real-time autonomous collection of vehicle conditions. This includes, for example, changes in vehicle or vehicle system characteristics detected by monitoring equipment on or off board the vehicle 1142.

The signal system can determine the allowable speed of the vehicle system. There are many types of signal systems and the operating rules associated with each of the signals. For example, some signals have a single light (on/off), some signals have a single lens with multiple colors, and some signals have multiple lights and colors. These signals can indicate the route is clear and the vehicle system may proceed at an allowable speed (e.g., a speed limit of the route). The signal system can also indicate a reduced speed or stop is required. This reduced speed may need to be achieved immediately, or at a certain location (e.g. prior to the next signal or crossing).

The signal status is communicated to the vehicle system and/or operator through various ways. Some systems have circuits in the route and inductive pick-up coils on the vehicles. Other systems have wireless communications systems. Signal systems can also involve the operator visually inspecting the signal and taking the appropriate actions.

The signaling system may interface with the on-board signal system and adjust the vehicle speed according to the inputs and the appropriate operating rules. For signal systems that involve the operator visually inspecting the signal status, the operator screen can present the appropriate signal options for the operator to enter based on the location of the vehicle. The type of signal systems and operating rules, as a function of location, may be stored in an onboard database 1163.

Based on the specification data that is input into the energy management system, a plan that reduces fuel use and/or emissions produced subject to speed limit constraints along the route with desired start and end times is computed to produce a trip profile or trip plan 902. The plan designates operational settings (e.g., speed and power or notch settings) that the vehicle system is to follow, expressed as a function of distance and/or time, and such vehicle system operating limits (including but not limited to, upper limits on notch power and brake settings), speed limits as a function of location, and/or the expected fuel consumed and emissions generated. The plan may reduce fuel use and/or emission production relative to the vehicle system traveling along the same route, from the same starting location to the same destination location, with the same start time and the same end time, but with different operational settings than the trip plan.

In one embodiment, the value for the notch setting is selected to obtain throttle change decisions about once every ten to thirty seconds. The throttle change decisions may occur at a longer or shorter duration, if needed and/or desired to follow a trip plan. In a broader sense, the trip plan can provide power settings for the vehicle system, either at the level of the entire vehicle system, at the level of a consist within the vehicle system, and/or level of an individual vehicle within a consist and/or vehicle system. Power can include braking power, motoring power, and airbrake power. In another embodiment, instead of operating at discrete notch power settings, one embodiment of the energy management system is able to select a continuous power setting determined for the selected trip plan. Thus, for example, if a trip plan specifies a notch setting of 6.8, instead of operating at notch setting 7, the vehicle 1142 can operate at 6.8. Allowing such intermediate power settings may bring additional efficiency benefits as described below.

The procedure used to compute the trip plan can be any number of methods for computing a power sequence that drives a vehicle system 1131 to reduce fuel and/or emissions subject to operating and schedule constraints. In some cases, the trip plan may be close enough to one previously determined, owing to the similarity of the configuration of the vehicle system, route, and environmental conditions from a previous trip and a current or upcoming trip. In these cases, it may be sufficient to look up a previous trip plan within a database 1163 and attempt to follow it. When no previously computed plan is suitable, methods to compute a new one include, but are not limited to, direct calculation of the trip plan using differential equation models which approximate the physics of motion of the vehicle system. The setup involves selection of a quantitative objective function, commonly a weighted sum (integral) of model variables that correspond to rate of fuel consumption and emissions generation plus a term to penalize excessive throttle variation.

A control formulation is set up to reduce the quantitative objective function subject to constraints including, but not limited to, speed limits and lower and upper limits on power (e.g., throttle) settings, upper limits on cumulative and instantaneous emissions, and the like. Depending on planning objectives at any time, the problem may be setup flexibly to reduce fuel consumption subject to constraints on emissions and speed limits, or to reduce emissions, subject to constraints on fuel use and arrival time. It is also possible to setup, for example, a goal to reduce the total travel time without constraints on total emissions or fuel use where such relaxation of constraints would be permitted or required for the mission.

Example equations and objective functions are presented below for reducing fuel consumption. These equations and functions are for illustration only as other equations and objective functions can be employed to reduce fuel consumption or to improve other vehicle or vehicle system operating parameters.

Mathematically, the problem to be solved may be stated more precisely. The basic physics are expressed by:

$$\frac{dx}{dt} = v; x(0) = 0.0; x(T_f) = D$$

$$\frac{dv}{dt} = T_e(u, v) - G_a(x) - R(v); v(0) = 0.0; v(t_f) = 0.0$$

where x represents the position of the vehicle system, v represents the velocity of the vehicle system, t represents time and/or distance (in miles, miles per hour, and minutes or hours as appropriate), and u represents the notch (e.g., throttle) command input. Further, D represents the distance to be traveled, $T_f$ the desired arrival time at distance D along the route, $T_e$ is the tractive effort produced by a vehicle consist or vehicle system, $G_a$ represents the gravitational drag on the vehicle system (which can depend on the length of the vehicle system, the vehicle makeup of the vehicle system, and terrain on which the vehicle system is located), R represents the net speed dependent drag of the vehicle consist and vehicle system combination. The initial and final speeds can also be specified, but without loss of generality are taken to be zero here (e.g., the vehicle system is stopped at the beginning and end of the trip). Finally, the model can be readily modified to include other dynamics such the lag between a change in throttle, u, and the resulting tractive effort or braking. Using this model, an optimal control formulation is set up to reduce the quantitative objective function subject to constraints including but not limited to, speed limits and lower and upper limits on power (e.g., throttle) settings. Depending on planning objectives, the problem may be setup flexibly to reduce fuel consumption subject to constraints on emissions and speed limits, or to reduce emissions, subject to constraints on fuel use and arrival time.

It is also possible to setup, for example, a goal to reduce the total travel time without constraints on total emissions or fuel use where such relaxation of constraints would be permitted or required for the mission. These performance measures can be expressed as a linear combination of one or more of the following:

$$\min_{u(t)} \int_0^{T_f} F(u(t)) dt$$

reduce total fuel consumption $$\min_{u(t)} T_f$$

reduce travel time $$\min_{u_i} \sum_{i=2}^{n_d} (u_i - u_{i-1})^2$$

reduce notch jockeying (piecewise constant input)

$$\min_{u(t)} \int_0^{T_f} \left(\frac{du}{dt}\right)^2 dt$$

reduce notch jockeying (continuous input)

$$\min_{u(t)} \int_0^{T_f} E(u(t)) dt$$

reduce total emissions consumption. In this equation, E represents the quantity of emissions in gm/hphr for each of the notches (or power settings). Additionally, a reduction or minimization could be done based on a weighted total of fuel and emissions.

One example of a representative objective function (OP) can be:

$$\min_{u(t)} \alpha_1 \int_0^{T_f} F(u(t)) dt + \alpha_3 T_f + \alpha_2 \int_0^{T_f} \left(\frac{du}{dt}\right)^2 dt$$

The coefficients of the linear combination depend on the importance (e.g., weight) given to each of the terms. Note that in equation (OP), u(t) is an optimizing variable that is the continuous notch position. If discrete notch is required, e.g. for older locomotives, the solution to equation (OP) can be discretized, which may result in lower fuel savings when compared to the continuous notch scenario. Finding a reduced or minimum time solution (e.g., with $\alpha_1$ set to zero and $\alpha_2$ set to zero or a relatively small value) can be used to find a lower bound for the achievable travel time ($T_f = T_{fmin}$). In this case, both u(t) and $T_f$ are optimizing variables. One embodiment solves the equation (OP) for various values of $T_f$ with $T_f > T_{fmin}$ with $\alpha_3$ set to zero. In this latter case, $T_f$ is treated as a constraint.

It may be necessary to adjoin constraints on the objective function, such as the speed limits along the path:

$$0 \leq v \leq SL(x)$$

where SL(x) represents a speed limit as a function of location or distance along a route;

or when using reduced or minimum time as the objective, that an end point constraint must hold, e.g., total fuel consumed must be less than what is in the tank, e.g., via:

$$0 < \int_0^{T_f} F(u(t)) dt \leq W_F$$

where $W_F$ is the fuel remaining in the tank at $T_f$. Equation (OP) can be in other forms as well and that what is presented above is one example equation for use in one embodiment of the inventive subject matter described herein. For example, a variation of equation (OP) may be used where multiple power systems, diesel and/or non-diesel, are used to provide multiple thrusters, such as but not limited to as may be used when operating a marine vessel.

Reference to emissions in the context of the one embodiment can be directed toward cumulative emissions produced in the form of oxides of nitrogen (NOx), carbon oxides (COx), unburned hydrocarbons (HC), particulate matter (PM), etc. Other emissions may include, but not be limited to, electromagnetic emission, such as radio frequency (RF) power output, measured in watts, for respective frequencies emitted by the vehicle. Yet another form of emission is the noise produced by the vehicle, typically measured in decibels (dB). An emission limitation may be established and may be variable based on a time of day, a time of year, and/or atmospheric conditions such as weather or pollutant level in the atmosphere. Emission regulations may vary geographically across a transportation system. For example, an operating area such as a city or state may have specified emission objectives, and an adjacent area may have different emission objectives, for example a lower amount of allowed emissions or a higher fee charged for a given level of emissions.

Accordingly, an emission profile for a certain geographic area may be tailored to include upper limits on emission values for each of the regulated emissions including in the profile to meet a predetermined emission objective required for that area. Typically, for a vehicle, these emission parameters are determined by, but not limited to, the power (e.g., notch) setting, ambient conditions, engine control method, etc. By design, vehicles may be compliant with EPA emission standards, and thus, in one embodiment that reduces emissions, this may refer to mission-total emissions, for which there may not be a current EPA specification. Operation of the vehicle according to the trip plan can be compliant with EPA emission standards. Other regulations may also be applicable, such as limitations on $CO_2$ emissions from international treaties.

If an objective during a trip mission is to reduce emissions, the equation (OP) can be amended to consider this trip objective. Flexibility in the setup is that any or all of the trip objectives can vary by geographic region or mission. For example, for a high priority train, travel time may be the only objective on one route because it is high priority traffic. In another example, emission output could vary from state to state along the planned train route.

To solve the resulting problem, in one embodiment, the energy management system transcribes a dynamic control problem in the time domain to an equivalent static mathematical programming problem with N decision variables, where the number N depends on the frequency at which throttle and braking adjustments are made and the duration of the trip. For some scenarios, this N can be in the thousands. For example, in one embodiment, suppose a train is traveling a 172-mile (276.8 kilometers) stretch of track in the southwest United States. Utilizing the one embodiment of the energy management system, a 7.6% savings in fuel used may be realized when comparing a trip determined and followed when compared to an actual driver throttle/speed history where the trip was determined by an operator. The improved savings is realized because the energy management system produces a driving strategy with both less drag loss and little or no braking loss compared to the trip plan of the operator.

Figure 11:
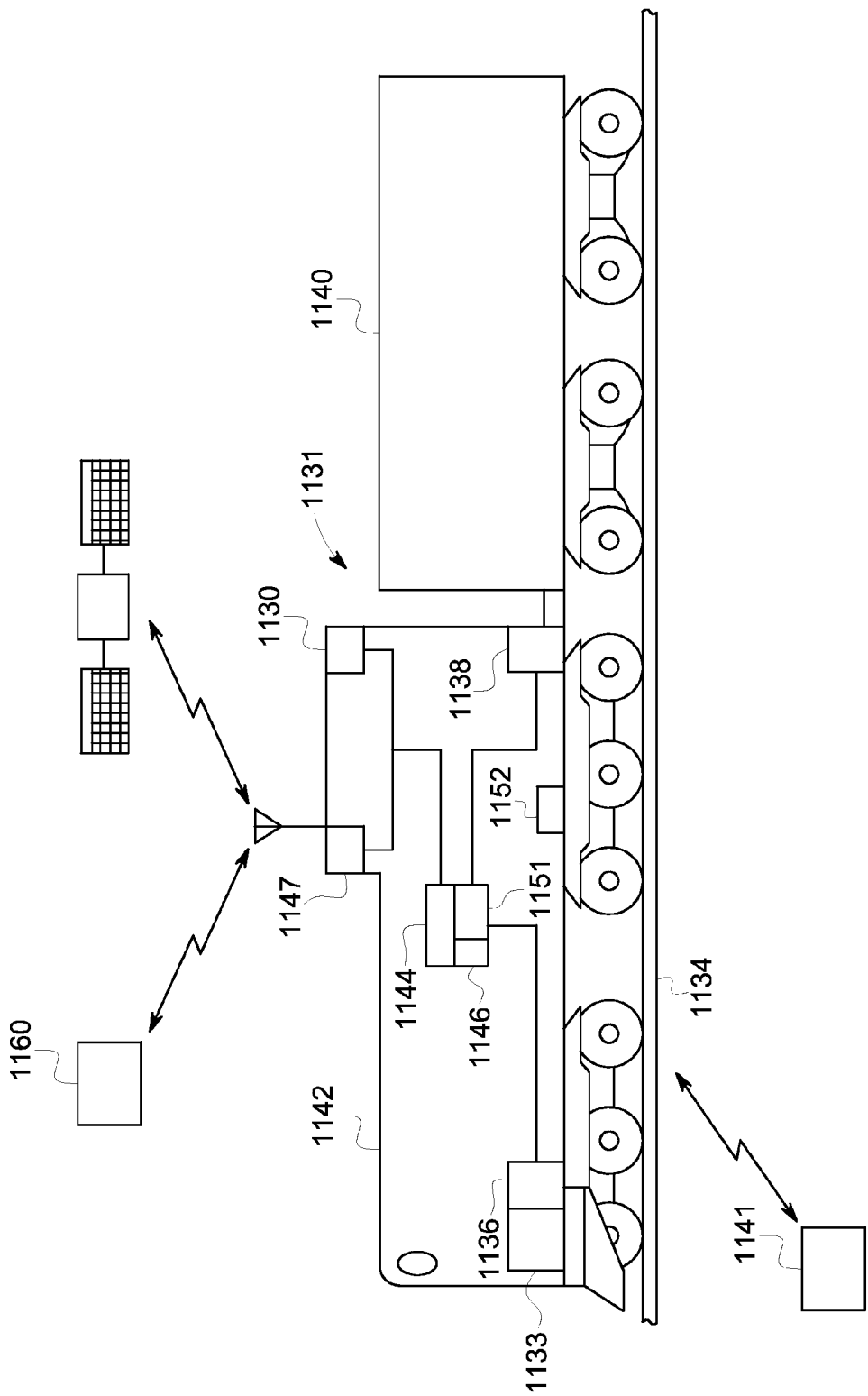
FIG. 11 depicts one embodiment of elements for trip planning.

To make the trip plan computationally tractable, a simplified mathematical model of the vehicle system may be employed, such as illustrated in FIG. 11 and the equations discussed above. As illustrated, certain set specifications, such as but not limited to information about the consist, route information, vehicle system information, and/or trip information, are considered to determine a trip plan. Such factors included in the trip plan include, but are not limited to, speed, distance remaining in the mission, and/or fuel used. As disclosed herein, other factors that may be included in the profile are notch setting and time. One refinement to the trip plan is produced by driving a more detailed model with the power sequence generated, to test if other thermal, electrical, and/or mechanical constraints are violated, leading to a modified trip plan with speed versus distance that is closest to a run that can be achieved without harming vehicle equipment (e.g., satisfying additional implied constraints such as thermal and electrical limits on the locomotive and inter-car forces in the train).

Referring back to FIG. 9, once the trip is started 902, power commands are generated 904 to put the plan in motion. Depending on the operational set-up of the energy management system, one command is for the vehicle 1142 to follow the power command 906 so as to achieve the speed designated by a trip plan. The energy management system obtains actual speed and power information from the consist of the vehicle system 908. Owing to the approximations in the models used for generating the trip plan, a closed-loop calculation of corrections to the power designated by the trip plan can be obtained to track the desired speed of the trip plan. Such corrections of operating limits can be made automatically or by the operator.

In some cases, the model used in generating the trip plan may differ significantly from the actual vehicle system. This can occur for many reasons, including but not limited to, extra cargo pickups or setouts, vehicles that fail en route, and errors in the initial database 1163 or data entry by the operator. For these reasons, a monitoring system can be in place that uses real-time data to estimate vehicle and/or vehicle system parameters in real time 910. The estimated parameters are then compared to the assumed parameters used when the trip was initially created 912. Based on differences in the assumed and estimated values, the trip may be re-planned 914, should large enough savings accrue from a new plan.

Other reasons a trip may be re-planned include directives from a remote location, such as dispatch and/or the operator requesting a change in objectives to be consistent with more global movement planning objectives. More global movement planning objectives may include, but are not limited to, schedules of other vehicle systems, allowing exhaust to dissipate from a tunnel, maintenance operations, etc. Another reason may be due to an onboard failure of a component. Strategies for re-planning may be grouped into incremental and major adjustments depending on the severity of the disruption, as discussed in more detail below. In general, a "new" plan can be derived from a solution to the problem equation (OP) described above, but frequently faster approximate solutions can be found, as described herein.

Figure 12:
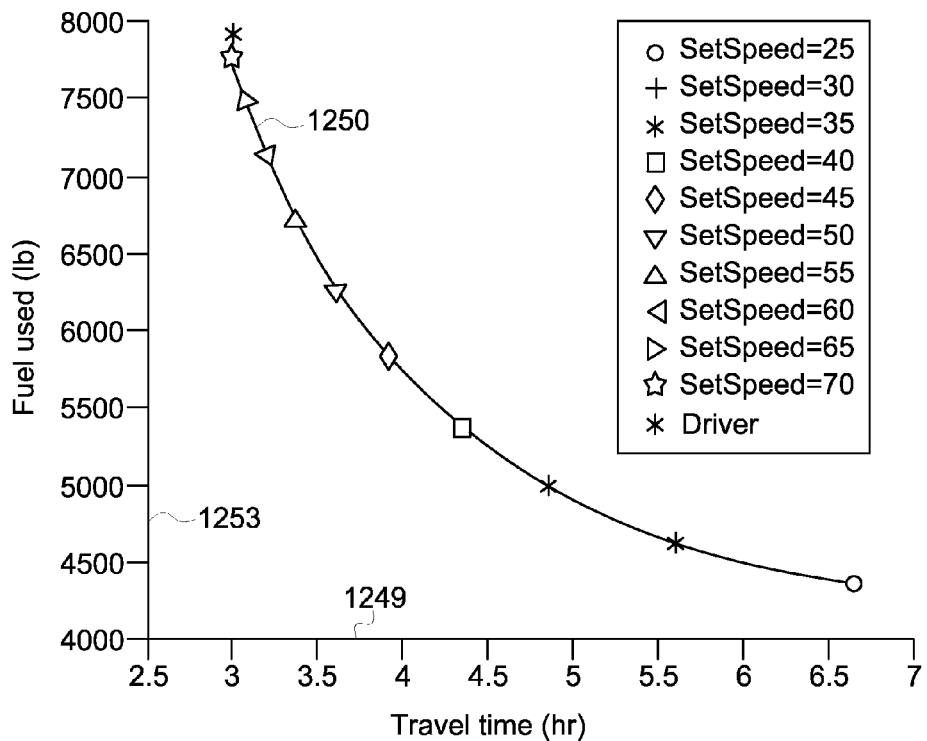
FIG. 12 depicts one embodiment of a fuel-use/travel time curve.

In operation, the vehicle 1142 can monitor system efficiency and update the trip plan based on the actual efficiency measured, whenever such an update would improve trip performance. Re-planning computations may be carried out entirely within the vehicle(s) or fully or partially moved to a remote location, such as dispatch or wayside processing facilities 1160 where wireless technology is used to communicate the plans to the vehicle 1142. The energy management system may generate efficiency trends that can be used to develop fleet data regarding efficiency transfer functions. The fleet-wide data may be used when determining the initial trip plan, and may be used for network-wide tradeoff when considering locations of a plurality of vehicle systems. For example, the travel-time fuel use tradeoff curve as illustrated in FIG. 12 reflects a capability of a vehicle system on a particular route at a current time, updated from ensemble averages collected for many similar vehicle systems on the same route. Thus, a central dispatch facility collecting curves like FIG. 12 from many energy management systems could use that information to better coordinate overall vehicle system movements to achieve a system-wide advantage in fuel use or throughput. Various fuel types, such as but not limited to diesel fuel, heavy marine fuels, palm oil, bio-diesel, etc., may be used.

Furthermore, various energy storage devices may be used. For example, the amount of power withdrawn from a particular source, such as a diesel engine and batteries, could be improved so that there is reduced fuel consumption/emission generation, which may be an objective function, is obtained. As further illustration, suppose the total power demand is 2000 horse power (HP) where the batteries can supply 1500 HP and the engine can supply 4400 HP, an optimum point could be when batteries are supplying 1200 HP and engine is supplying 800 HP.

Similarly, the amount of power may also be based the amount of energy stored and the need of the energy in the future. If there is long high demand coming for power, the battery could be discharged at a slower rate. For example, if 1000 horsepower hour (HPhr) is stored in the battery and the demand is 4400 HP for the next 2 hours, it may be optimum to discharge the battery at 800 HP for the next 1.25 hours and take 3600 HP from the engine for that duration.

Many events in daily operations can lead to a need to generate or modify a currently executing plan, where it desired to keep the same trip objectives, for when a first vehicle system is not on schedule for planned meet or pass with a second vehicle system and the first vehicle system needs to make up time. Using the actual speed, power and location of the first vehicle system, a comparison is made between a planned arrival time and the currently estimated (e.g., predicted) arrival time 918. Based on a difference in the times, as well as the difference in parameters (detected or changed by dispatch or the operator), the plan is adjusted 916. This adjustment may be made automatically following a company's desire for how such departures from plan should be handled or manually propose alternatives for the on-board operator and dispatcher to jointly decide the best way to get back on plan. Whenever a plan is updated but where the original objectives, such as but not limited to arrival time remain the same, additional changes may be factored in concurrently, e.g. new future speed limit changes, which could affect the feasibility of ever recovering the original plan. In such instances, if the original trip plan cannot be maintained, such as when the vehicle system is unable to meet the original trip plan objectives, as discussed herein other trip plan(s) may be presented to the operator and/or remote facility, or dispatch.

A re-plan may also be made when it is desired to change the original objectives. Such re-planning can be done at either fixed preplanned times, manually at the discretion of the operator or dispatcher, or autonomously when predefined limits, such a train operating limits, are exceeded. For example, if the current plan execution is running late by more than a specified threshold, such as thirty minutes, the trip plan can be revised to accommodate the delay at expense of increased fuel as described above or to alert the operator and dispatcher how much of the time can be made up at all (e.g., what time or fuel can be saved within a time constraint). Other triggers for re-plan can also be envisioned based on fuel consumed or the health of the power consist, including but not limited time of arrival, loss of horsepower due to equipment failure and/or equipment temporary malfunction (such as operating too hot or too cold), and/or detection of gross setup errors, such in the assumed load of the vehicle system. If the change reflects impairment in the performance of the vehicle system for the current trip, these may be factored into the models and/or equations used in generating and/or revising the trip plan.

Changes in plan objectives can also arise from a need to coordinate events where the plan for one vehicle system compromises the ability of another vehicle system to meet objectives and arbitration at a different level, e.g. the dispatch office is required. For example, the coordination of meets and passes may occur through communications between the vehicle systems. Thus, as one example, if a first vehicle system knows that it is behind in reaching a location for a meet and/or pass, communications from a second vehicle system train can notify the first vehicle system (and/or dispatch). The operator can then enter information pertaining to being late into the energy management system so the energy management system can recalculate the trip plan. The energy management system can also be used at a high level, or network-level, to allow a dispatch to determine which vehicle system of several should slow down or speed up should a scheduled meet and/or pass time constraint may not be met. As discussed herein, this is accomplished by vehicle systems communicating data to the dispatch to prioritize how each vehicle system should change its planning objective. A choice could depend either from schedule or fuel saving benefits, depending on the situation.

For any of the manually or automatically initiated re-plans, the energy management system may present more than one trip plan to the operator. The energy management system can present different plans to the operator, allowing the operator to select the arrival time and understand the corresponding fuel and/or emission impact. Such information can also be provided to the dispatch for similar consideration, either as a simple list of alternatives or as a plurality of tradeoff curves such as illustrated in FIG. 12.

The energy management system has the ability of learning and adapting to changes in the vehicle system and consist which can be incorporated either in the current plan and/or for future plans. For example, one of the triggers discussed above is loss of horsepower. When building up horsepower over time, either after a loss of horsepower or when beginning a trip, transition logic is utilized to determine when desired horsepower is achieved. This information can be saved in the database 1163 for use in planning future trips and/or the current trip should loss of horsepower occur again.

Likewise, in a similar fashion where multiple thrusters are available, each may need to be independently controlled. For example, a marine vessel may have many force producing elements, or thrusters, such as but not limited to propellers. Each propeller may need to be independently controlled to produce the optimum output. Therefore utilizing transition logic, the energy management system may determine which propeller to operate based on what has been learned previously and by adapting to key changes in the marine vessel's operation.

FIG. 11 depicts one embodiment of elements of that may part of an energy management system according to one embodiment. A locator element 1130 to determine a location of the vehicle system 1131 is provided. The locator element 1130 can be a global positioning system (GPS) sensor, or a system of sensors, that determine a location of the vehicle system 1131. Examples of such other systems may include, but are not limited to, wayside devices, such as radio frequency automatic equipment identification (RF AEI) Tags, dispatch, and/or video determination. Another system may include the tachometer(s) onboard a vehicle and distance calculations from a reference point. As discussed previously, a wireless communication system 1147 may also be provided to allow for communications between vehicle systems and/or with a remote location, such as dispatch. Information about travel locations may also be transferred from other vehicle systems. The system 1147 may include one or more antennas and associated transceiving circuitry.

A route characterization element 1133 provides information about a route, such as grade and elevation and curvature information. The route characterization element 1133 may include an on-board route integrity database 1136, which can store information about the health or damage to segments of the route. Sensors 1138 are used to measure tractive effort, a load 1140 being hauled by the vehicle 1142, throttle setting of the vehicle 1142, configuration information of the vehicle system 1131, speed of the vehicle system 1131, individual configuration of the vehicle 1142, individual capability of the vehicle 1142, etc. The configuration information of the vehicle 1142 may be loaded without the use of a sensor 1138, but is input by other approaches as discussed above. Furthermore, the health of the vehicles in the consist may also be considered. For example, if one locomotive in the consist is unable to operate above power notch level 5, this information is used when creating and/or revising the trip plan.

Information from the locator element 1130 may also be used to determine an appropriate arrival time of the vehicle system 1131. For example, if there is a vehicle system 1131 moving along a route 1134 towards a destination and no vehicle system is following behind it within a threshold distance (e.g., 10 kilometers, 50 kilometers, 100 kilometers, or the like), and the vehicle system has no fixed arrival deadline to adhere to, the locator element, including but not limited to radio frequency automatic equipment identification (RF AEI) Tags, dispatch, and/or video determination, may be used to gage the exact location of the vehicle system 1131.

Furthermore, inputs from these signaling systems may be used to adjust the speed of the vehicle system 1131. Using the on-board route database, discussed below, and the locator element, the energy management system can adjust the operator interface to reflect the signaling system state at the given location of the vehicle system. In a situation where signal states would indicate restrictive speeds ahead, the energy management system may elect to slow the vehicle system to conserve fuel consumption.

Information from the locator element 1130 may also be used to change planning objectives as a function of distance to destination. For example, owing to inevitable uncertainties about congestion along the route, "faster" time objectives on the early part of a route may be employed as hedge against delays that statistically occur later. If it happens on a particular trip that delays do not occur, the objectives on a latter part of the journey can be modified to exploit the built-in slack time that was banked earlier, and thereby recover some fuel efficiency. A similar strategy could be invoked with respect to emissions restrictive objectives, e.g. approaching an urban area.

As an example of the hedging strategy, if a trip is planned from New York to Chicago, the energy management system may have an option to operate the vehicle system slower at either the beginning of the trip or at the middle of the trip or at the end of the trip. The energy management system can create and/or revise the trip plan to allow for slower operation at the end of the trip since unknown constraints, such as but not limited to weather conditions, route maintenance, etc., may develop and become known during the trip.

As another consideration, if traditionally congested areas are known, the plan can be developed with an option to have more flexibility around these traditionally congested regions. Therefore, the energy management system may also consider weighting/penalty as a function of time/distance into the future and/or based on known/past experience. Such planning and re-planning can take into consideration weather conditions, route conditions, other vehicle systems on the route, etc., during the trip and adjust the trip plan accordingly.

FIG. 11 further discloses other elements that may be part of the energy management system. One or more processors 1144 are provided that are operable to receive information from the locator element 1130, route characterizing element 1133, and sensors 1138. One or more algorithms or software 1146 operate within and/or using the processors 1144. The algorithm 1146 can be used to compute a trip plan based on parameters involving the vehicle 1142, vehicle system 1131, route 1134, and objectives of the mission as described above. In one embodiment, the trip plan is established based on models for behavior of the vehicle system 1131 as the vehicle system 1131 moves along the route 1134 as a solution of non-linear differential equations derived from physics with simplifying assumptions that are provided in the algorithm. The energy management system can have access to the information from the locator element 1130, route characterizing element 1133, and/or sensors 1138 to create a trip plan that reduces fuel consumption and/or emission generation of a vehicle, vehicle consist, and/or vehicle system, establishes a desired trip time, and/or ensures proper crew operating time aboard the vehicle system. A driver or controller element 1151 also can be provided. The controller element 1151 can be used for controlling the vehicle system as the vehicle system follows the trip plan. The controller element 1151 can make operating decisions autonomously. In another embodiment, the operator may be involved with directing the vehicle system to follow the trip plan.

The energy management system may have the ability to initially create and quickly modify, on the fly (e.g., during movement of the vehicle system), a trip plan that is being executed. This includes creating the initial plan when a long distance is involved, owing to the complexity of the plan generation algorithm. When a total length of a trip plan exceeds a given distance, the energy management system may segment the trip by waypoints or other locations. The waypoint may include natural locations where the vehicle system 1131 stops, such as, but not limited to, sidings where a meet with opposing traffic, or pass with another vehicle system behind the current vehicle system is scheduled to occur on single-track route, or at yard sidings or industry where cars are to be picked up and set out, and locations of planned work. At such waypoints, the vehicle system 1131 may be at the location at a scheduled time and be stopped or moving with speed in a specified range. The time duration from arrival to departure at waypoints can be referred to as dwell time.

Figure 13:
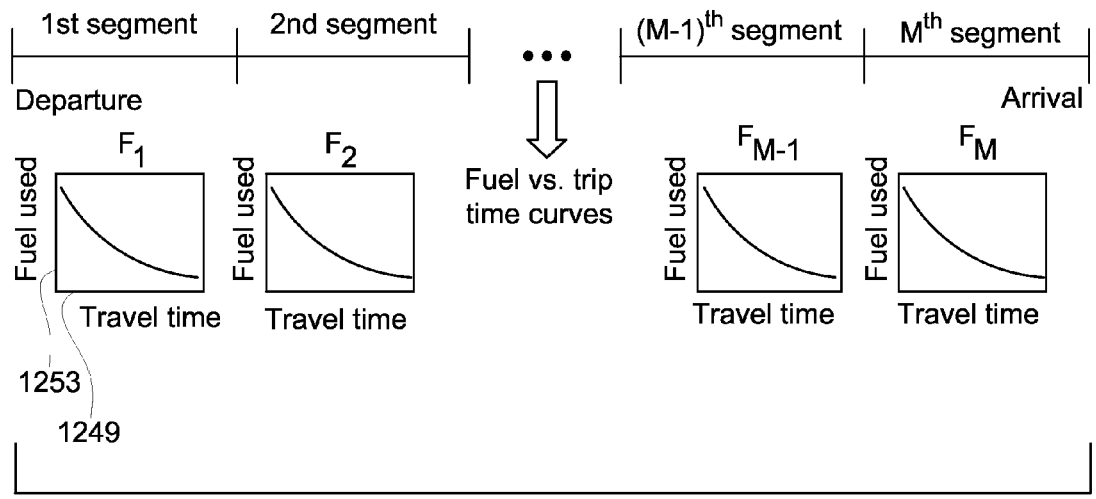
FIG. 13 depicts one embodiment of segmentation decomposition for trip planning.

The energy management system can break down a longer trip into smaller segments. The segments can be arbitrary in length, but may be picked at a natural location such as a stop or significant speed restriction, or at key mileposts that define junctions with other routes. Given a partition, or segment, selected in this way, a driving profile is created for each segment of the route as a function of travel time taken as an independent variable, such as shown in FIG. 12. The fuel used/travel-time tradeoff associated with each segment can be computed prior to the vehicle system 1131 reaching that segment of the route. A total trip plan can be created from the driving profiles created for each segment. The energy management system can distribute travel time amongst all the segments of the trip so that the total trip time required is satisfied and total fuel consumed over all the segments is reduced. An example segmented trip is disclosed in FIG. 13 and described below. Alternatively, the trip plan may comprise a single segment representing the complete trip.

FIG. 12 depicts one example embodiment of a fuel-use/travel time curve. As mentioned previously, such a curve 1250 can be created when calculating a trip plan for various travel times for each segment. For a given travel time 1249, fuel used 1253 is the result of a detailed driving profile computed as described above. Once travel times for each segment are allocated, a power/speed plan is determined for each segment from the previously computed solutions. If there are any waypoint constraints on speed between the segments, such as, but not limited to, a change in a speed limit, they are matched up during creation of the trip plan. If speed restrictions change in only a single segment, the fuel use/travel-time curve 1250 may be re-computed for only the segment changed. This reduces time for having to re-calculate more parts, or segments, of the trip. If the consist or vehicle system changes significantly along the route, e.g. from loss of a propulsion-generating vehicle or pickup or set-out of non-propulsion-generating vehicles, then driving profiles for all subsequent segments may be recomputed creating new instances of the curve 1250. These new curves 1250 can then be used along with new schedule objectives to plan the remaining trip.

Once a trip plan is created as discussed above, a trajectory of speed and power versus distance can be used to reach a destination with reduced fuel and/or emissions at the required trip time. There are several ways in which to execute the trip plan. As provided below in more detail, in one embodiment, in a coaching mode information is displayed to the operator for the operator to follow to achieve the designated power and speed of the trip plan. In this mode, the operating information is suggested operating conditions that the operator should use. In another embodiment, acceleration and maintaining a constant speed are performed. When the vehicle system 1131 is to be slowed, however, the operator can be responsible for applying a braking system 1152. In another embodiment, commands for powering and braking are provided as required to follow the desired speed-distance path of a trip plan.

Feedback control strategies can be used to provide corrections to the power control sequence in the trip plan to correct for such events as, but not limited to, load variations of the vehicle system caused by fluctuating head winds and/or tail winds. Another such error may be caused by an error in parameters of the vehicle system, such as, but not limited to, mass and/or drag, when compared to assumptions in the trip plan. A third type of error may occur with information contained in the database 1136. Another possible error may involve un-modeled performance differences due to the engine, traction motor thermal deration and/or other factors. Feedback control strategies compare the actual speed as a function of position to the speed in the trip plan. Based on this difference, a correction to the trip plan can be added to drive the actual velocity toward the velocity designated by the trip plan. To assure stable regulation, a compensation algorithm may be provided which filters the feedback speeds into power corrections to assure closed-performance stability is assured. Compensation may include standard dynamic compensation.

The energy management system may accommodate changes in trip objectives during travel of a vehicle system along the route for a trip according to a trip plan. In one embodiment, to determine the trip plan from point A to point B where there are stops along the way, and for updating the trip plan for the remainder of the trip once the trip has begun, a sub-optimal decomposition method can be usable for finding the trip plan. Using modeling methods, the computation method can find the trip plan with specified travel time and initial and final speeds, so as to satisfy speed limits and capability constraints of the vehicle system when there are stops. Though the following description is directed towards reducing fuel use, it can also be applied to improve other factors, such as, but not limited to, emissions, schedule, crew comfort, and load impact. The method may be used at the outset in developing a trip plan, and to adapt to changes in objectives after initiating a trip.

Figure 14:
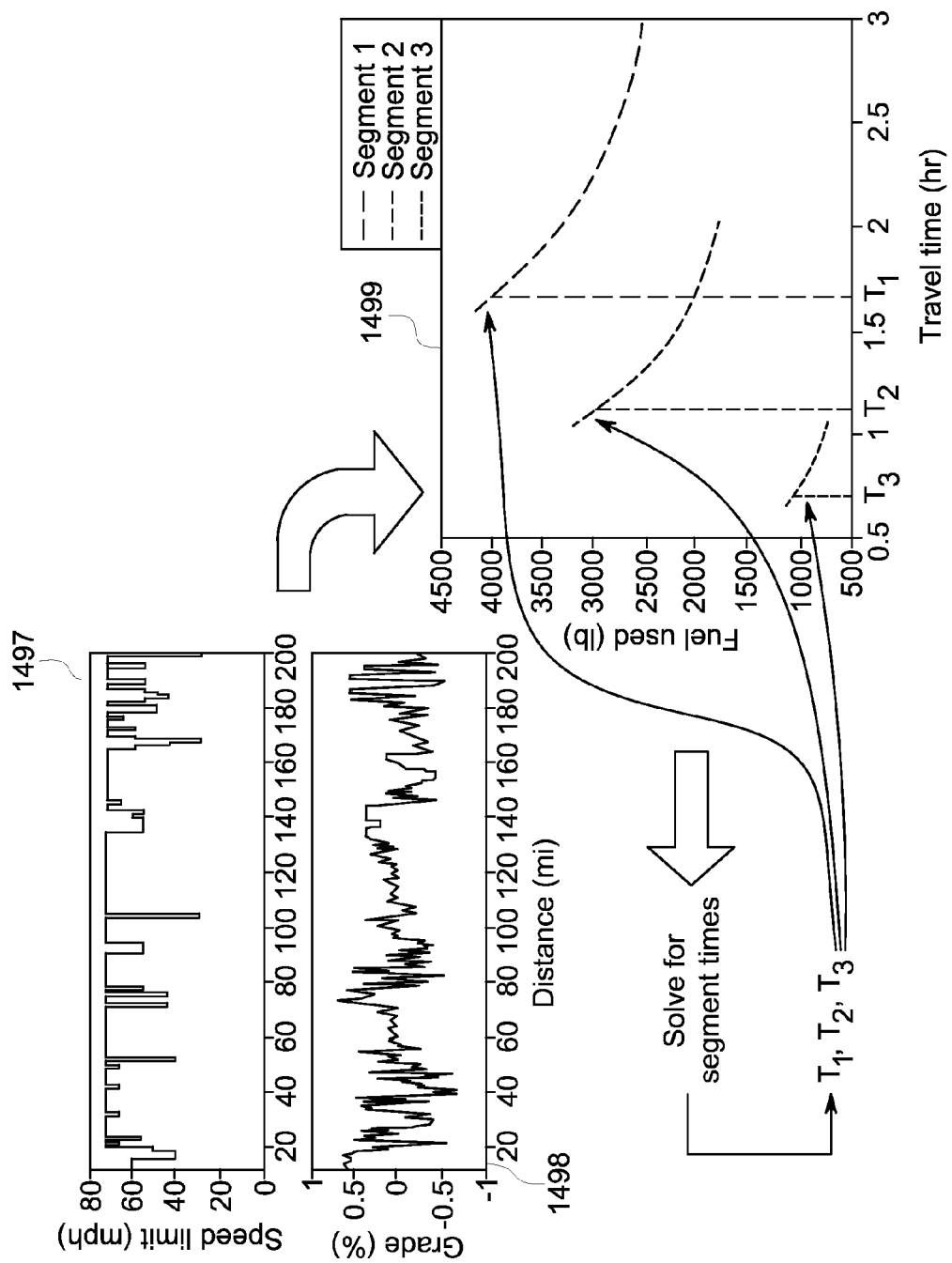
FIG. 14 depicts another embodiment of a segmentation decomposition for trip planning.

As described herein, an energy management system may employ a setup as illustrated in the flow chart shown in FIG. 9, and as a segmented example shown in FIG. 14. As illustrated in FIG. 14, a trip may be broken into two or more segments, $T_1$, $T_2$, and $T_3$. Though as discussed herein, it is possible to consider the trip as a single segment. As discussed herein, the segment boundaries may not result in equal segments. Instead the segments may use natural or mission specific boundaries. Trip plans can be pre-computed for each segment. If fuel use versus trip time is the trip objective to be met, fuel versus trip time curves can be built for each segment. As discussed herein, the curves may be based on other factors, wherein the factors are objectives to be met with a trip plan. When trip time is the parameter being determined, trip time for each segment is computed while satisfying the overall trip time constraints. FIG. 14 illustrates speed limits 1497 for a three segment 200-mile (321.9 kilometers) trip. Further illustrated are grade changes 1498 over the 200-mile (321.9 kilometers) trip. A combined chart 1499 illustrating curves for each segment of the trip of fuel used over the travel time is also shown.

Using the control setup described previously, the method can find the trip plan with specified travel time and initial and final speeds, so as to satisfy the speed limits and capability constraints of the vehicle system when there are stops. Though the following detailed description is directed towards reducing fuel use, it can also be applied to improve other factors as discussed herein, such as, but not limited to, emissions. A flexibility is to accommodate desired dwell time at stops and to consider constraints on earliest arrival and departure at a location as may be required, for example, in single-track operations where the time to be in or get by a siding is critical.

The energy management system may determine a trip plan from distance $D_0$ to $D_M$, traveled in time T, with M−1 intermediate stops at $D_1, \ldots, D_{M-1}$, and with the arrival and departure times at these stops constrained by:

$$t_{min}(i) \leq t_{arr}(D_i) \leq t_{max}(i) - \Delta t_i$$

$$t_{arr}(D_i) + \Delta t_i \leq t_{dep}(D_i) \leq t_{max}(i) \quad i=1, \ldots, M-1$$

where $t_{arr}(D_i)$, $t_{dep}(D_i)$, and $\Delta t_i$ are the arrival, departure, and stop time at the $i^{th}$ stop, respectively. Assuming that reducing fuel consumption implies reducing stop time, therefore $t_{dep}(D_i) = t_{arr}(D_i) + \Delta t_i$ which eliminates the second inequality above. Suppose for each $i=1, \ldots, M$, the trip plan that reduces fuel consumption for a trip from $D_{i-1}$ to $D_i$ for travel time t, $T_{min}(i) \leq t \leq T_{max}(i)$, is known. Let $F_i(t)$ be the fuel-use corresponding to this trip. If the travel time from $D_{j-1}$ to $D_j$ is denoted $T_j$, then the arrival time at $D_i$ is given by:

$$t_{arr}(D_i) = \sum_{j=1}^{i} (T_j + \Delta t_{j-1})$$

where $\Delta t_0$ is defined to be zero. The fuel-optimal trip from $D_0$ to $D_M$ for travel time T is then obtained by finding $T_i$, i= 1, ..., M, which reduces:

$$\sum_{i=1}^{M} F_i(T_i) \quad T_{min}(i) \le T_i \le T_{max}(i)$$

subject to:

$$t_{min}(i) \le \sum_{j=1}^{i}(T_j + \Delta t_{j-1}) \le t_{max}(i) - \Delta t_i \quad i = 1, \ldots, M-1$$

$$\sum_{j=1}^{M}(T_j + \Delta t_{j-1}) = T$$

Once a trip is underway, one issue may be re-determining the solution that reduces fuel consumption for the remainder of a trip (originally from $D_0$ to $D_M$ in time T) as the trip is traveled, but where disturbances preclude following the fuel-reduction solution. Let the current distance and speed be x and v, respectively, where $D_{i-1} < x \le D_i$. Also, let the current time since the beginning of the trip be $t_{act}$. Then the fuel-reduction solution for the remainder of the trip from x to $D_M$, which retains the original arrival time at $D_M$, can be obtained by finding $\tilde{T}_i$, $T_j$, $j=i+1, \ldots M$, which reduces:

$$\tilde{F}_i(\tilde{T}_i, x, v) + \sum_{j=i+1}^{M} F_j(T_j)$$

subject to:

$$t_{min}(i) \le t_{act} + \tilde{T}_i \le t_{max}(i) - \Delta t_i$$

$$t_{min}(k) \le t_{act} + \tilde{T}_i + \sum_{j=i+1}^{k}(T_j + \Delta t_{j-1}) \le t_{max}(k) - \Delta t_k$$

$$k = i+1, \ldots, M-1$$

$$t_{act} + \tilde{T}_i + \sum_{j=i+1}^{M}(T_j + \Delta t_{j-1}) = T$$

Here, $\tilde{F}_i(t,x,v)$ is the fuel-used of the trip from x to $D_i$, traveled in time t, with initial speed v at x.

As discussed above, one way to enable more efficient re-planning is to construct the solution for a stop-to-stop trip from partitioned segments. For the trip from $D_{i-1}$ to $D_i$, with travel time $T_i$, choose a set of intermediate points $D_{ij}$, $j=1, \ldots, N_i-1$. Let $D_{i0} = D_{i-1}$ and $D_{iN_i} = D_i$. Then express the fuel-use for the trip from $D_{i-1}$ to $D_i$ as:

$$F_i(t) = \sum_{j=1}^{N_i} f_{ij}(t_{ij} - t_{i,j-1}, v_{i,j-1}, v_{ij})$$

where $f_{ij}(t, v_{i,j-1}, v_{ij})$ is the fuel-use for the trip from $D_{i,j-1}$ to $D_{ij}$, traveled in time t, with initial and final speeds of $v_{i,j-1}$ and $v_{ij}$. Furthermore, $t_{ij}$ is the time in the trip corresponding to distance $D_{ij}$. By definition, $t_{iN_i} - t_{i0} = T_i$. Since the vehicle system is stopped at $D_{i0}$ and $D_{iN_i}$, $v_{i0} = v_{iN_i} = 0$.

The above expression enables the function $F_i(t)$ to be alternatively determined by first determining the functions $f_{ij}(\cdot)$, $1 \le j \le N_i$, then finding $\tau_{ij}$, $1 \le j \le N_i$ and $v_{ij}$, $1 \le j < N_i$, which reduce:

$$F_i(t) = \sum_{j=1}^{N_i} f_{ij}(\tau_{ij}, v_{i,j-1}, v_{ij})$$

subject to:

$$\sum_{j=1}^{N_i} \tau_{ij} = T_i$$

$$v_{min}(i,j) \le v_{ij} \le v_{max}(i,j) \quad j = 1, \ldots, N_i - 1$$

$$v_{i0} = v_{iN_i} = 0$$

By choosing $D_{ij}$ (e.g., at speed restrictions or meeting points), $v_{max}(i,j) - v_{min}(i,j)$ can be reduced, thus reducing the domain over which $f_{ij}(\ )$ needs to be known.

Based on the partitioning above, a simpler suboptimal re-planning approach than that described above is to restrict re-planning to times when the vehicle system is at distance points $D_{ij}$, $1 \le i \le M$, $1 \le j \le N_i$. At point $D_{ij}$, the new trip from $D_{ij}$ to $D_M$ can be determined by finding $\tau_{ik}$, $j < k \le N_i$, $v_{ik}$, $j < k < N_i$, and $\tau_{mn}$, $i < m \le M$, $1 \le n \le N_m$, $v_{mn}$, $i < m \le M$, $1 \le n < N_m$, which reduce:

$$\sum_{k=j+1}^{N_i} f_{ik}(\tau_{ik}, v_{i,k-1}, v_{ik}) + \sum_{m=i+1}^{M}\sum_{n=1}^{N_m} f_{mn}(\tau_{mn}, v_{m,n-1}, v_{mn})$$

subject to:

$$t_{min}(i) \le t_{act} + \sum_{k=j+1}^{N_i} \tau_{ik} \le t_{max}(i) - \Delta t_i$$

$$t_{min}(n) \le t_{act} + \sum_{k=j+1}^{N_i} \tau_{ik} + \sum_{m=i+1}^{n}(T_m + \Delta t_{m-1}) \le t_{max}(n) - \Delta t_n$$

$$n = i+1, \ldots, M-1$$

$$t_{act} + \sum_{k=j+1}^{N_i} \tau_{ik} + \sum_{m=i+1}^{M}(T_m + \Delta t_{m-1}) = T$$

where:

$$T_m = \sum_{n=1}^{N_m} \tau_{mn}$$

A further simplification can be obtained by waiting on the re-computation of $T_m$, $i < m \le M$, until distance point $D_i$ is reached. At points $D_{ij}$ between $D_{i-1}$ and $D_i$, the reduction above may need only to be performed over $\tau_{ik}$, $j < k \le N_i$, $v_{ik}$, $j < k < N_i$. $T_i$ can be increased as needed to accommodate any longer actual travel time from $D_{i-1}$ to $D_{ij}$ than planned. This increase can be later compensated, if possible, by the re-computation of $T_m$, $i < m \le M$, at distance point $D_i$.

With respect to the closed-loop configuration disclosed above, the total input energy required to move a vehicle system 1131 from point A to point B can include the sum of four components, specifically a difference in kinetic energy between points A and B; a difference in potential energy between points A and B; energy loss due to friction and other drag losses; and energy dissipated by the application of brakes. Assuming the start and end speeds to be equal (e.g., stationary), the first component is zero. Furthermore, the second component is independent of driving strategy. Thus, it suffices to reduce the sum of the last two components.

Following a constant speed profile can reduce or minimize drag loss. Following a constant speed profile also can reduce or minimize total energy input when braking is not needed to maintain constant speed. If braking is required to maintain constant speed, however, applying braking just to maintain constant speed will likely increase total required energy because of the need to replenish the energy dissipated by the brakes. A possibility exists that some braking may actually reduce total energy usage if the additional brake loss is more than offset by the resultant decrease in drag loss caused by braking, by reducing speed variation.

After completing a re-plan from the collection of events described above, the new trip plan can be followed using the closed loop control described herein. In some situations, there may not be enough time to carry out the segment decomposed planning described above, and when there are speed restrictions that must be respected, an alternative may be needed. The energy management system described herein can accomplish this with a process referred to as "smart cruise control". The smart cruise control process is an efficient way to generate, on the fly, an energy-efficient (hence fuel-efficient) sub-optimal prescription for driving the vehicle system 1131 over a known terrain. This process assumes knowledge of the position of the vehicle system 1131 along the route 1134, as well as knowledge of the grade and curvature of the route 1134 versus position. The process can use a point-mass model for the motion of the vehicle system 1131, whose parameters may be adaptively estimated from online measurements of motion as described earlier.

The smart cruise control process has three components, specifically a modified speed limit profile that serves as an energy-efficient (and/or emissions efficient or any other objective function) guide around speed limit reductions; a throttle or dynamic brake setting profile that attempts to balance between reducing or minimizing speed variation and braking; and a mechanism for combining the latter two components to produce a notch command, employing a speed feedback loop to compensate for mismatches of modeled parameters when compared to reality parameters. Smart cruise control can accommodate strategies described herein that do no active braking (e.g., the driver is signaled and assumed to provide the requisite braking) or a variant that does active braking.

With respect to the cruise control process that does not control dynamic braking, the components can include a modified speed limit profile that serves as an energy-efficient guide around speed limit reductions, a notification signal directed to notify the operator when braking should be applied, an ideal throttle profile that attempts to balance between reducing or minimizing speed variations and notifying the operator to apply braking, a mechanism employing a feedback loop to compensate for mismatches of model parameters to reality parameters.

Also included in the energy management system can be an approach to identify parameter values of the vehicle system 1131. For example, with respect to estimating mass of the vehicle system 1131, a Kalman filter and a recursive least-squares approach may be utilized to detect errors that may develop over time.

Figure 15:
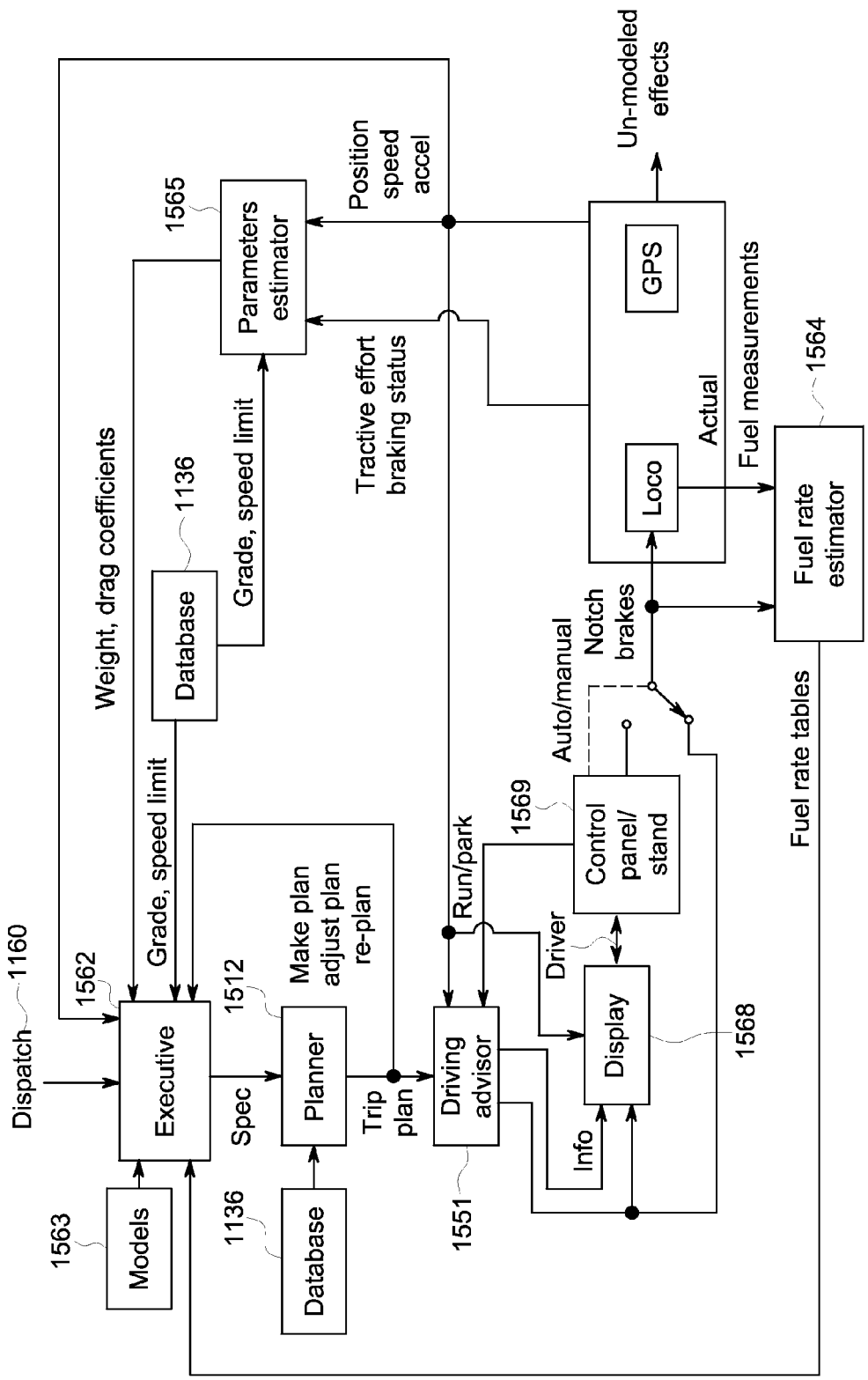
FIG. 15 depicts another example of a flow chart of a method for trip planning.

FIG. 15 depicts another example of a flow chart of a method for trip planning. As previously described, a remote facility, such as a dispatch 1160 can provide information that is used to plan the trip. As illustrated, such information is provided to an executive control element 1562, such as one or more computers or other hardware circuitry that includes and/or is connected with one or more processors, controllers, or other electronic logic-based devices. Also supplied to the executive control element 1562 is vehicle modeling information 1563, information from the route database 1136 such as, but not limited to, route grade information and speed limit information, estimated vehicle parameters such as, but not limited to, vehicle and/or vehicle system weight and drag coefficients, and fuel rate tables from a fuel rate estimator 1564. The fuel rate estimator 1564 can include one or more computers or other hardware circuitry that includes and/or is connected with one or more processors, controllers, or other electronic logic-based devices. The executive control element 1562 supplies information to a planner 1512, which can represent one or more embodiments of the energy management systems described herein. In one aspect, at least some operations of the planner 1512 or energy management system 1512 may be represented by the flowchart of FIG. 9 to generate and/or revise a trip plan. Once a trip plan has been calculated, the plan is supplied from the energy management system 1512 to a driving advisor, driver, or controller element 1551. The trip plan also can be supplied to the executive control element 1562 so that the element 1562 can compare the trip plan with other data (e.g., actual operations of the vehicle system) when the other data is provided.

As described above, the driving advisor 1551 can automatically set a notch power, either a pre-established notch setting or a continuous notch power. In addition to or as an alternate to supplying a speed command to the vehicle 1142, a display 1568 is provided so that the operator can view what the energy management system 1512 has recommended. The operator also has access to a control panel 1569. Through the control panel 1569, the operator can decide whether to apply the notch power recommended. Toward this end, the operator may limit a targeted or recommended power of the trip plan. That is, the operator can have the final authority over what power setting at which the vehicle system 1131 operates. This includes deciding whether to apply braking if the trip plan recommends slowing the vehicle system 1131. For example, if operating in dark territory, or where information from wayside equipment cannot electronically transmit information to the vehicle system 1131 and instead the operator views visual signals from the wayside equipment, the operator can input commands based on information contained in the route database and visual signals from the wayside equipment.

Based on how the vehicle system 1131 is functioning, information regarding fuel measurement can be supplied to the fuel rate estimator 1564. Since direct measurement of fuel flows may not be available in the vehicle system 1131, information on fuel consumed so far within a trip and projections of fuel consumed into the future if the vehicle system 1131 operates according to the operational settings designated by the trip plan can be carried out by the estimator 1564 using calibrated physics models such as those used in developing the trip plans. For example, such predictions may include but are not limited to, the use of measured gross horse-power and known fuel characteristics and emissions characteristics to derive the cumulative fuel used and emissions generated.

The vehicle system 1131 also has the locator device 1130, such as a GPS sensor, as described above. Information is supplied to a parameters estimator 1565, which can include one or more computers or other hardware circuitry that includes and/or is connected with one or more processors, controllers, or other electronic logic-based devices. Such information may include, but is not limited to, GPS sensor data, tractive/braking effort data, braking status data, speed, and any changes in speed data. With information regarding grade and speed limit information, vehicle system weight and drag coefficients information can be supplied to the executive control element 1562.

One or more embodiments of the inventive subject matter described herein may also allow for the use of continuously variable power throughout the planning and closed loop control implementation. In a conventional locomotive, power may be quantized to eight discrete levels. Modern locomotives can realize continuous variation in horsepower which may be incorporated into the previously described methods for determining and/or revising trip plans. With continuous power, the vehicle 1142 can further improve operating conditions, such as by reducing or minimizing auxiliary loads and power transmission losses and fine tuning engine horsepower regions of increased or optimum efficiency, or to points of increased emissions margins. Examples include, but are not limited to, reducing or minimizing cooling system losses, adjusting alternator voltages, adjusting engine speeds, and reducing a number of powered axles used to propel the vehicle system 1131. Further, the vehicle 1142 may use the on-board route database 1136 and the forecasted performance requirements to reduce or minimize auxiliary loads and power transmission losses to provide increased or optimum efficiency for target fuel consumption/emissions. Examples include, but are not limited to, reducing a number of powered axles used to propel the vehicle system 1131 on flat terrain and pre-cooling the engine prior to entering a tunnel.

One or more embodiments of the inventive subject matter described herein also may use the on-board route database 1136 and the forecasted performance to adjust the vehicle performance, such as to ensure that the vehicle system 1131 has sufficient speed as the vehicle system 1131 approaches a hill and/or tunnel. For example, this could be expressed as a speed constraint at a particular location that becomes part of the trip plan generation created solving the equation (OP). Additionally, one or more embodiments of the inventive subject matter described herein may incorporate vehicle system-handling rules, such as, but not limited to, tractive effort ramp rates and/or upper limit or maximum braking effort ramp rates. These may be incorporated directly into the formulation for the trip plan or alternatively incorporated into the closed loop regulator used to control power application to achieve the target speed designated by a trip plan.

In one embodiment, the energy management system may only be installed on a lead propulsion-generating vehicle of the vehicle system. Even though one or more embodiments of the energy management system are not dependent on data or interactions with other propulsion-generating vehicles, the energy management system may be integrated with a consist manager, as disclosed in U.S. Pat. No. 6,691,957 and U.S. Pat. No. 7,021,588 (owned by the Assignee and both incorporated by reference), functionality and/or a consist optimizer functionality to improve efficiency. Interaction with multiple vehicle system is not precluded as illustrated by the example of a dispatch arbitrating two "independently optimized" vehicle systems described herein.

Vehicle systems with distributed power systems can be operated in different modes. One mode can include all propulsion-generating vehicles in the vehicle system operating at the same notch command. So if the lead propulsion-generating vehicle is commanding motoring—N8 (e.g., notch eight), all propulsion-generating vehicles in the vehicle system will be commanded to generate motoring—at N8 power. Another mode of operation is "independent" control. In this mode, the propulsion-generating vehicles or sets of the propulsion-generating vehicles distributed throughout the vehicle system can be operated at different motoring or braking powers. For example, as a vehicle system crests a mountaintop, the lead propulsion-generating vehicles along a direction of travel (on the down slope of mountain) may be placed in braking, while the propulsion-generating vehicles in the middle or at the end of the vehicle system (on the up slope of mountain) may be in motoring. This is done to reduce or minimize tensile forces on the mechanical couplers that connect the vehicles in the vehicle system. Traditionally, operating the distributed power system in "independent" mode may involve the operator manually commanding each remote propulsion-generating vehicle or set of propulsion-generating vehicles via a display in the lead propulsion-generating vehicle. Using the physics based planning model, vehicle system set-up information, on-board route database, on-board operating rules, location determination system, real-time closed loop power/brake control, and sensor feedback, the vehicle system can automatically operate the distributed power system in "independent" mode.

When operating in distributed power, the operator in a lead locomotive can control operating functions of remote locomotives in the remote consists via a control system, such as a distributed power control element. Thus when operating in distributed power, the operator can command each locomotive consist to operate at a different notch power level (or one consist could be in motoring and other could be in braking) wherein each individual locomotive in the locomotive consist operates at the same notch power. In an exemplary embodiment, with an exemplary embodiment of the present invention installed on the train, preferably in communication with the distributed power control element, when a notch power level for a remote locomotive consist is desired as recommended by the optimized trip plan, the exemplary embodiment of the present invention will communicate this power setting to the remote locomotive consists for implementation. As discussed below, the same is true regarding braking.

One or more embodiments of the energy management system may be used with vehicle systems in which the propulsion-generating vehicles are not contiguous, e.g., with one or more propulsion-generating vehicles up front, others in the middle and at the rear for a vehicle system. Such configurations are called distributed power wherein the standard connection between the propulsion-generating vehicles is replaced by radio link or auxiliary cable to link the propulsion-generating vehicles externally. When operating in distributed power, the operator in a lead propulsion-generating vehicle can control operating functions of remote propulsion-generating vehicles in the consist via a control system, such as a distributed power control element. In particular, when operating in distributed power, the operator can command each consist to operate at a different notch power level (or one consist could be in motoring and other could be in braking) wherein each individual in the consist operates at the same notch power.

In one embodiment, with the energy management system installed on the vehicle system, such as in communication with a distributed power control element, when a notch power level for a remote consist is desired as recommended by the trip plan, the energy management system can communicate this power setting to the remote consists for implementation. As described below, the same is true regarding braking. When operating with distributed power, the planning problem previously described can be enhanced to allow additional degrees of freedom, in that each of the remote propulsion-generating vehicles can be independently controlled from the lead propulsion-generating vehicle. The value of this is that additional objectives or constraints relating to in-train forces may be incorporated into the performance function, assuming the model to reflect the in-train forces is also included. Thus one or more embodiments of the energy management system may include the use of multiple throttle controls to better manage in-train forces as well as fuel consumption and emissions.

In a vehicle system utilizing a consist manager, the lead propulsion-generating vehicle in a consist may operate at a different notch power setting than other propulsion-generating vehicles in that consist. The other propulsion-generating vehicles in the consist operate at the same notch power setting. The energy management system may be utilized in conjunction with the consist manager to command notch power settings for the propulsion-generating vehicles in the consist. Since the consist manager divides a consist into two or more groups (e.g., lead propulsion-generating vehicle and trail propulsion-generating vehicles), the lead propulsion-generating vehicle can be commanded to operate at a certain notch power and the trail propulsion-generating vehicles can be commanded to operate at another certain notch power. In one embodiment, the distributed power control element may be the system and/or apparatus where this operation is housed.

Likewise, when a consist optimizer is used with a vehicle consist, the energy management system can be used in conjunction with the consist optimizer to determine notch power for each propulsion-generating vehicle in the consist. For example, suppose that a trip plan recommends a notch power setting of four for the consist. Based on the location of the vehicle system, the consist optimizer can take this information and then determine the notch power setting for each propulsion-generating vehicle in the consist. In this implementation, the efficiency of setting notch power settings over intra-system communication channels is improved. Furthermore, as discussed above, implementation of this configuration may be performed utilizing the distributed control system.

As previously described, the energy management system may be used for continuous corrections and re-planning with respect to when the consist uses braking based on upcoming items of interest, such as but not limited to route crossings, grade changes, approaching sidings, approaching depot yards, and approaching fuel stations where different propulsion-generating vehicles in the consist may require a different braking option. For example, if the vehicle system is coming over a hill, the lead propulsion-generating vehicle may have to enter a braking condition whereas the remote propulsion-generating vehicles, having not reached the peak of the hill may remain in a motoring state.

Figure 16:
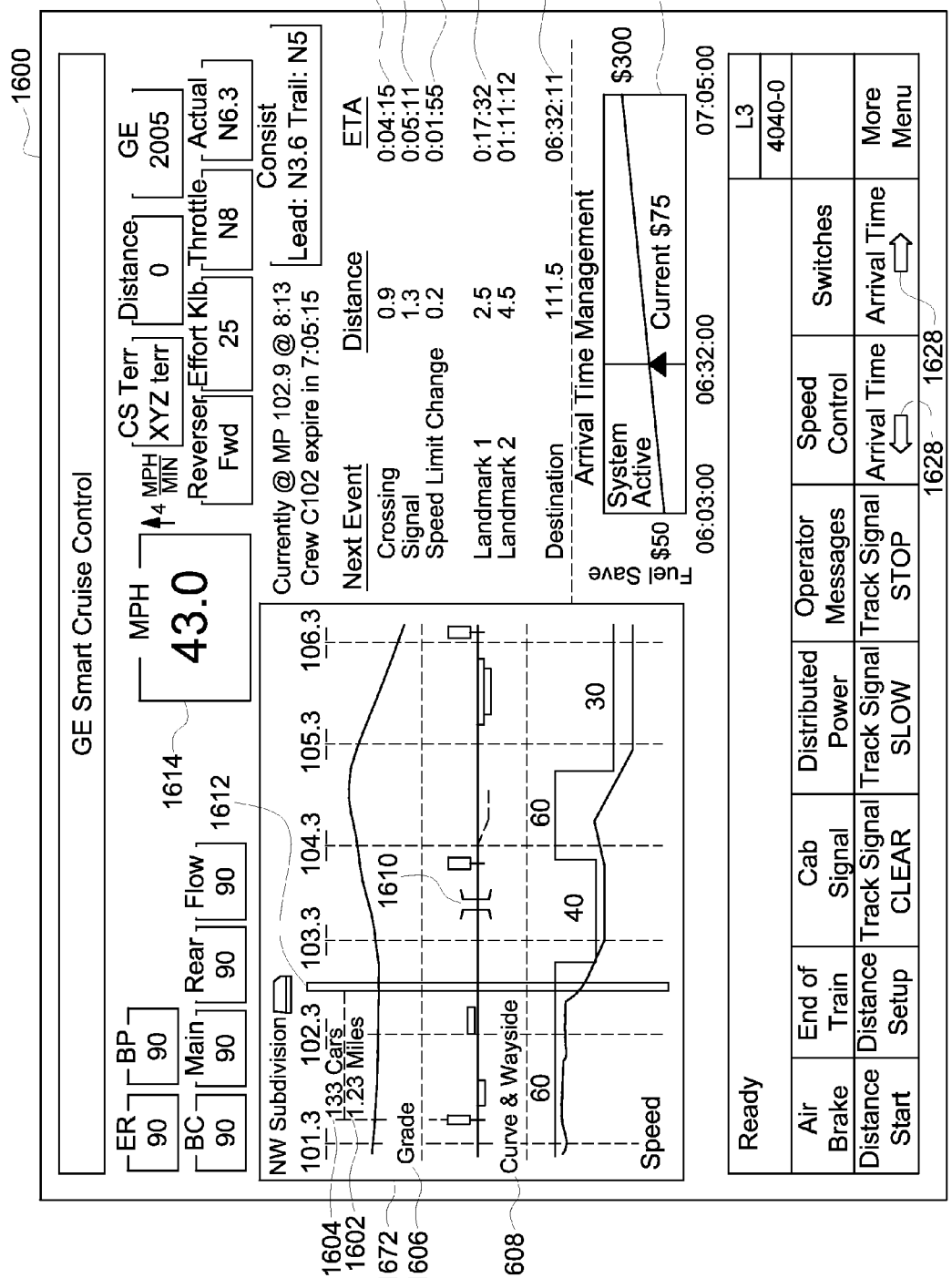
FIG. 16 depicts an illustration of a dynamic display for use by an operator.
Figure 17:
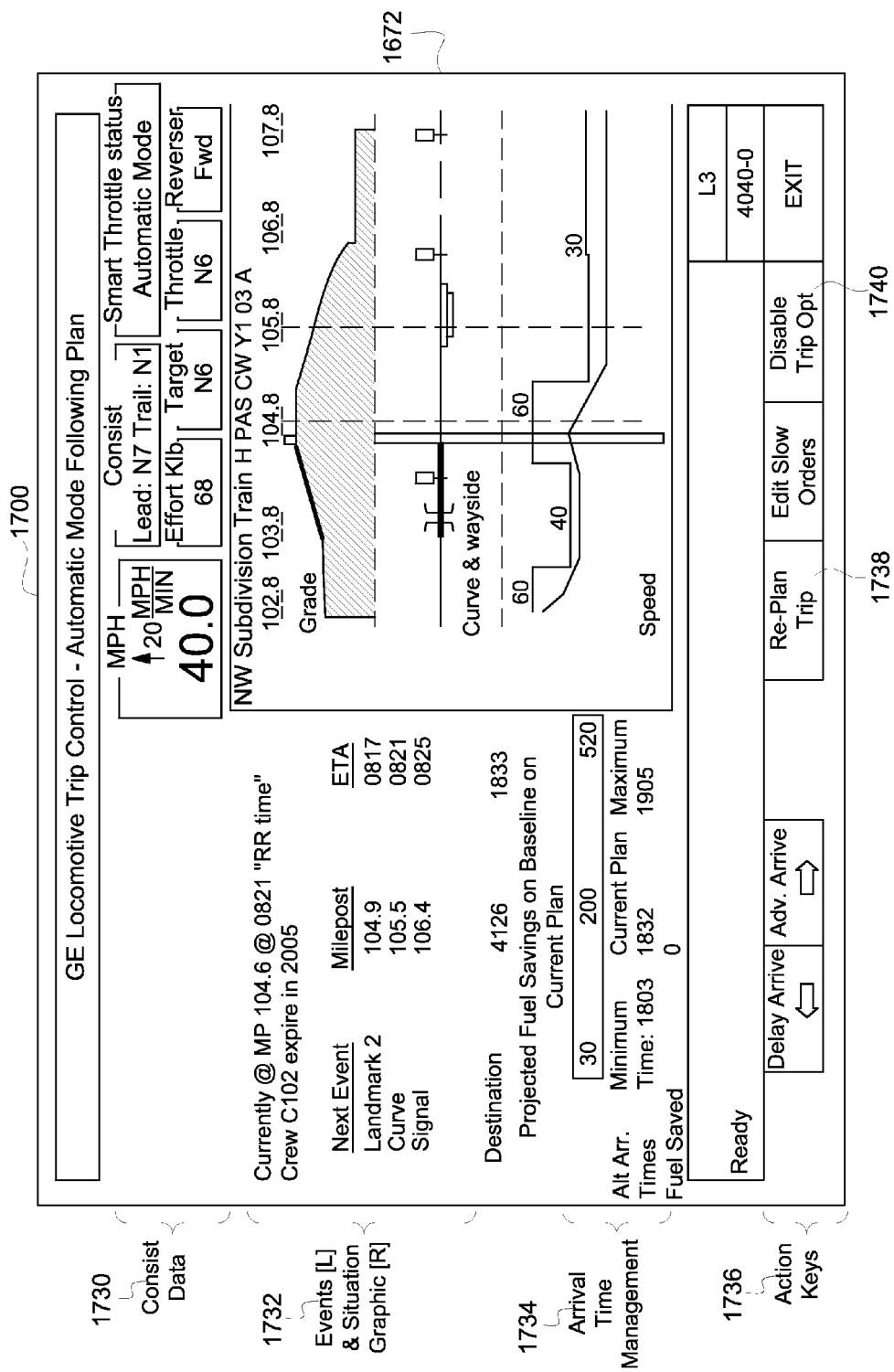
FIG. 17 depicts another illustration of a dynamic display for use by the operator.
Figure 18:
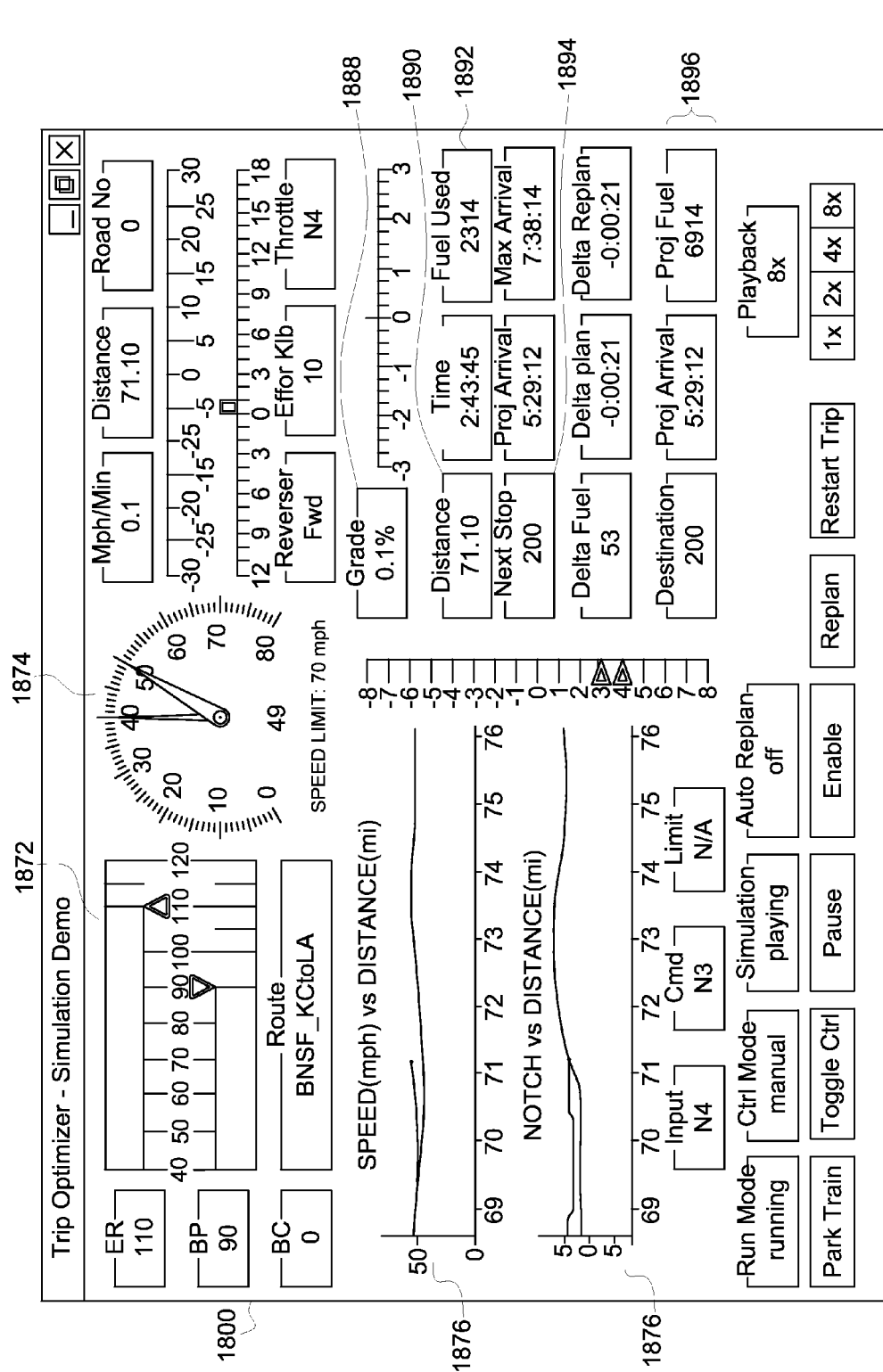
FIG. 18 depicts another illustration of a dynamic display for use by the operator.

FIGS. 16, 17, and 18 illustrate dynamic displays 1600, 1700, 1800 for use by the operator according to one embodiment. The displays may be shown to the operator via the display 1568. As shown in FIG. 16, a trip plan is provided 1672. Within the plan, a location 1612 of the vehicle system is provided. Such information as length 1602 of the vehicle system and the number of vehicles 1604 in the vehicle system are provided. Elements are also provided regarding route grade 1606, curve and wayside elements 1608, including bridge locations 1610, and vehicle system speed 1614. The display 1568 allows the operator to view such information and also see where the vehicle system is along the route. Information pertaining to distance and/or estimate time of arrival to such locations as crossings 1616, signals 1618, speed changes 1620, landmarks 1622, and destinations 1624 are provided. An arrival time management tool 1626 is also provided to allow the user to determine the fuel savings that is being realized during the trip. The operator has the ability to vary arrival times 1628 and witness how this affects the fuel savings. As described herein, fuel savings is one example of only one objective that can be reviewed with a management tool. Toward this end, depending on the parameter being viewed, other parameters described herein can be viewed and evaluated with a management tool that is visible to the operator. The operator is also provided information about how long the crew has been operating the vehicle system. In one or more embodiments, time and distance information may either be illustrated as the time and/or distance until a particular event and/or location or as a total elapsed time.

As illustrated in FIG. 17, an example display 1700 provides information about consist data 1730, an events and situation graphic 1732, an arrival time management tool 1734, and action keys 1736. Similar information as described above is provided in this display 1700 as well. This display 1700 also provides action keys 1738 to allow the operator to re-plan as well as to disengage 1740 one or more embodiments described herein.

FIG. 18 depicts another embodiment of the display 1800. Data typical of a modern vehicle including air-brake status 1872, analog speedometer with digital insert, or indicator, 1874, and information about tractive effort in pounds force (or traction amps for DC locomotives) is visible. An indicator 1874 is provided to show the current speed in the plan being executed as well as an accelerometer graphic to supplement the readout in mph/minute. New data for plan execution is in the center of the display 1800, including a rolling strip graphics 1876 with designated speed and notch settings of the trip plan versus distance compared to the current history of these variables. In the illustrated embodiment, location of the vehicle system can be derived using the locator element. As illustrated, the location is provided by identifying how far the vehicle system is away from its final destination, an absolute position, an initial destination, an intermediate point, and/or an operator input.

The strip chart provides a look-ahead to changes in speed required to follow the trip plan, which is useful in manual control, and monitors plan versus actual during automatic control. As described herein, such as when in the coaching mode, the operator can either follow the notch or speed suggested by the trip plan. The vertical bar gives a graphic of desired and actual notch, which are also displayed digitally below the strip chart. When continuous notch power is utilized, as discussed above, the display can round to closest discrete equivalent, the display may be an analog display so that an analog equivalent or a percentage or actual horse power/tractive effort is displayed.

Information on trip status is displayed on the display 1800, and shows the current grade 1888 the vehicle system is encountering, either by the lead propulsion-generating vehicle, a location elsewhere along the vehicle system or an average over the train length. A distance traveled 1890 so far in the plan, cumulative fuel used 1892, where or the distance away the next stop is planned 1894, current and projected arrival time 1896, expected time to be at next stop are also disclosed. The display 1868 also shows a possible time to destination possible with the computed plans available. If a later arrival was required, a re-plan would be carried out. Delta plan data shows status for fuel and schedule ahead or behind the current optimal plan. Negative numbers mean less fuel or early compared to plan, positive numbers mean more fuel or late compared to plan, and typically trade-off in opposite directions (slowing down to save fuel makes the train late and conversely).

The displays 1600, 1700, 1800 can provide the operator a snapshot of where the vehicle system stands with respect to the currently instituted driving plan. These displays are for illustrative purpose only as there are many other ways of displaying/conveying this information to the operator and/or dispatch. Toward this end, the information disclosed above could be intermixed to provide a display different than the ones disclosed.

Other features that may be included in one or more embodiments include, but are not limited to, allowing for the generating of data logs and reports. This information may be stored on the vehicle system and downloaded to an off-board system at some point in time. The downloads may occur via manual and/or wireless transmission. This information may also be viewable by the operator via the display. The data may include such information as, but not limited to, operator inputs, time system is operational, fuel saved, fuel imbalance across locomotives in the vehicle system, vehicle system journey off course, system diagnostic issues such as if GPS sensor is malfunctioning.

Since trip plans must also take into consideration allowable crew operation time, one or more embodiments may take such information into consideration as a trip is planned. For example, if the upper limit on or maximum time a crew may operate is eight hours, then the trip plan can be fashioned to include stopping location for a new crew to take the place of the present crew. Such specified stopping locations may include, but are not limited to rail yards, meet/pass locations, etc. If, as the trip progresses, the trip time may be exceeded, one or more embodiments may be overridden by the operator to meet criteria as determined by the operator. Ultimately, regardless of the operating conditions of the vehicle system, such as but not limited to high load, low speed, vehicle system stretch conditions, etc., the operator remains in control to command a speed and/or operating condition of the vehicle system.

Using one or more embodiments described herein, the vehicle system may operate in a plurality of operations. In one operational concept, one embodiment may provide commands for commanding propulsion, dynamic braking. The operator then handles all other vehicle system functions. In another operational concept, one embodiment may provide commands for commanding propulsion only. The operator then handles dynamic braking and all other vehicle system functions. In yet another operational concept, one embodiment may provide commands for commanding propulsion, dynamic braking and application of the airbrake. The operator then handles all other vehicle system functions.

One or more embodiments may also be used by notify the operator of upcoming items of interest of actions to be taken. Specifically, the forecasting logic, the continuous corrections and re-planning to the trip plan, the route database, the operator can be notified of upcoming crossings, signals, grade changes, brake actions, sidings, rail yards, fuel stations, etc. This notification may occur audibly and/or through the operator interface.

Specifically using the physics based planning model, vehicle system set-up information, on-board route database, on-board operating rules, location determination system, real-time closed loop power/brake control, and sensor feedback, the system shall present and/or notify the operator of required actions. The notification can be visual and/or audible. Examples include notifying of crossings that require the operator activate the propulsion-generating vehicle horn and/or bell, notifying of "silent" crossings that do not require the operator activate the propulsion-generating vehicle horn or bell.

In another embodiment, using the physics based planning model discussed above, vehicle system set-up information, on-board route database, on-board operating rules, location determination system, real-time closed power/brake control, and sensor feedback, one or more embodiments may present the operator information (e.g. a gauge on display) that allows the operator to see when the vehicle system will arrive at various locations as illustrated in FIG. 17. The system can allow the operator to adjust the trip plan (target arrival time). This information (actual estimated arrival time or information needed to derive off-board) can also be communicated to the dispatch center to allow the dispatcher or dispatch system to adjust the target arrival times. This allows the system to quickly adjust and optimize for the appropriate target function (for example trading off speed and fuel usage).

Figure 19:
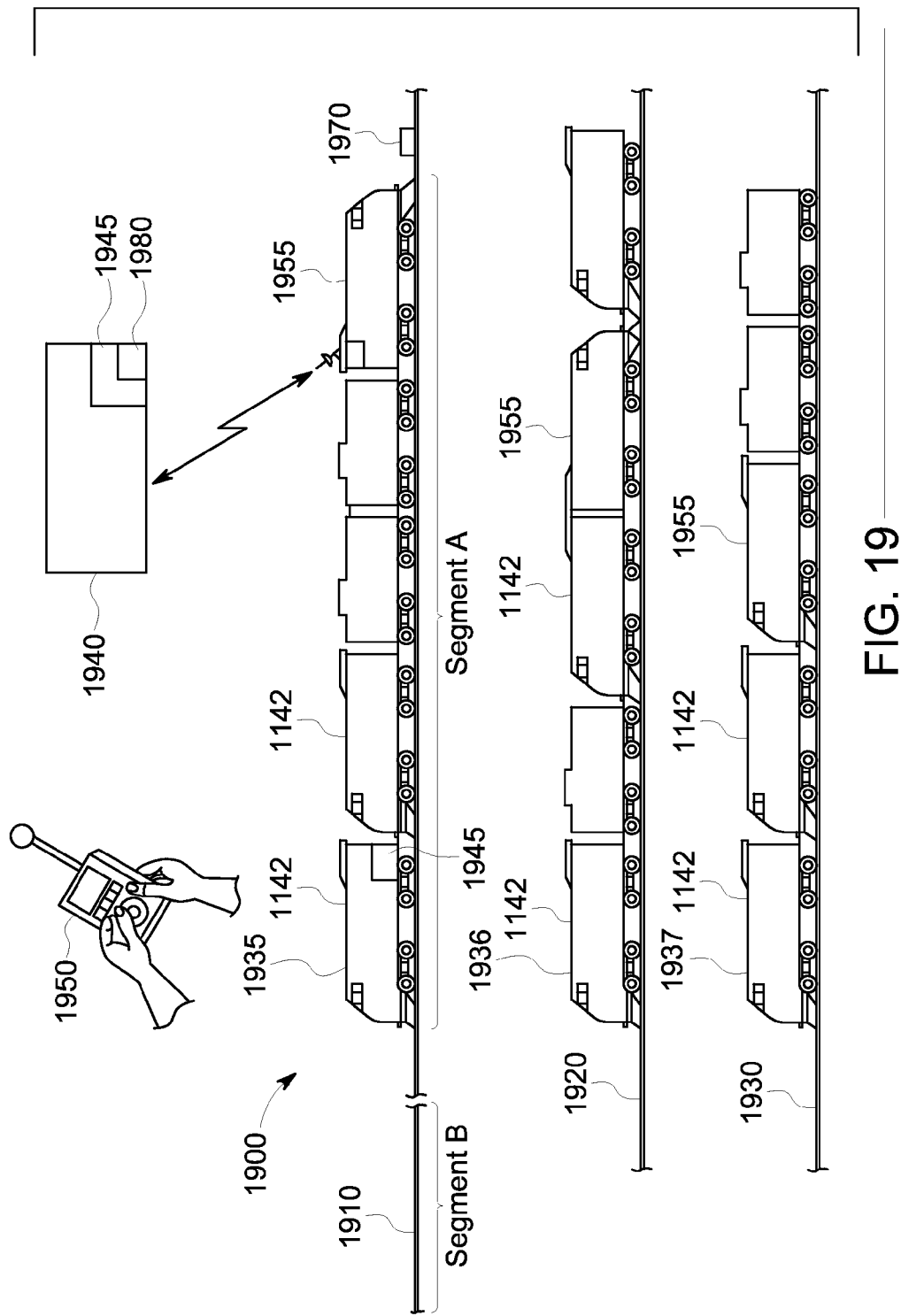
FIG. 19 depicts an embodiment of a network of routes with multiple vehicle systems.

FIG. 19 depicts one embodiment of a network of routes with multiple vehicle systems. In the network 1900, it is desirable to obtain a fuel efficiency and time of arrival for the overall network of multiple interacting routes 1910, 1920, 1930, and vehicle systems 1935, 1936, 1937. As illustrated, multiple routes 1910, 1920, 1930 are shown with a vehicle system 1935, 1936, 1937 on each respective route. Though propulsion-generating vehicles 1142 are illustrated as part of the vehicle systems 1935, 1936, 1937, the vehicle systems may only have a single propulsion-generating vehicle consist having a single propulsion-generating vehicle. As disclosed herein, a remote facility 1940 may also be involved with improving fuel efficiency and reducing emissions of a vehicle system through optimized vehicle system power makeup. This may be accomplished with one or more processors 1945, such as a computer, located at the remote facility 1940. In another embodiment, a hand-held device 1950 may be used to facilitate improving fuel efficiency of the vehicle system 1935, 1936, 1937 through optimized vehicle system power makeup. Typically, in either of these approaches, configuring the vehicle system 1935, 1936, 1937 usually occurs at a hump, or rail, yard, more specifically when the vehicle system is being compiled.

As described below, however, the processors 1945 may be located on the vehicle system 1935, 1936, 1937 or aboard another vehicle system wherein vehicle system setup may be accomplished using inputs from the other vehicle system. For example, if a vehicle system has recently completed a mission over the same routes, input from that vehicle system's mission may be supplied to the current vehicle system as it either is performing and/or is about to begin its mission. Thus configuring the vehicle system may occur at vehicle system run time, and even during the run time. For example, real time configuration data may be utilized to configure the vehicle system propulsion-generating vehicles. One such example is provided above with respect to using data from another vehicle system. Another exemplary example entails using other data associated with trip optimization of the vehicle system as discussed above. Additionally the vehicle system setup may be performed using input from a plurality of sources, such as, but not limited to, a dispatch system, a wayside system 1970, an operator, an off-line real time system, an external setup, a distributed network, a local network, and/or a centralized network.

Figure 20:
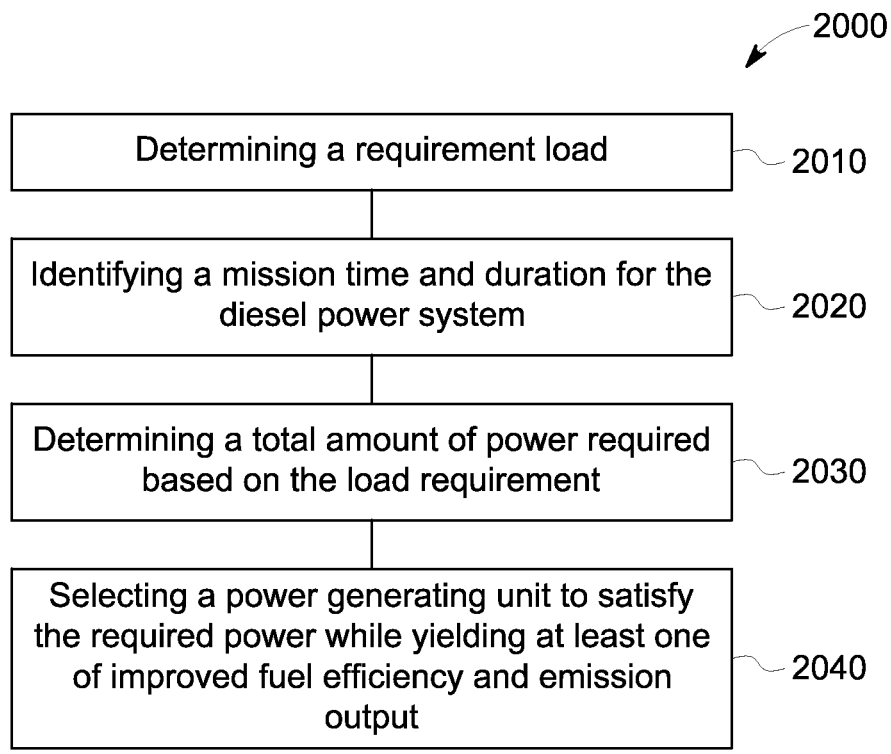
FIG. 20 depicts an embodiment of a flowchart of a method for improving fuel efficiency of a vehicle system through determining power makeup in the vehicle system.

FIG. 20 depicts one embodiment of a flowchart of a method 2000 for improving fuel efficiency and reducing emission output through vehicle system power makeup. As described above, to reduce fuel use and emissions while preserving time arrival, in one embodiment, acceleration and matched breaking may be reduced or minimized. Undesired emissions may also be reduced or minimized by powering a reduced or minimal set of propulsion-generating vehicles. For example, in a vehicle system with several propulsion-generating vehicles or propulsion-generating vehicle consists, powering a reduced or minimal set of propulsion-generating vehicles at a higher power setting while putting the remaining propulsion-generating vehicles into idle, unpowered standby, or an automatic engine start-stop ("AESS) mode as described below, can reduce emissions. This is due, in part, because at lower power setting such as notch 1-3, exhaust emissions after-treatment devices, such as but not limited to catalytic converters, located on the propulsion-generating vehicles are at a temperature below which these systems' operations are improved. Therefore, using the reduced or minimum number of propulsion-generating vehicles or propulsion-generating vehicle consists to make the mission on time, operating at high power settings will allow for the exhaust emission treatment devices, such as but not limited to catalytic converters, to operate at optimal temperatures thus further reducing emissions.

Figure 21:
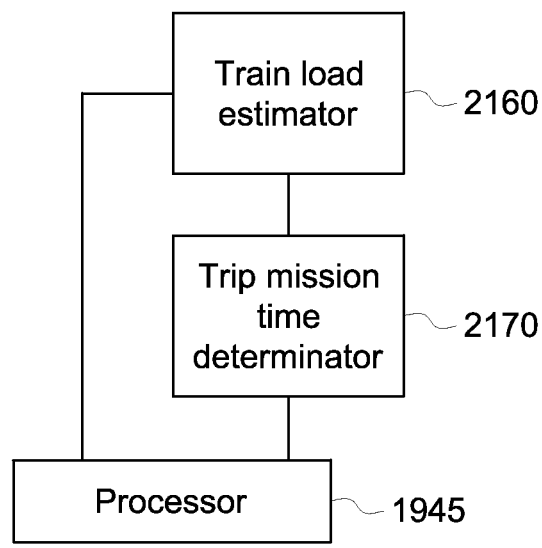
FIG. 21 depicts a block diagram of elements included in a system for determining power makeup in the vehicle system.

The method 2000 provides for determining a vehicle system load, at 2010. When the engine is used in other applications, the load is determined based on the engine configuration. The vehicle system load may be determined with a load, or vehicle system load, estimator 2160, as illustrated in FIG. 21. In one embodiment, the vehicle system load is estimated based on information obtained as disclosed in a vehicle system makeup docket 1980, as illustrated in FIG. 19. For example, the vehicle system makeup docket 1980 may be contained in the computer 1945 (illustrated in FIGS. 19 and 21) wherein the processor 1945 makes the estimation, or may be on paper wherein an operator makes the estimation. The vehicle system makeup docket 1980 may include such information as, but not limited to, number of cars, weight of the cars, content of the cars, age of cars, etc. In another embodiment the vehicle system load is estimated using historical data, such as but not limited to prior vehicle system missions making the same trip, similar vehicle system car configurations, etc. As discussed above, using historical data may be accomplished with a processor or manually. In yet another embodiment, the vehicle system load is estimated using a rule of thumb or table data. For example, the operator configuring the vehicle system 1935, 1936, 1937 may determine the vehicle system load required based on established guideline such as, but not limited to, a number of cars in the vehicle system, types of cars in the vehicle system, weight of the cars in the vehicle system, an amount of products being transported by the vehicle system, etc. This same rule of thumb determination may also be accomplished using the processor 1945.

Identifying a mission time and/or duration for the powered system, at 2020, is disclosed. With respect to engines used in other applications, identifying a mission time and/or duration for the powered system may be equated to defining the mission time which the engine configuration is expected to accomplish the mission. A determination is made about a total amount of power required based on the vehicle system load, at 2030. The propulsion-generating vehicle is selected to satisfy the required power while yielding improved fuel efficiency and/or reduced emission output, at 2040. The propulsion-generating vehicle may be selected based on a type of propulsion-generating vehicle (based on its engine) needed and/or a number of propulsion-generating vehicles (based on a number of engines) needed. Similarly, with respect to engines used in other power applications, such as but not limited to marine, OHV, and stationary power stations, where multiple units of each are used to accomplish an intended mission unique for the specific application.

Toward this end, a trip mission time determinator 2170, as illustrated in FIG. 21, may be used to determine the mission time. Such information that may be used includes, but not limited to, weather conditions, route conditions, etc. The propulsion-generating vehicle makeup may be based on types of propulsion-generating vehicles needed, such as based on power output, and/or a minimum number of propulsion-generating vehicles needed. For example, based on the available propulsion-generating vehicles, a selection is made of those propulsion-generating vehicles that just meet the total power required. Toward this end, as an example, if ten propulsion-generating vehicles are available, a determination of the power output from each propulsion-generating vehicle is made. Based on this information, the fewest number and type of propulsion-generating vehicles needed to meet the total power requirements are selected. For example the propulsion-generating vehicles may have different horse power (HP) ratings or starting Tractive Effort (TE) ratings. In addition to the total power required, the distribution of power and type of power in the vehicle system can be determined. For example on heavy vehicle systems to limit the maximum coupler forces, the propulsion-generating vehicles may be distributed within the vehicle system. Another consideration is the capability of the propulsion-generating vehicle. It may be possible to put four DC propulsion-generating vehicles on the head end of a vehicle system, however four AC units with the same HP may not be used at the headend since the total drawbar forces may exceed the limits.

In another embodiment, the selection of propulsion-generating vehicles may not be based solely on reducing a number of propulsion-generating vehicles used in a vehicle system. For example, if the total power requirement is minimally met by five of the available propulsion-generating vehicles when compared to also meeting the power requirement by the use of three of the available propulsion-generating vehicles, the five propulsion-generating vehicles are used instead of the three. In view of these options, those skilled in the art will readily recognize that minimum number of propulsion-generating vehicles may be selected from a sequential (and random) set of available propulsion-generating vehicles. Such an approach may be used when the vehicle system 1935, 1936, 1937 is already compiled and a decision is being made at run time and/or during a mission wherein the remaining propulsion-generating vehicles are not used to power the vehicle system 1935, 1936, 1937, as discussed in further detail below.

While compiling the vehicle systems 1935, 1936, 1937, if the vehicle system 1935, 1936, 1937 requires backup power, incremental propulsion-generating vehicle 1955, or propulsion-generating vehicles, may be added. However this additional propulsion-generating vehicle 1955 is isolated to minimize fuel use, emission output, and power variation, but may be used to provide backup power in case an operating propulsion-generating vehicle fails, and/or to provide additional power to accomplish the trip within an established mission time. The isolated propulsion-generating vehicle 1955 may be put into an AESS mode to minimize fuel use and having the propulsion-generating vehicle available when needed. In an exemplary embodiment, if a backup, or isolated, propulsion-generating vehicle 1955 is provided, its dimensions, such as weight, may be taken into consideration when determining the vehicle system load.

Thus, as discussed above in more detail, determining minimum power needed to power the vehicle system 1935, 1936, 1937 may occur at vehicle system run time and/or during a run (or mission). In this instance once a determination is made as to optimized vehicle system power and the propulsion-generating vehicles or propulsion-generating vehicle consists in the vehicle system 1935, 1936, 1937 are identified to provide the requisite power needed, the additional propulsion-generating vehicle(s) 1955 not identified for use are put in the idle, or AESS, mode.

In one embodiment, the total mission run may be broken into a plurality of sections, or segments, such as but not limited to at least two segments, such as segment A and segment B as illustrated in FIG. 19. Based on the amount of time taken to complete any segment the backup power, provided by the isolated propulsion-generating vehicle 1955, is provided in case incremental power is needed to meet the trip mission objective. Toward this end, the isolated propulsion-generating vehicle 1955 may be utilized for a specific trip segment to get the vehicle system 1935, 1936, 1937 back on schedule and then switched off for the following segments, if the vehicle system 1935, 1936, 1937 remains on schedule.

Thus in operation, the lead propulsion-generating vehicle may put the propulsion-generating vehicle 1955 provided for incremental power into an isolate mode until the power is needed. This may be accomplished by use of wired or wireless modems or communications from the operator, usually on the lead propulsion-generating vehicle, to the isolated propulsion-generating vehicle 1955. In another embodiment the propulsion-generating vehicles operate in a distributed power configuration and the isolated propulsion-generating vehicle 1955 is already integrated in the distributed power configuration, but is idle, and is switched on when the additional power is required. In yet another embodiment the operator puts the isolated propulsion-generating vehicle 1955 into the appropriate mode.

In one embodiment the initial setup of the propulsion-generating vehicles, based on vehicle system load and mission time, is updated by the energy management system, as disclosed in above, and adjustments to the number and type of powered propulsion-generating vehicles are made. As one example, consider a propulsion-generating vehicle consist of three propulsion-generating vehicles having relative available maximum power of 1, 1.5 and 0.75, respectively. Relative available power is relative to a reference propulsion-generating vehicle; railroads use 'reference' propulsion-generating vehicles to determine the total consist power; this could be a '3000 HP' reference propulsion-generating vehicle; hence, in this example the first propulsion-generating vehicle has 3000 HP, the second 4500 HP and the third 2250 HP). Suppose that the mission is broken into seven segments. Given the above scenario the following combinations are available and can be matched to the track section load, 0.75, 1, 1.5, 1.75, 2.25, 2.5, 3.25, which is the combination of maximum relative HP settings for the consist. Thus for each respective relative HP setting mentioned above, for 0.75 the third propulsion-generating vehicle is on and the first and second are off, for one of the first propulsion-generating vehicle is on and the second and third are off, etc. In one embodiment the energy management system selects the maximum required load and adjusts via notch calls while minimizing an overlap of power settings. Hence, if a segment calls for between 2 and 2.5 (times 3000 HP) then propulsion-generating vehicle 1 and propulsion-generating vehicle 2 are used while propulsion-generating vehicle 3 is in either idle or in standby mode, depending on the time it is in this segment and the restart time of the propulsion-generating vehicle.

In another embodiment, an analysis may be performed to determine a tradeoff between emission output and propulsion-generating vehicle power settings to maximize higher notch operation where the emissions from the exhaust after treatment devices are more optimal. This analysis may also take into consideration one of the other parameters discussed above regarding vehicle system operation optimization. This analysis may be performed for an entire mission run, segments of a mission run, and/or combinations of both.

FIG. 21 depicts a block diagram of exemplary elements included in a system for determining vehicle system power makeup. As illustrated and discussed above, a vehicle system load estimator 2160 is provided. A trip mission time determinator 2170 is also provided. The estimator 2160 and/or determinator 2170 may include hardware circuitry that includes and/or is connected with one or more processors, controllers, or other logic-based devices. One or more processors 1945 also are provided. As disclosed above, though directed at a vehicle system, similar elements may be used for other engines not being used within a rail vehicle, such as but not limited to off-highway vehicles, marine vessels, and stationary units. The processor 1945 calculates a total amount of power required to power the vehicle system 1935, 1936, 1937 based on the vehicle system load determined by the vehicle system load estimator 2160 and a trip mission time determined by the trip mission time determinator 2170. A determination is further made of a type of propulsion-generating vehicle needed and/or a number of propulsion-generating vehicles needed, based on each propulsion-generating vehicle power output, to minimally achieve the minimum total amount of power required based on the vehicle system load and trip mission time.

The trip mission time determinator 2170 may segment the mission into a plurality of mission segments, such as but not limited to segment A and segment B, as described above. The total amount of power may then be individually determined for each segment of the mission. As further discussed above, an additional propulsion-generating vehicle 1955 is part of the vehicle system 1935, 1936, 1937 and is provided for back-up power. The power from the back-up propulsion-generating vehicle 1955 may be used incrementally as a required is identified, such as but not limited to providing power to get the vehicle system 1935, 1936, 1937 back on schedule for a particular trip segment. In this situation, the vehicle system 1935, 1936, 1937 is operated to achieve and/or meet the trip mission time.

The vehicle system load estimator 2160 may estimate the vehicle system load based on information contained in the vehicle system makeup docket 1980, historical data, a rule of thumb estimation, and/or table data. Furthermore, the processor 1945 may determine a trade-off between emission output and propulsion-generating vehicle power settings to increase higher notch operation where the emissions from the exhaust after-treatment devices are improved.

Figure 22:
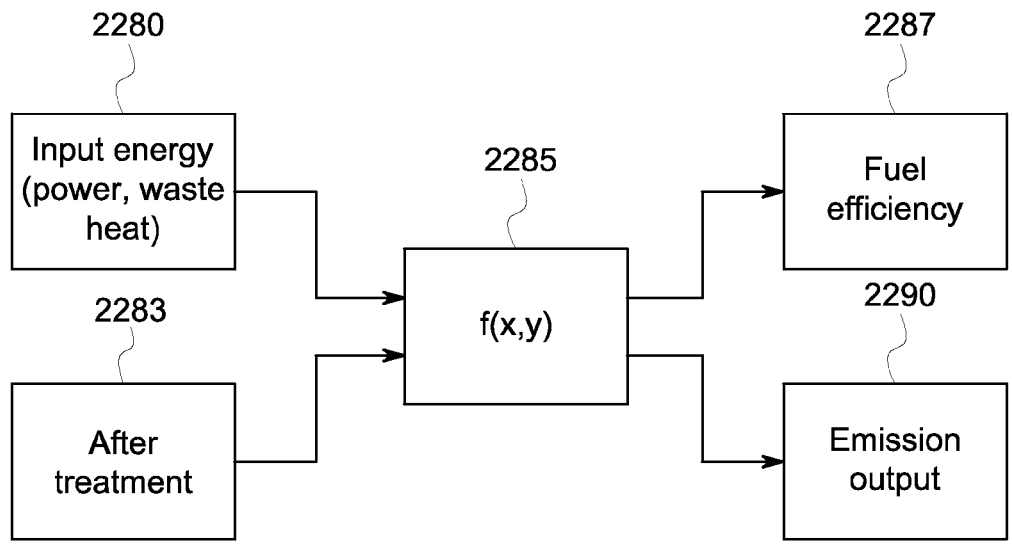
FIG. 22 depicts a block diagram of a transfer function for determining a fuel efficiency and emissions for a powered system.

FIG. 22 depicts a block diagram of a transfer function for determining a fuel efficiency and emissions for a powered system. Such powered systems include, but are not limited to, propulsion-generating vehicles, marine vessels, OHV, and/or stationary generating stations. As illustrated, information pertaining to input energy 2280 (such as but not limited to power, waste heat, etc.) and information about an after treatment process 2283 are provided to a transfer function 2285. The transfer function 2285 utilizes this information to determine an optimum fuel efficiency 2287 and emission output 2290, as described herein.

Figure 23:
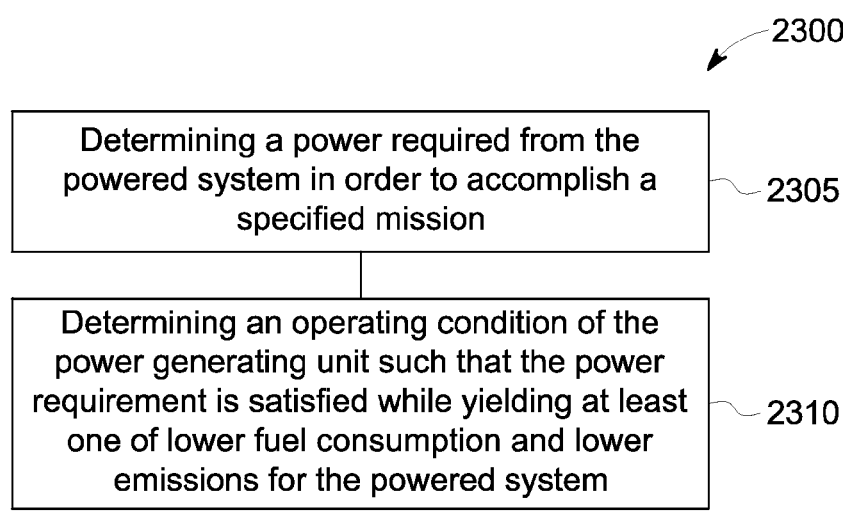
FIG. 23 depicts an embodiment of a flow chart of a method for determining a configuration of a powered system having at least one power generating unit.

FIG. 23 depicts one embodiment of a flow chart of a method 2300 for determining a configuration of a powered system having at least one power generating unit. The method 2300 includes determining a power required from the powered system in order to accomplish a specified mission, at 2305. Determining an operating condition of the power generating unit such that the power requirement is satisfied while yielding lower fuel consumption and/or lower emissions for the powered system, at 2310, is also disclosed. As described above, this method 2300 is applicable for a plurality of power generating units, such as but not limited to a propulsion-generating vehicle, marine vessel, OHV, and/or stationary generating stations. Additionally, this flowchart 2300 may be implemented using a computer software program that may reside on a computer readable media.

Figure 24:
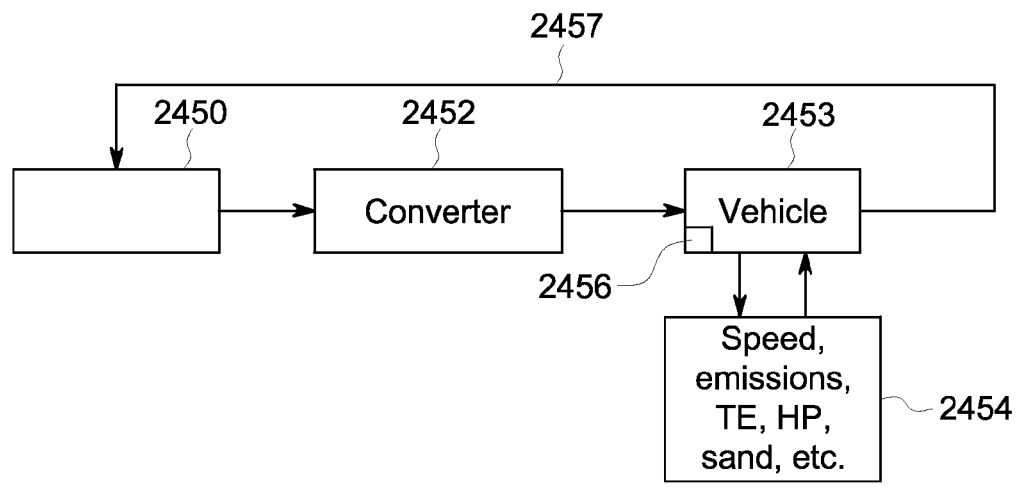
FIG. 24 depicts an embodiment of a closed-loop system for operating a vehicle or vehicle system.

FIG. 24 depicts one embodiment of a closed-loop system for operating a vehicle. As illustrated, an energy management system 2450, a converter 2452, a vehicle 2453, and at least one output 2454 from gathering specific information, such as but not limited to speed, emissions, tractive effort, horse power, a friction modifier technique (such as but not limited to applying sand), etc., are part of the closed-loop control communication system 2457. The output 2454 may be determined by a sensor 2456 which is part of the vehicle 2453, or in another embodiment, independent of the vehicle 2453. Information initially derived from information generated from the energy management system 2450 and/or a regulator is provided to the vehicle 2453 through the converter 2452. Propulsion-generating vehicle data gathered by the sensor 2454 from the vehicle is then communicated 2457 back to the energy management system 2450.

The energy management system 2450 determines operating characteristics for at least one factor that is to be regulated, such as but not limited to speed, fuel, emissions, etc. The energy management system 650 determines a power and/or torque setting based on a determined optimized value. The converter 2452 is provided to convert the power, torque, speed, emissions, initiate applying a friction modifying technique (such as but not limited to applying sand), setup, configurations etc., control inputs for the vehicle 2453, usually a propulsion-generating vehicle. Specifically, this information or data about power, torque, speed, emissions, friction modifying (such as but not limited to applying sand), setup, configurations etc., and/or control inputs is converted to an electrical signal.

Figure 25:
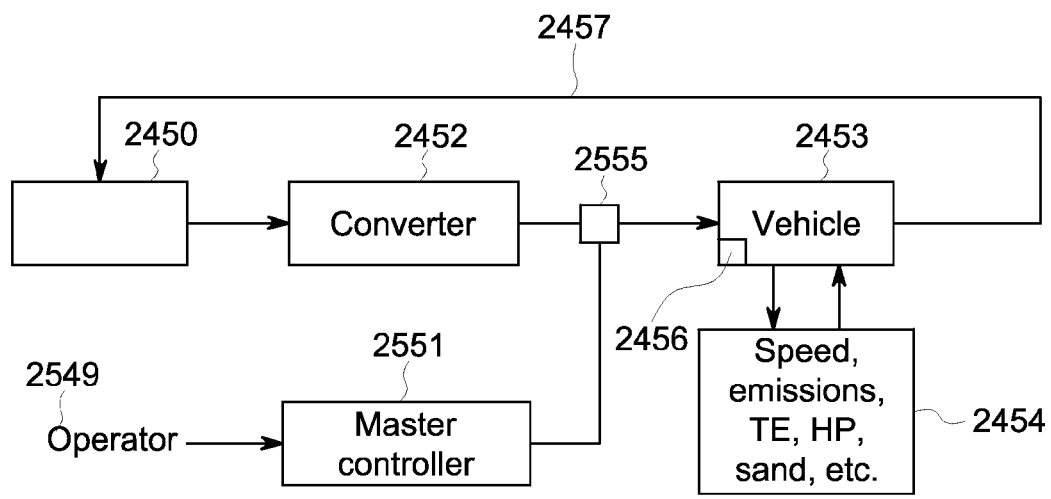
FIG. 25 depicts the closed loop system of FIG. 24 integrated with a master control unit.

FIG. 25 depicts the closed loop system shown in FIG. 24 integrated with a master control unit according to one embodiment. As illustrated in further detail below, the converter 2452 may interface with any one of a plurality of devices, such as but not limited to a master controller, remote control propulsion-generating vehicle controller, a distributed power drive controller, a vehicle system line modem, analog input, etc. The converter 2452, for example, may disconnect the output of a master controller (or actuator) 2551. The controller 2551 is used by an operator 2549 to command the propulsion-generating vehicle, such as but not limited to power, horsepower, tractive effort, implement a friction modifying technique (such as but not limited to applying sand), braking (including at least one of dynamic braking, air brakes, hand brakes, etc.), propulsion, etc. levels to the propulsion-generating vehicle. The master controller 2551 may be used to control both hard switches and software based switches used in controlling the propulsion-generating vehicle. The converter 2452 then injects signals into the controller 2551. The disconnection of the actuator 2551 may be electrical wires or software switches or configurable input selection process etc. A switching device 2555 is illustrated to perform this function.

Though 2517 discloses a master controller, which is specific to a propulsion-generating vehicle, in other applications, as disclosed above, another device provides the function of the master controller as used in the propulsion-generating vehicle. For example, an accelerator pedal is used in an OHV and transportation bus, and an excitation control is used on a generator. With respect to the marine there may be multiple force producers (propellers), in different angles/orientation need to be controlled closed loop.

As described above, the same technique may be used for other devices, such as but not limited to a control propulsion-generating vehicle controller, a distributed power drive controller, a vehicle system line modem, analog input, etc. Though not illustrated, the master controller similarly could use these devices and their associated connections to the propulsion-generating vehicle and use the input signals. The communication system 2457 for these other devices may be either wireless or wired.

Figure 26:
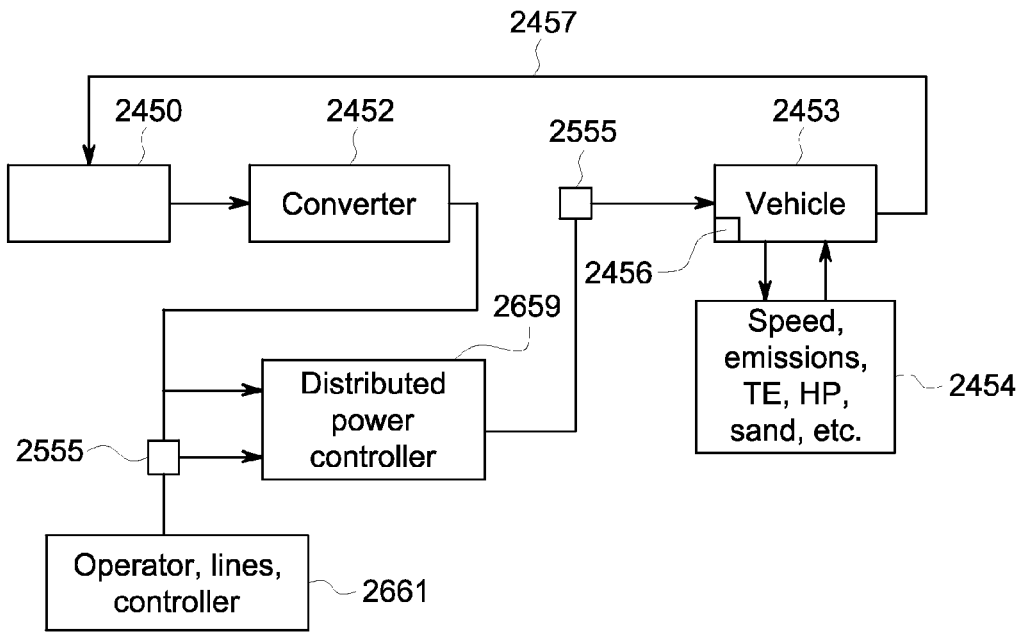
FIG. 26 depicts an embodiment of a closed-loop system for operating a vehicle system integrated with another input operational subsystem of the vehicle system.

FIG. 26 depicts an embodiment of a closed-loop system for operating a rail vehicle integrated with another input operational subsystem of the rail vehicle. For example, a distributed power drive controller 2659 may receive inputs from various sources 2661, such as but not limited to the operator, vehicle system lines, propulsion-generating vehicle controllers and transmit the information to propulsion-generating vehicles in the remote positions. The converter 2452 may provide information directly to input of the DP controller 2659 (as an additional input) or break one of the input connections and transmit the information to the DP controller 2659. A switch 2555 is provided to direct how the converter 2452 provides information to the DP controller 2659 as descried above. The switch 2555 may be a software-based switch and/or a wired switch. Additionally, the switch 2555 is not necessarily a two-way switch. The switch may have a plurality of switching directions based on the number of signals that the switch is controlling.

Figure 27:
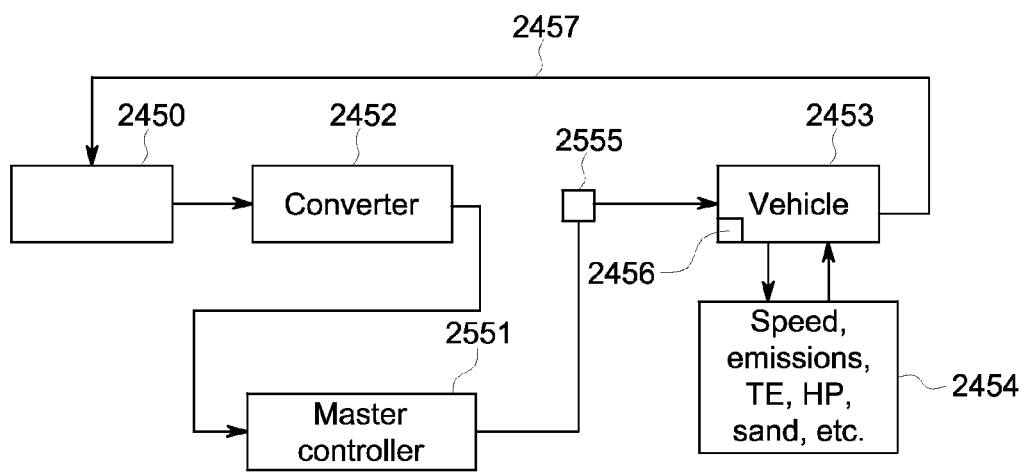
FIG. 27 depicts another embodiment of the closed-loop system with a converter which may command operation of the master controller.

In another embodiment, the converter may command operation of the master controller, as illustrated in FIG. 27. The converter 2452 can mechanically move the actuator 2551 automatically based on electrical signals received from the energy management system 2450.

Sensors 2454 are provided aboard the propulsion-generating vehicle to gather operating condition data, such as but not limited to speed, emissions, tractive effort, horse power, etc. Propulsion-generating vehicle output information is then provided to the energy management system 2450, usually through the vehicle, thus completing the closed loop system.

Figure 28:
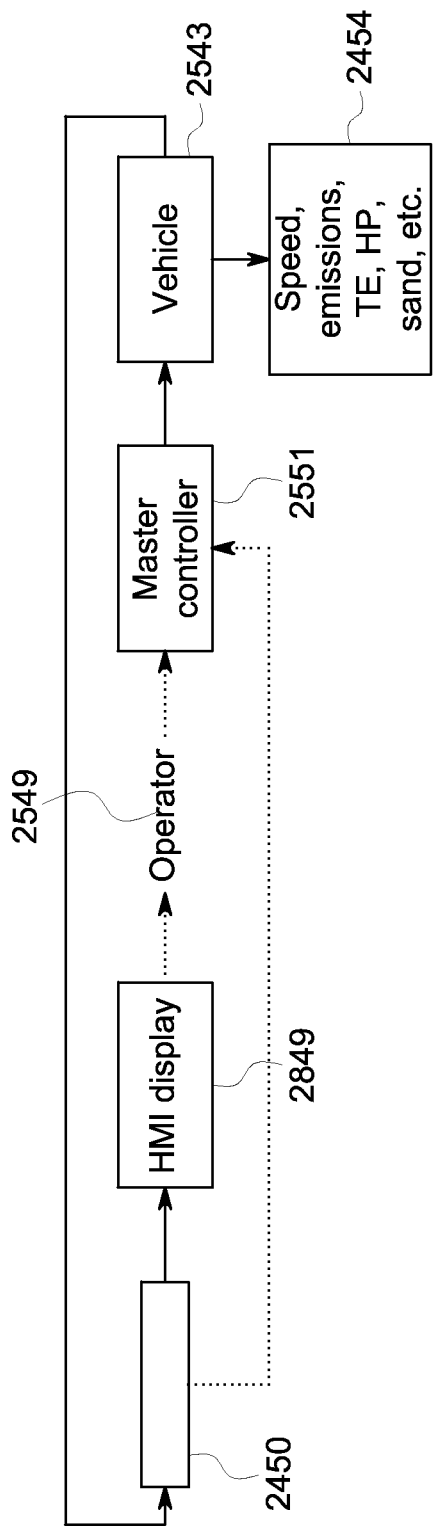
FIG. 28 depicts another embodiment of a closed-loop system.

FIG. 28 depicts another closed loop system where an operator is in the loop. The energy management system 2450 generates the power/operating characteristic required for the optimum performance. The information is communicated to the operator 2549, such as but not limited to, through a human machine interface (HMI) and/or display 2849. This could be in various forms including audio, text or plots or video displays. The operator 2549 in this case can operate the master controller or pedals or any other actuator 2551 to follow the power level dictated by a trip plan.

If the operator follows the plan, the energy management system 2450 can display the next operation required. If the operator does not follow the plan, the energy management system 2450 may recalculate/re-optimize the plan, depending on the deviation and the duration of the deviation of power, speed, position, emission etc. from the plan. If the operator fails to meet an optimized plan to an extent where re-optimizing the plan is not possible or where safety criteria has been or may be exceeded, in one embodiment the energy management system 2450 may take control of the vehicle to ensure operation according to the trip plan, annunciate a need to consider the trip plan, or simply record it for future analysis and/or use. In such an embodiment, the operator could retake control by manually disengaging the energy management system 2450.

Figure 29:
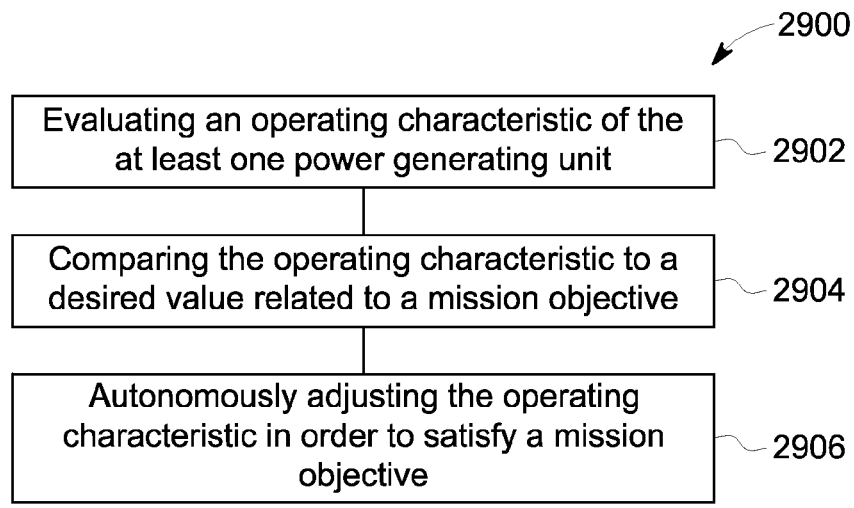
FIG. 29 depicts an embodiment of a flowchart of a method for operating a powered system.

FIG. 29 depicts one embodiment of a flowchart of a method 2900 for operating a powered system having at least one power generating unit where the powered system may be part of a fleet and/or a network of powered systems. Evaluating an operating characteristic of at least one power generating unit is disclosed, at 2902. The operating characteristic is compared to a desired value related to a mission objective, at 2904. The operating characteristic is autonomously adjusted in order to satisfy a mission objective, at 2906. As disclosed herein, the autonomously adjusting may be performed using a closed-loop technique. Furthermore, the embodiments disclosed herein may also be used where a powered system is part of a fleet and/or a network of powered systems.

Figure 30:
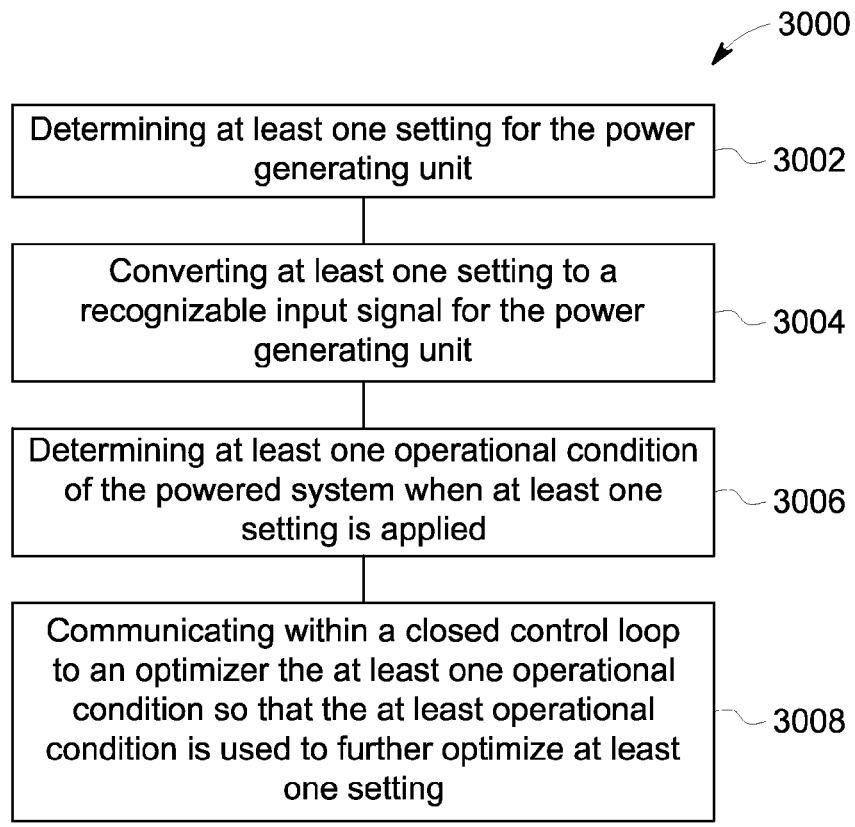
FIG. 30 depicts a flowchart of a method for operating a vehicle system in a closed-loop process.

FIG. 30 depicts an example of a flowchart of a method 3000 for operating a vehicle in a closed-loop process. The method 3000 includes determining a designated setting for a propulsion-generating vehicle consist, at 3002. The setting may include a setting for any setup variable such as but not limited to at least one of power level, torque emissions, other propulsion-generating vehicle configurations, etc. Converting the power level and/or the torque setting to a recognizable input signal for the propulsion-generating vehicle consist, at 3004, is also disclosed. At least one operational condition of the propulsion-generating vehicle consist is determined when at least one of the power level and the torque setting is applied, at 3006. Communicating within a closed control loop to an optimizer (e.g., the energy management system) the at least one operational condition so that the at least operational condition is used to further optimize at least one of power level and torque setting, at 3008, is further disclosed.

As disclosed above, this method 3000 may be performed using a computer software code. Therefore, for vehicles that may not initially have the ability to utilize the method 3000 disclosed herein, electronic media containing the computer software modules may be accessed by a computer on the vehicle so that at least of the software modules may be loaded onto the vehicle for implementation. Electronic media is not to be limiting since any of the computer software modules may also be loaded through an electronic media transfer system, including a wireless and/or wired transfer system, such as but not limited to using the Internet to accomplish the installation.

Propulsion-generating vehicles produce emission rates based on notch levels. In reality, a lower notch level does not necessarily result in a lower emission per unit output, such as for example gm/hp-hr, and the reverse is true as well. Such emissions may include, but are not limited to particulates, exhaust, heat, etc. Similarly, noise levels from a propulsion-generating vehicle also may vary based on notch levels, in particularly noise frequency levels. Therefore, when emissions are mentioned herein, one or more embodiments are also applicable for reducing noise levels produced by a powered system. Therefore even though both emissions and noise are disclosed at various times herein, the term emissions should also be read to also include noise.

When an operator calls for a specific horse power level, or notch level, the operator is expecting the propulsion-generating vehicle to operate at a certain traction power or tractive effort. In one embodiment, to reduce emission output, the propulsion-generating vehicle is able to switch between notch/power/engine speed levels while maintaining the average traction power desired by the operator. For example, suppose that the operator calls for Notch 4 or 2000 HP. Then the propulsion-generating vehicle may operate at Notch 3 for a given period, such as a minute, and then move to Notch 5 for a period and then back to Notch 3 for a period such that the average power produced corresponds to Notch 4. The propulsion-generating vehicle moves to Notch 5 because the emission output of the propulsion-generating vehicle at this notch setting is already known to be less than when at Notch 4. During the total time that the propulsion-generating vehicle is moving between notch settings, the average is still Notch 4, thus the tractive power desired by the operator is still realized.

The time for each notch is determined by various factors, such as but not limited to, including the emissions at each notch, power levels at each notch, and the operator sensitivity. One or more embodiments are operable when the propulsion-generating vehicle is being operated manually, and/or when operation is automatically performed, such as but not limited to when controlled by an energy management system, and during low speed regulation.

In another embodiment, multiple set points are used. These set points may be determined by considering a plurality of factors such as, but not limited to, notch setting, engine speed, power, engine control settings, etc. In another embodiment, when multiple propulsion-generating vehicles are used but may operate at different notch/power settings, the notch/power setting are determined as a function of performance and/or time. When emissions are being reduced, other factors that may be considered wherein a tradeoff may be considered in reducing emissions includes, but are not limited to, fuel efficiency, noise, etc. Likewise, if the desire is to reduce noise, emissions and fuel efficiency may be considered. A similar analysis may be applied if fuel efficiency is what is to be improved.

Figure 31:
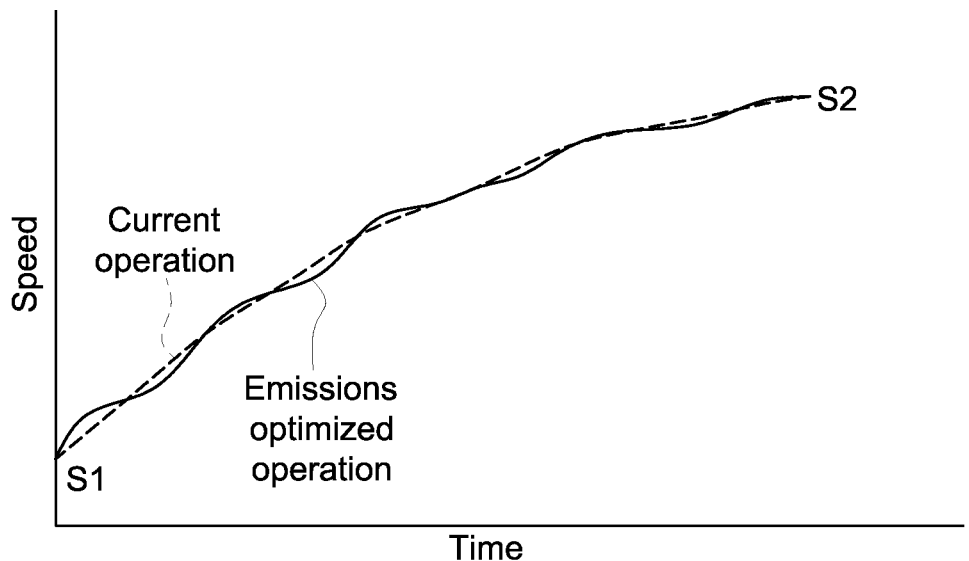
FIG. 31 depicts an embodiment of a speed versus time graph comparing current operations to emissions optimized operation.

FIG. 31 depicts an embodiment of a speed versus time graph comparing current operations to operation according to a trip plan that is created to reduce emission production. The speed change compared to desirable speed can be arbitrarily reduced. For example, if the operator desires to move from one speed (S1) to another speed (S2) within a desired time, it can be achieved with minor deviations.

Figure 32:
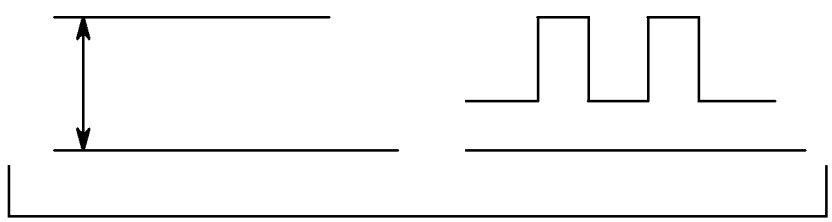
FIG. 32 depicts a modulation pattern compared to a given notch level.

FIG. 32 depicts a modulation pattern that results in maintaining a constant desired notch and/or horsepower. The amount of time at each notch depends on the number of propulsion-generating vehicles and the weight of the vehicle system and its characteristics. Essentially the inertia of the vehicle system is used to integrate the tractive power/effort to obtain a desired speed. For example, if the vehicle system is heavy the time between transitions of Notches 3 to 5 and vice versa in the example can be large. In another example, if the number of propulsion-generating vehicles for a given vehicle system is great, the time between transitions need to be smaller. More specifically, the time modulation and/or cycling will depend on vehicle system and/or propulsion-generating vehicle characteristics.

As discussed previously, emission output may be based on an assumed notch distribution but the operator/rail road is not required to have that overall distribution. Therefore, it is possible to enforce the Notch distribution over a period of time, over many propulsion-generating vehicles over a period of time, and/or for a fleet propulsion-generating vehicles over a period of time. By being providing emission data, the trip optimized described herein compares the notch/power setting desired with emission output based on notch/power settings and determines the notch/power cycle to meet the speed required while reducing emission output. The optimization could be explicitly used to generate the plan, or the plan could be modified to enforce, reduce, and/or meet the emissions required.

Figure 33:
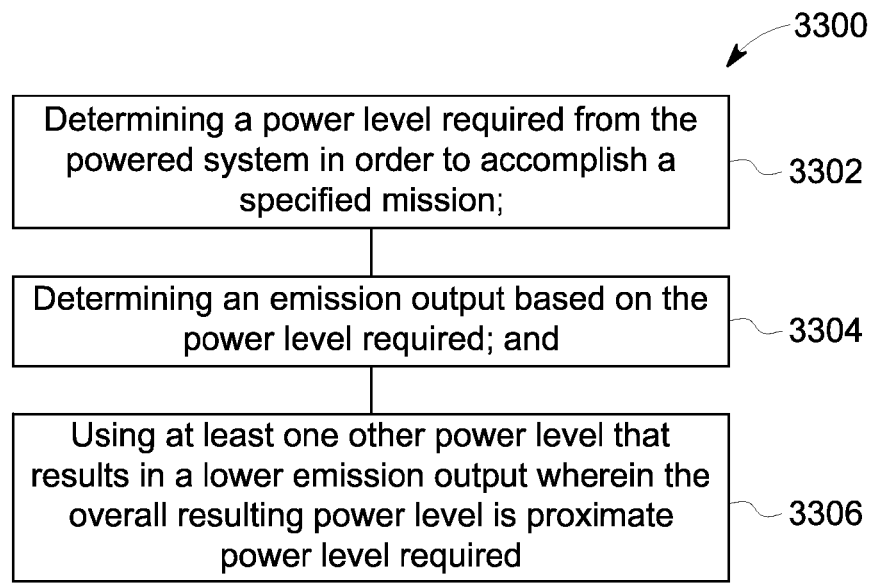
FIG. 33 depicts a flowchart of a method for determining a configuration of a powered system.

FIG. 33 depicts an embodiment of a flowchart of a method 3300 for determining a configuration of a powered system having at least one power generating unit. The method 3300 provides for determining a minimum power, or power level, required from the powered system in order to accomplish a specified mission, at 3302. An emission output based on the minimum power, or power level, required is determined, at 3304. Using at least one other power level that results in a lower emission output wherein the overall resulting power is proximate the power required, at 3306, is also disclosed. Therefore in operation, the desired power level with at least another power level may be used and/or two power levels, not including the desired power level may be used. In the second example, as disclosed if the desires power level is Notch 4, the two power levels used may include Notch 3 and Notch 5.

Emission output data based on notch speed is provided to the energy management system. If a certain notch speed produces a high amount of emission, the energy management system can function by cycling between notch settings that produce lower amounts of emission output so that the propulsion-generating vehicle will avoid operating at the particular notch while still meeting the speed of the avoided notch setting. For example, applying the same example provided above, if Notch 4 is identified as a less than optimum setting to operate at because of emission output, but other Notch 3 and 5 produce lower emission outputs, the energy management system may cycle between Notch 3 and 5 where that the average speed equates to speed realized at Notch 4. Therefore, while providing speed associated with Notch 4, the total emission output is less than the emission output expected at Notch 4.

Therefore, when operating in this configuration, though designated speeds of a trip plan based on defining Notch limitations may not actually be adhered to, total emission output over a complete mission may be improved. More specifically, though a region may impose that vehicles are not to exceed Notch 5, the energy management system may determine that cycling between Notch 6 and 4 may be preferable to reach the Notch 5 speed limit but while also improving emission output because emission output for the combination of Notch 6 and 4 are better than when operating at Notch 5 since either Notch 4 or Notch 6 or both are better than Notch 5.

Figure 34:
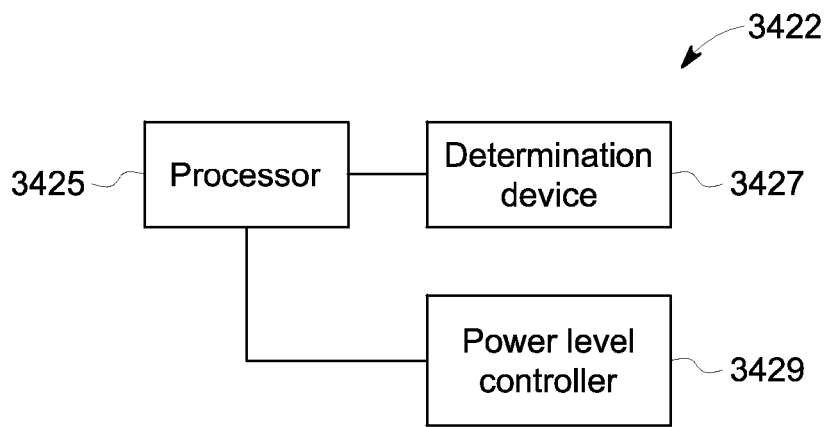
FIG. 34 depicts a system for reducing emission output.

FIG. 34 illustrates a system 3422 for reducing emission output, noise level, etc., from a powered system having at least one power generating unit while maintaining a specific speed. As disclosed above, the system 3422 includes one or more processors 3425 for determining a power required from the powered system (e.g., a vehicle system) in order to accomplish a specified mission is provided. The processor 3425 may also determine when to alternate between two power levels. A determination device 3427 is used to determine an emission output based on the power required. A power level controller 3429 for alternating between power levels to achieve the power required is also included. The power level controller 3429 functions to produce a lower emission output while the overall average resulting power is proximate the power required. The determination device 3427, power level controller 3429, and/or processors 3425 may include one or more of the same or different processors, controllers, or other electronic logic-based devices.

Figure 35:
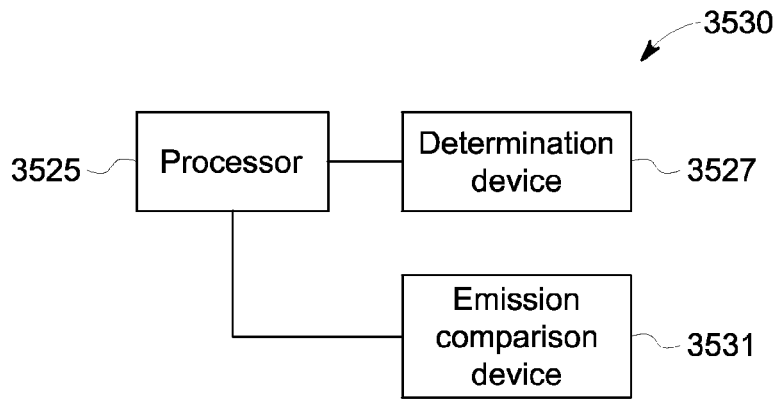
FIG. 35 depicts a system for reducing emission output from a powered system.

FIG. 35 illustrates a system 3530 for reducing such output as but not limited to emission output and noise output from a powered system having at least one power generating unit while maintaining a specific speed. The system includes one or more processors 3525 for determining a power level required from the powered system in order to accomplish a specified mission. An emission determinator device 3527 for determining an emission output based on the power level required is further disclosed. An emission comparison device 3531 is also disclosed. The emission comparison device 3531 compares emission outputs for other power levels with the emission output based on the power level required. The processor 3525, device 3527, and/or device 3531 can include one or more processors or hardware circuitry that includes and/or is connected with one or more processors. The emission output of the power generating unit (e.g., a vehicle system) is reduced based on the power level required by alternating between at least two other power levels which produce less emission output than the power level required wherein alternating between the at least two other power levels produces an average power level proximate the power level required while producing a lower emission output than the emission output of the power level required. As disclosed herein, alternating may simply result in using at least one other power level. Therefore though discussed as alternating, this term is not used to be limiting. Toward this end, a device (e.g., a controller, switch, throttle, or the like) is provided for alternating between the at least two power levels and/or at least use on other power level.

Though the above examples illustrate cycling between two notch levels to meet a third notch level, more than two notch levels may be used when seeking to meet a specific desired notch level. Therefore, three or more notch levels may be included in cycling to achieve a specific desired notch level to improve emissions while still meeting speed requirements. Additionally, one of the notch levels that are alternated between may include the desired notch level. Therefore, the desired notch level and another notch level may be the two power levels that are alternated between.

Figure 36:
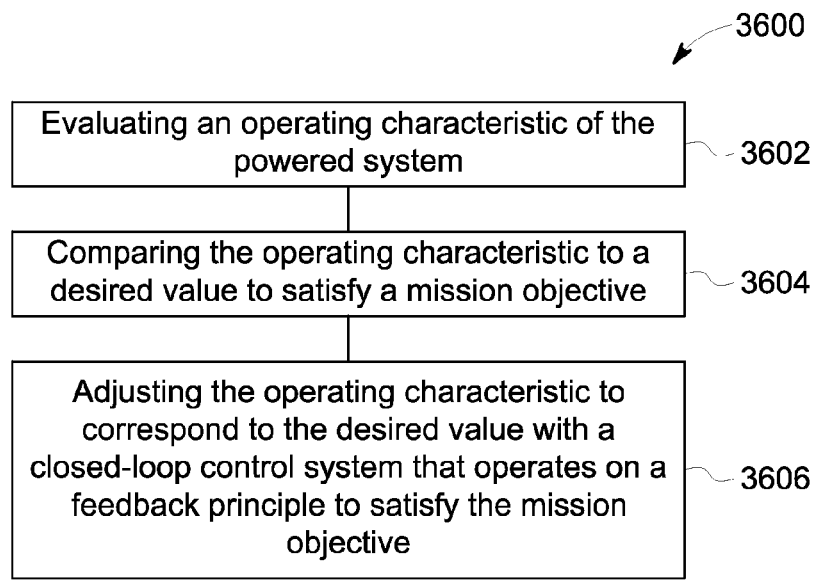
FIG. 36 depicts a flowchart of a method for operating a powered system having at least one power generating unit.

FIG. 36 discloses an example flowchart of a method 3600 for operating a powered system having at least one power generating unit. The mission objective may include consideration of at least one of total emissions, maximum emission, fuel consumption, speed, reliability, wear, forces, power, mission time, time of arrival, time of intermediate points, and braking distance. The mission objective may further include other objectives based on the specific mission of the diesel powered system. For example, as disclosed above, a mission objective of a propulsion-generating vehicle may be different than that that of a stationary power generating system. Therefore, the mission objective can be based on the type of powered system that the method 3600 is utilized with.

The method 3600 discloses evaluating an operating characteristic of the powered system, at 3602. The operating characteristic may include at least one of emissions, speed, horse power, friction modifier, tractive effort, overall power output, mission time, fuel consumption, energy storage, and/or condition of a surface upon which the powered system operates. Energy storage can be important when the powered system is a hybrid system having, for example, a power generating unit as its primary power generating system, and an electrical, hydraulic or other power generating system as its secondary power generating system. With respect to speed, this operating characteristic may be further subdivided with respect to time varying speed and position varying speed.

The operational characteristic may further be based on a position of the diesel powered system when used in conjunction with at least one other diesel powered system. For example, in a vehicle system, when viewing each propulsion-generating vehicle as a diesel powered system, a propulsion-generating vehicle consist may be utilized with a vehicle system. Therefore there will be a lead propulsion-generating vehicle and a remote propulsion-generating vehicle. For those propulsion-generating vehicles that are in a trail position, trail mode considerations are also involved. The operational characteristic may further be based on an ambient condition, such as but not limited to temperature and/or pressure.

Also disclosed in the method 3600 is comparing the operating characteristic to a desired value to satisfy the mission objective, at 3604. The desired value may be determined from at least one of the operational characteristic, capability of the powered system, and/or at least one design characteristic of the powered system. With respect to the design characteristics of the powered system, there are various modules of propulsion-generating vehicles where the characteristics vary. The desired value may be determined at least one of at a remote location, such as but not limited to a remote monitoring station, and at a location that is a part of the powered system.

The desired value may be based on a location and/or operating time of the powered system. As with the operating characteristic, the desired value is further based on at least one of emissions, speed, horse power, friction modifier, tractive effort, ambient conditions including at least one of temperature and pressure, mission time, fuel consumption, energy storage, and/or condition of a surface upon which the diesel powered system operates. The desired value may be further determined based on a number of a power generating units that are either a part of the powered system and/or a part of a consist, or at the sub-consist level as disclosed above.

Adjusting the operating characteristic to correspond to the desired value with a closed-loop control system that operates in a feedback process to satisfy the mission objective, at 3606, is further disclosed. In general, but not to be considered limiting, the feedback process receives information and makes determinations based on the information received. The closed-loop approach allows for the implementation of the method 3600 without outside interference. If required due to safety issues, however, a manual override also can be provided. The adjusting of the operating characteristic may be made based on an ambient condition. As disclosed above, this method 3600 may also be implemented in a computer software code where the computer software code may reside on a computer readable media.

Figure 37:
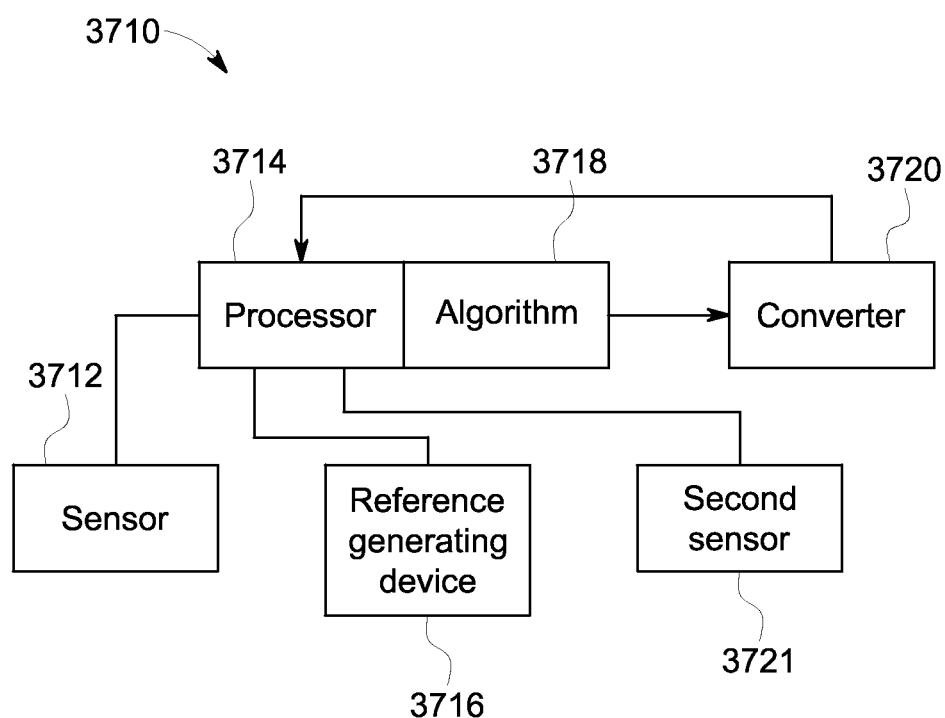
FIG. 37 depicts a block diagram of a system operating a powered system having at least one power generating unit.

FIG. 37 discloses a block diagram of an exemplary system 3700 for operating a powered system having at least one power generating unit. With the system 3700, a sensor 3712 is configured for determining at least one operating characteristic of the powered system is disclosed. In one embodiment, a plurality of sensors 3712 is provided to gather operating characteristics from a plurality of locations on the powered system and/or a plurality of subsystems within the powered system. The sensor 3712 may be an operational input device. Therefore, the sensor 3712 can gather operating characteristics, or information, about emissions, speed, horse power, friction modifier, tractive effort, ambient conditions including at least one of temperature and pressure, mission time, fuel consumption, energy storage, and/or condition of a surface upon which the diesel powered system operates. One or more processors 3714 are in communication with the sensor 3712. A reference generating device 3716 is provided and is configured to identify the preferred operating characteristic. The reference generating device 3716 is in communication with the processor 3714. When the term "in communication" is used, the form of communication may be facilitated either through a wired and/or wireless communication system and/or device. The reference generating device 3716 is at least one of remote from the powered system and a part of the powered system, and includes one or more processors, controllers, or other electronic logic-based devices.

An algorithm 3718 is within the processor 3714 that operates in a feedback process that compares the operating characteristic to the preferred operating characteristic to determine a desired operating characteristic. A converter 3720, in closed loop communication with the processor 814 and/or algorithm 818, is further provided to implement the desired operating characteristic. The converter 820 may be at least one of a master controller, a remote control controller, a distributed power controller, and a trainline modem. More specifically, when the powered system is a train, the converter may be a remote locomotive controller, a distributed power locomotive controller, and a train line modem.

As further illustrated, a second sensor 3721 may be included. The second sensor is configured to measure at least one ambient condition that is provided to the algorithm 3718 and/or processor 3714 to determine a desired operating characteristic. As disclosed above, exemplary examples of an ambient condition include, but are not limited to temperature and pressure.

Figure 38:
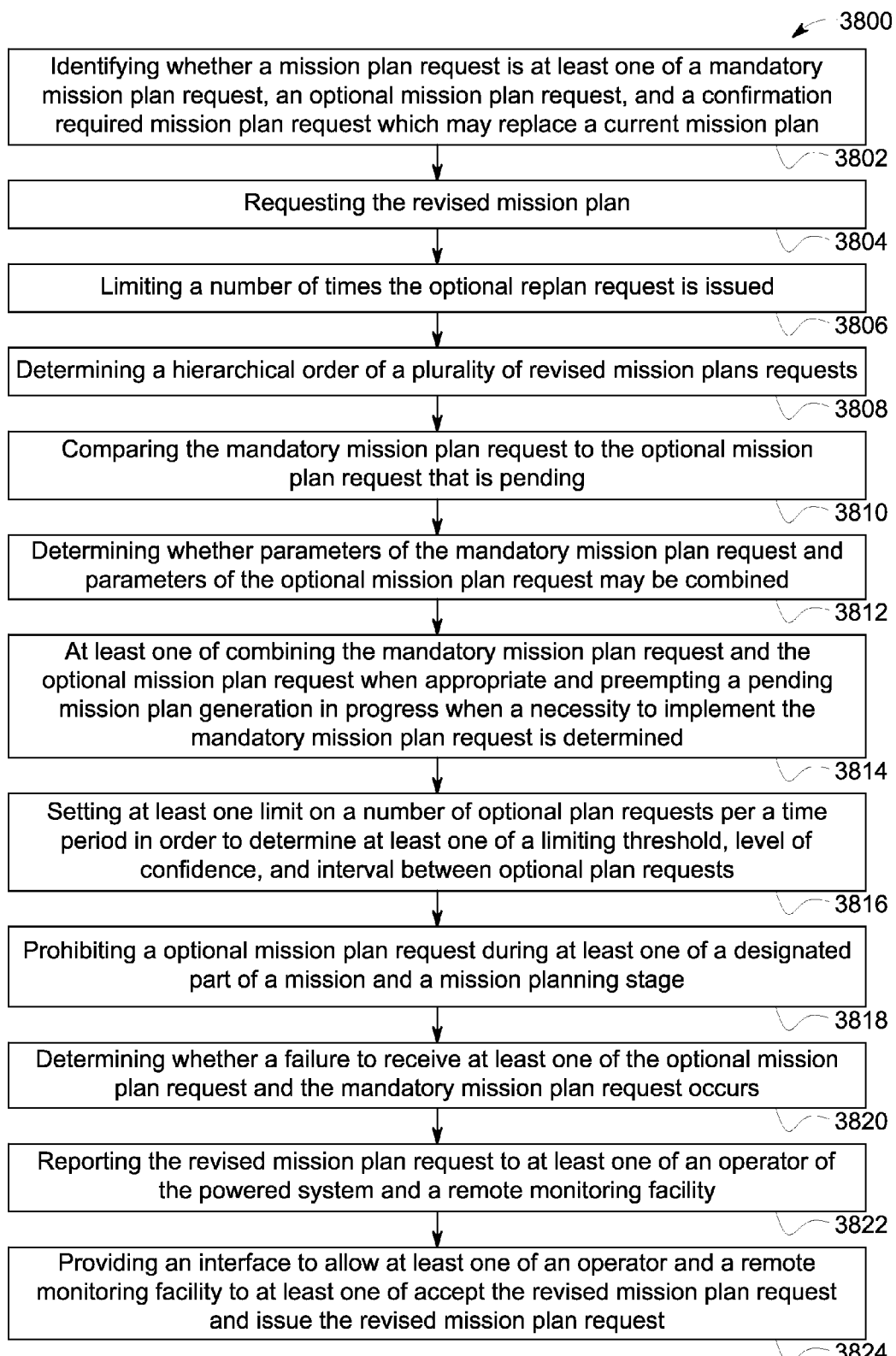
FIG. 38 discloses a flow chart of a method for determining when to request a revised mission plan and FIG. 39 (which includes parts 39A and 39B) discloses a flow chart of a method for implementing a revised mission plan request.

Even as a mission plan is implemented, as disclosed above, updates to the mission plan may be made. To ensure an inordinate number of mission re-plan attempts are not made, strategically discriminating between re-plan requests can be performed. FIG. 38 illustrates a flow chart of one embodiment of a method 3800 for determining when to request a revised mission plan from a computer-readable instruction that when executed by one or more processors, such as but not limited to a computer software code, causes the one or more processors to generate a mission plan for a powered system. The method 3800 discloses identifying whether at least one revised mission plan request is a mandatory mission plan request, an optional mission plan request, and/or a confirmation required mission plan request which may replace a current mission plan, at 3802. A request for the revised mission plan may occur, at 3804. A number of times an optional replan request is requested may be limited to a certain number of replans per some time period when there are multiple, or a plurality of optional re-plan requests provided, at 3806.

The terms "mandatory" and "optional" as used herein with respect to a mission replan request are not limiting terms on all embodiments of the subject matter disclosed herein. How a replan request is prioritized should still be determined by whether it is appropriate based on other factors disclosed herein. Mandatory and optional are terms used simply to provide a guideline with respect to prioritizing. A mandatory mission plan request may include a request that has an immediate effect as a function of time and/or location, provides for a significant consequence and/or a significant payback to the mission, and/or may be implemented when there is a plurality of less significant consequences bundled together. For example, if there is a speed limit change that is immediate, this may be defined as a mandatory mission plan request. However if the speed limit change is for a segment of the mission that is still a distance away, such as several miles away, this may be defined as an optional mission plan request. As the distance to implementing the speed limit change approaches the request may become a mandatory mission plan request. Whether a mission plan request is mandatory or optional may also be determined based on a weighted factor or decision. For example, one weighted factor may be based on available processor processing time. If processing time is available then requests may be implemented more freely, such as immediately, than when processing time is not available. Therefore those skilled in the art will recognize that use of the terms mandatory and optional is only provided to assist in explaining when a replan request may be implemented, but is not intended to limit and/or define prioritizing of replan mission requests.

Limiting the number of times the optional mission plan requests may be determined by a current capability to generate the revised mission plan wherein a number of times a plurality of optional mission plan requests is based on at least one powered system capability and/or at least one powered system limitation. This capability and/or limitation may include, but is not limited to the processor utilization, processor capability, network utilization, network capability, the mode of the system, etc. When an optimal mission plan is requested and is not allowed due to the aforementioned timing restriction, it may be designated as pending.

The method 3800 further discloses determining a hierarchical order of a plurality of revised mission plans requests, at 3808. The hierarchical order may be determined based on whether the revised mission plan request in a plurality of revised mission plan requests is a mandatory mission plan request, an optional mission plan request, and/or a confirmation required mission plan request. In this situation the mandatory mission plan request has priority. The hierarchical order may also be determined by the revised mission plan parameter being an upper threshold level different than a past mission plan parameter. This would cause the mission plan request category to change from an optional mission plan request to a mandatory mission plan request. The priority may further include determination of time of execution on the processor as well as pre-empting past mission plan requests if one or more revised mission plans are still in the progress of being calculated.

Also disclosed in the method 3800 is comparing the mandatory mission plan request to the optional mission plan request, at 3810. A determination is made whether the mandatory mission plan request and the optional mission plan request may be combined, at 3812. The new mandatory mission plan request parameters and a pending optional mission plan request parameters may be combined so that the mandatory mission plan request parameters have precedence, at 3814. An optional mission plan generation in progress may be preempted to implement a more recent mandatory mission plan request, at 3814.

The mandatory plan request may be generated as a result of a change with a powered system operating environment, powered system network environment, at least one operator request, at least one control system request, at least one remote facility request, destination arrival time, trip characteristics modification, and/or at least one platform emission requirement. The mandatory plan request may also be implemented by the operator and/or a remote monitoring facility, where the term remote monitoring facility may include any entity that is remote from the powered system, such as but not limited to an off-board operator. For example, determining the type of revised mission plan request may be accomplished by determining whether a parameter input is an operator parameter input and/or a remote monitoring facility parameter input.

The optional plan request may be generated as a result of a change with a power system operating parameter, an estimated operating parameter, operational condition, operational environment, power system health, at least one power system capability, and/or a power system configuration. An operator and/or an off-board operator, such as but not limited to a remote monitoring facility may request the optional plan request. Other changes that may occur to effect whether to implement the optional plan request include whether computer processing time is available, long term schedule changes, such as but not limited to arrival time changed such as via the operator and/or the remote monitoring facility, a current operation parameter such as but not limited to current fuel consumption, a change in time constraints such as but not limited to excess or deficient slack-time, estimated tons per operative brake (TPOB) available, etc.

Additionally, the plan request may be generated as a result of a network change. This may occur where the power system is part of an overall network of power system changes occurring with a network configuration, a network utilization, and/or a network prioritization.

Identifying whether a revised mission plan request is issued may be accomplished by determining a threshold level, a level of confidence, a confidence level threshold, a difference between a current confidence level and a best confidence level determined during a current mission, a confidence trend, and an interval between one parameter of a last mission plan and/or at least one current input parameter to determine whether to issue an optional mission plan request. With respect to a vehicle system, these input parameters may include but are not limited to vehicle system parameters, propulsion-generating vehicle parameters, route parameters, trip parameters and may come from an onboard system or algorithm, operator input via switches and/or screen input, or from a remote facility via wired or wireless communication.

The method 3800 further discloses setting an absolute limit as to a number of optional mission plan requests per a time period, such as but not limited to a mission duration, may be accomplished, at 3816. This limit may be used to determine a limiting threshold, level of confidence, and/or an interval between optional mission plan requests. An optional mission plan request may be prohibited during a designated part of a mission and/or during a mission planning stage, at 3818.

A determination is made whether a failure to receive the requested optional mission plan and/or the requested mandatory mission plan may be determined, at 3820. Failure to receive the requested optional mission plan provided may result in a current mission plan being used until a second optional and/or mandatory mission plan is received. With respect to the mandatory mission plan request, however, failure to receive the requested mandatory mission plan provided may prohibit use of a current mission plan until a second optional and/or mandatory mission plan is received.

The method 3800 further illustrates reporting the revised mission plan request to an operator of the powered system and/or a remote monitoring facility, at 3822. An interface may be provided to allow the operator and/or the remote monitoring facility an ability to accept the revised mission plan request, at 3824, when the mission plan request is further classified as confirmation required. This category includes mission plan requests that are due to critical parameters being updated that an operator needs to confirm, which may be referred to as a confirmation required mission plan request. These critical parameters could include but are not limited to a change to a physical characteristic of the powered system such as but not limited to a vehicle system length when the powered system is a vehicle system, trip definition modifications, any parameter with a threshold level of difference from any past mission plan. Determining whether a change in threshold level occurs may involve comparing the existing mission and revised mission plan requests to prior mission plans. Therefore, a database containing information about prior mission plans is provided.

Additionally, braking ability, such as but not limited to braking with air brakes, may be determined and information regarding braking may be included when identifying whether the revised mission plan request is the mandatory mission plan request, the optional mission plan request, and/or the confirmation required mission plan request. Other powered system parameters may be considered when determining the mission plan request type.

Additionally, revised mission plan requests may be based on a periodic schedule using best known information at the time of the request. Furthermore revised mission plan requests may be based on CPU utilization. If the CPU has free time or low priority tasks a revised mission plan could be requested using the best known information at the time of the request. In one embodiment, CPU utilization decisions are only considered with respect to the optional mission plan request.

Revised mission plan requests may be based on changes to current schedule or number of stops as dictated by a vehicle system control system or a remote facility. Furthermore, revised mission plan requests may be as a result of vehicle system control system or remote facility request, such as changes in schedule, characteristics of the powered system, route characteristics, operating condition, network capacity, fuel consumption, or emissions generation.

Figure 39A:
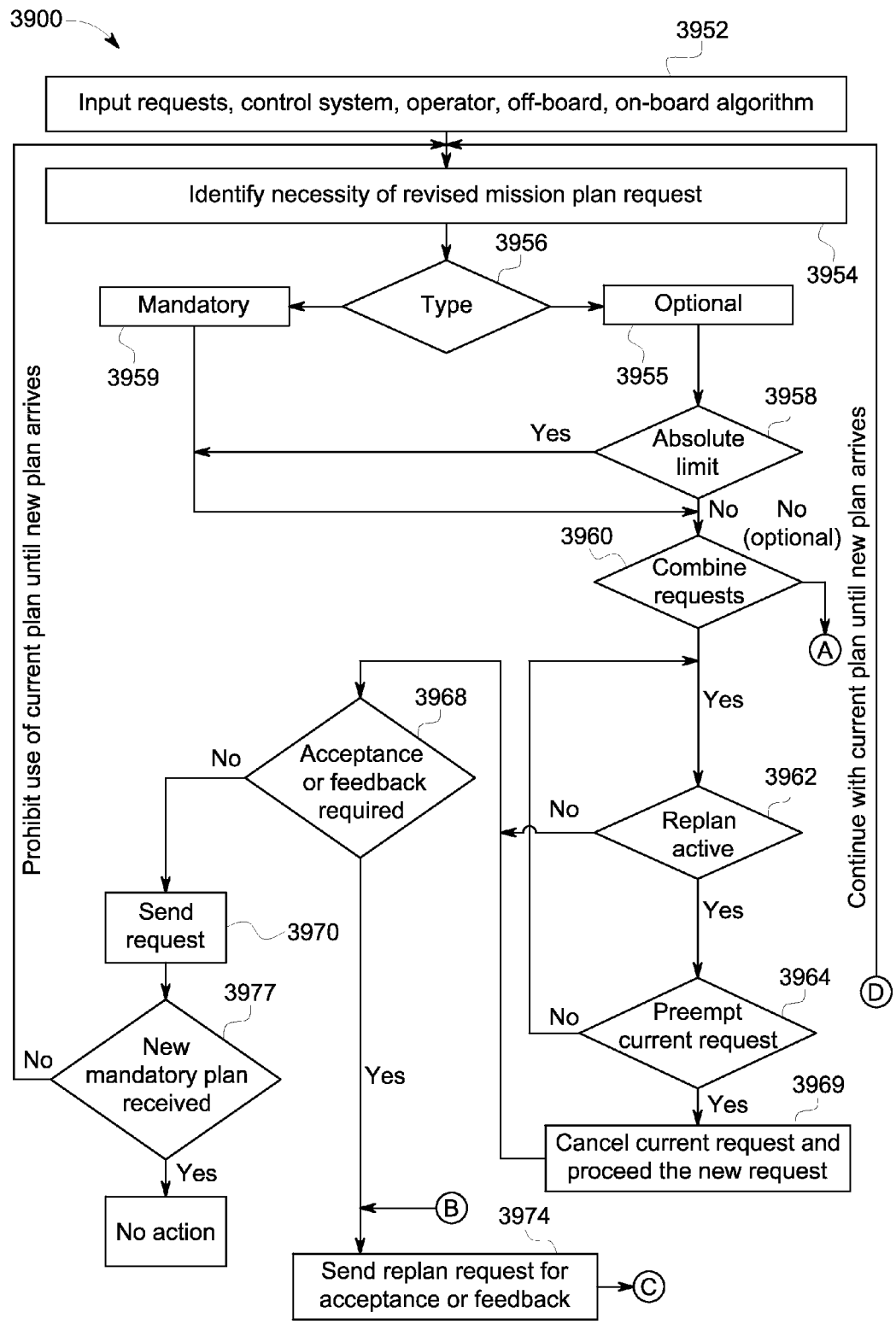
Figure 39B:
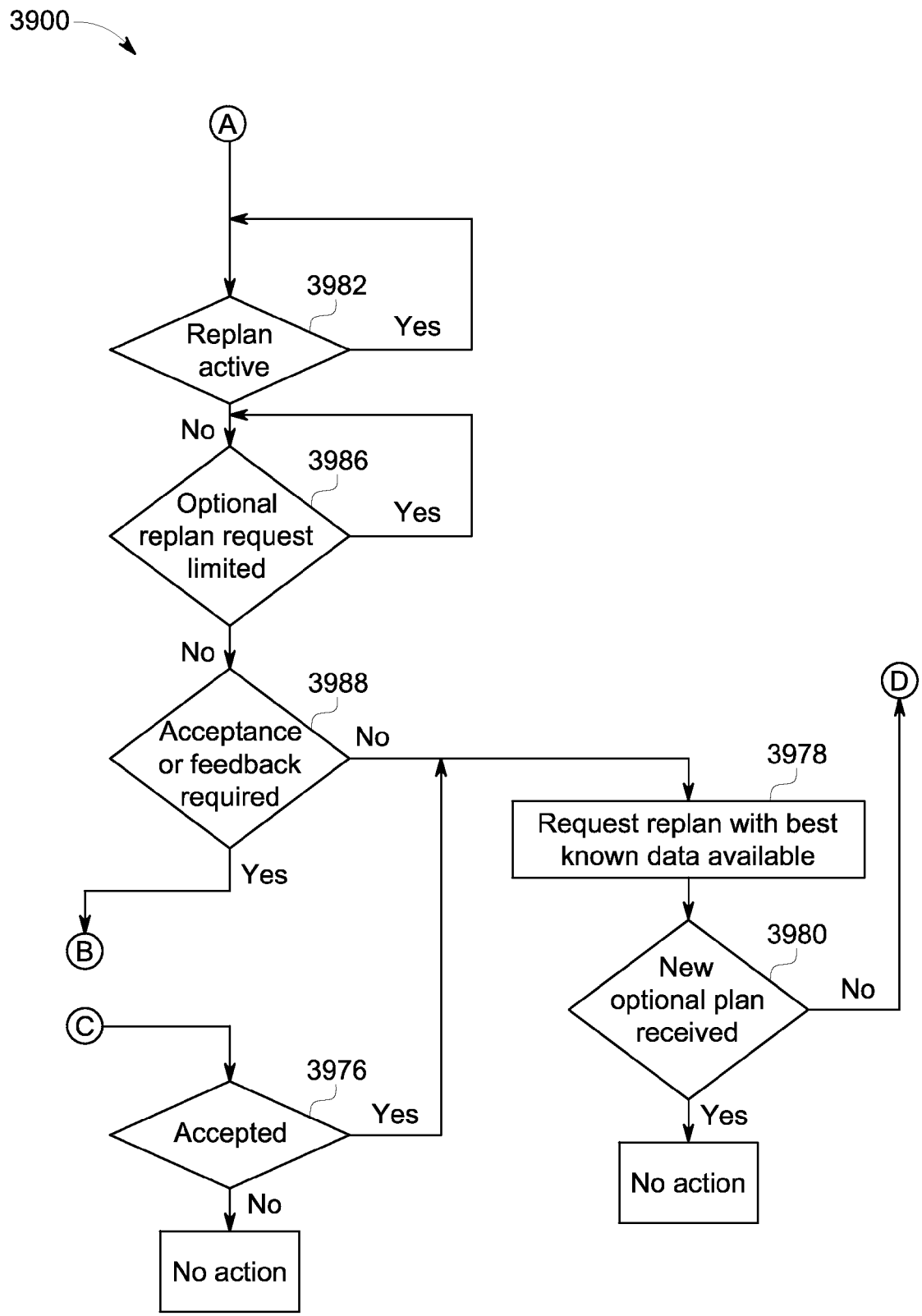

FIG. 39 illustrates a flow chart of one embodiment of a method 3900 for determining a necessity of a revised mission plan request. The method 3900 includes receiving an input request, at 3952, from at least one of a plurality of locations. Identifying the necessity of the revised mission plan request is initiated, at 3954. A determination is made regarding a type of request, at 3956. For the optional mission plan request 3955, a determination is made regarding whether an absolute limit is met, at 3958. If the absolute limit is exceeded then the plan is redefined as a mandatory mission plan 3959.

If the determination is that the at least one absolute limit has not been breached, then a determination is made, at 3960, whether to combine an optional replan request with a mandatory replan request. If a combination does occur, a determination is made whether a replan is currently being performed, or is active, at 3962. If a replan is currently being performed, a determination is made whether to preempt the current replan activity, at 3964. If the current request is preempted, a decision is required regarding whether to accept the current replan request or determining whether feedback is required, at 3968 after the current request is cancelled, at 3969. If a response is no, then the request is sent, at 3970, and then a determination is made regarding whether the new mandatory plan is received, at 3972. If a new plan has been received then no further action is required for this determination. If the determination is no, the decision is to again identify the necessity of a revised mission plan request, at 3954. If the response is yes, at 3968, a request for acceptance or feedback is sent, at 3974. If the send request is accepted, at 3976, a request for a replan with the best known data available occurs, at 3978. A determination regarding a new optional plan is sought, at 3980. If a new plan has been received then no further action is required for this determination. If the determination is no, the decision is to again identify the necessity of a revised mission plan request, at 3954.

When the decision is to determine whether a replan is active, at 3962 is no, the next decision is to determine whether acceptance or feedback is required, at 3968. If a combination does not occur at 3960 the replan request is an optional replan request, the next decision is to determine whether a replan is active, at 3982. If the decision is yes, then the optional replan will be prohibited until no replan is active. If the decision is no, then a decision regarding whether the optional replan request is limited is made, at 3986. If limited, then subsequent determinations of if replan request is limited until, replan request is no longer limited at 3986. If the optional replan request is not limited then a determination is made whether acceptance or feedback is required, at 3988. If no acceptance or feedback is required then the request replan with best known data available is used, at 3978. If acceptance or feedback is required, then a request for acceptance or feedback, at 3974 is made.

One or more embodiments of the inventive subject matter described herein provide methods and systems for generating a plurality of operating plans of a vehicle system (e.g., powered vehicle system) after the vehicle system is notified of a change in an operating plan that is currently being implemented. As described in greater detail below, an operating plan (which may be referred to as a trip plan or mission plan) may include instructions for controlling tractive and/or braking efforts of a vehicle for only a portion of the route or for the entire route. The instructions may be expressed as a function of time and/or distance of a trip along a route. Travel according to these instructions may cause the vehicle system to reduce at least one of fuel consumed and/or emissions generated by the vehicle system compared to the vehicle system traveling along the same trip but according to different instructions of a different operating plan. The vehicle system may be autonomously controlled according to the operating plan or the instructions of the operating plan may be presented to an operator of the vehicle system so that the operator can manually control the vehicle system according to the operating plan (also referred to herein as a "coaching mode" of the vehicle system). The operating plans may be based on trip profiles (described below), which may include, among other things, information about a geography of the route. The operating plans may also or alternatively be based on operating information of the vehicle system, such as the size, weight, tractive effort, power output, weight distribution, and the like, of the vehicle system.

Examples of deviations from the currently-implemented operating plan include at least one of detected route changes, detected changes in speed, or instructions to change the route or speed, which may be based on notifications that alert the vehicle system about an upcoming change in speed limit or upcoming traffic. For instance, the vehicle system may detect a change in speed when the operator manually decelerates or accelerates the vehicle system. As another example, a signaling system may instruct the vehicle system to change routes at an intersection. The signaling system may also instruct the vehicle system to increase or reduce the current speed of the vehicle system to a designated speed. The detected change in speed and the instructions to change routes and/or speed constitute a deviation that may trigger generation of a new operating plan. The new operating plan may account for the changed route and/or speed. Alternatively, the signaling system may notify the vehicle system of an upcoming section of a route having a reduced speed limit. Based on the notification, the vehicle system may determine that the vehicle system must deviate from the currently-implemented plan and reduce the speed.

The operating plans that are generated after the vehicle system is notified of the deviation from the operating plan may be referred to as revised operating plans. Such revised operating plans can include a shorter operating plan (referred to herein as a transition plan) that is calculated to control operation of the vehicle system for a limited distance that is temporally or spatially shorter than the entire trip for which the operating plan was originally generated and/or than the remainder of the trip for which the operating plan was originally generated (e.g., 5 to 7 miles or 8.0 to 11.3 kilometers). Revised operating plans can include a longer operating plan (referred to herein as a prospective plan) that is calculated to control operation of the vehicle system at a later time (e.g., not the current time, such as a designated time period or delay from the current time period) and possibly for a greater distance relative to the transition plan (e.g., 10 to 15 miles or 16.1 to 24.1 kilometers) or until the end of the trip for which the operating plan was originally created. The prospective plan may be implemented after the transition plan is completed or when the vehicle system achieves a designated operating parameter. The shorter transition plan and the longer prospective plan may be based on different factors or the factors may be weighted differently during generation of the plans. In some embodiments, the vehicle system may transfer substantially continuously or seamlessly between two or more operating plans, such as from a currently-implemented operating plan, to the shorter transition plan, and subsequently to the longer prospective plan. For instance, by "substantially continuously or seamlessly," in one embodiment, it is meant that the vehicle system may not request additional commands or inputs from an operator of the vehicle system during the plan transitions.

At least one technical effect of embodiments described herein may include a more continuous or seamless transition of vehicle operation after current operation of a vehicle is interrupted by instructions to modify the vehicle operation. Another technical effect may include enabling automatic control of the vehicle system through a transition between different operating plans or through a change in routes of the vehicle system. Another technical effect may also include, for example, generation of different operating plans that include tractive or braking operations to be executed by the vehicle system after the vehicle system has been notified of a plan divergence. The different operating plans may be generated simultaneously or concurrently or one operating plan may automatically be generated after a previous operating plan is generated. Another technical effect may include a more efficient use of computing resources for generating the different operating plans. Additional technical effects of embodiments may include a reduction in at least one of fuel consumption, fuel emissions, or human interaction with the vehicle system. In some embodiments, a technical effect may include a safer transition or change from one path to another path at an intersection between the paths. In particular embodiments, the intersection may be an intersection between tracks that includes a turnout switch for guiding the vehicle from one track to another. In some embodiments, a technical effect may include a safer transition or change from a current speed to a different speed along a route. A technical effect may be to maintain automatic control through the unplanned track divergence.

In some embodiments, the operating plans may be optimized to achieve designated goals or parameters. As used herein, the term "optimize" (and forms thereof) are not intended to require maximizing or minimizing a characteristic, parameter, or other object in all embodiments described herein. Instead, "optimize" and its forms may include increasing or decreasing (as appropriate) a characteristic, parameter, or other object toward a designated or desired amount while also satisfying other conditions. For example, optimized fuel efficiency may not be limited to a complete absence of fuel consumption or that the absolute minimum amount of fuel is consumed. Rather, optimizing the fuel efficiency may mean that the fuel efficiency is increased or improved, but not necessarily maximized, while also satisfying other conditions (e.g., speed limits, trip duration, arrival time). In some cases, however, optimizing fuel efficiency can include reducing fuel consumption to the minimum amount possible. As another example, optimizing emission generation may not mean completely eliminating the generation of all emissions. Instead, optimizing emission generation may mean that the amount of emissions generated is reduced but not necessarily eliminated. In some cases, however, optimizing emission generation can include reducing the amount of emissions generated to a minimum amount possible.

In one or more embodiments, optimizing a characteristic, parameter, or other object may include increasing or decreasing the characteristic, parameter, or object (as appropriate) during performance of a mission (e.g., a trip) such that the characteristic, parameters, or object is increased or decreased (as appropriate) relative to performing the same mission in another way. For example, the vehicle system traveling along a trip according to an optimized trip plan can result in the vehicle system consuming less fuel and/or generating fewer emissions relative to traveling along the same trip according to another, different trip plan.

Figure 40:
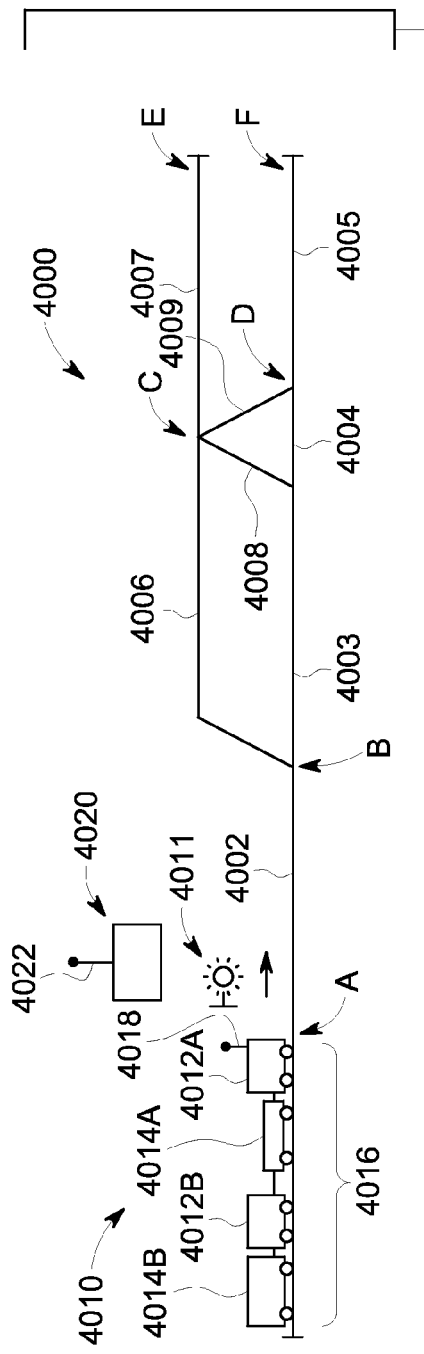
FIG. 40 is a schematic diagram of one embodiment of a transportation network.

FIG. 40 is a schematic diagram of one embodiment of a transportation network 4000. The transportation network 4000 includes plural interconnected paths 4002-4009, along which one or more vehicle systems 4010 travel. Depending upon the context, the paths 4002-4009 may be railroad tracks, roads, waterways, airborne paths, or other paths across which a vehicle system may travel. The paths 4002-4009 or only portions of the paths 4002-4009 may also be referred to as segments of a route. In the illustrated embodiment, the vehicle system 4010 is a rail vehicle system that includes one or more locomotives and, optionally, one or more rail cars that are all linked to one another.

The transportation network 4000 may extend over a relatively large area, such as hundreds or thousands of square miles (or kilometers) of land area. While only one transportation network 4000 is shown in FIG. 40, one or more other transportation networks 4000 may be joined with and accessible to vehicles traveling in the illustrated transportation network 4000. For example, one or more of the paths 4002-4009 may connect to another transportation network (not shown) such that vehicles can travel between the transportation networks. Different transportation networks may be defined by different geographic boundaries, such as different towns, cities, counties, states, groups of states, countries, continents, and the like. The number of paths 4002-4009 shown in FIG. 40 is meant to be illustrative and not limiting on embodiments of the described subject matter. Moreover, while one or more embodiments described herein relate to a transportation network formed from railroad tracks, not all embodiments are so limited. One or more embodiments may relate to transportation networks in which vehicles other than rail vehicles travel.

Rail vehicle systems may include trains, tram lines, monorails, subways, and the like. One or more other embodiments, however, may relate to vehicle systems other than rail vehicle systems. For example, the vehicle systems may be other off-highway vehicles (e.g., vehicles that are not designed or allowed by law or regulation to travel on public roads, highways, and the like), automobiles, marine vessels, airplanes, and the like. While only one vehicle system 4010 is shown in FIG. 40, it is understood that several vehicle systems may be concurrently traveling along the transportation network 4000.

A number of points or locations in the network 4000 are shown and include points (or locations) A-F. For example, in FIG. 40, the point A may indicate where a vehicle system is currently located and, as such, may be referred to as a current or present location. The points B, C, and D may indicate where the vehicle system is allowed or able to switch or change routes and, as such, may be referred to as intersections or crossover points. The points E and F may be referred to as destination points. It is understood, however, that each of the points A-F may be characterized differently depending on the circumstances. For instance, the points B, C, and D may also be destination points if the operating plan or the route is configured to travel to or through the points. Points may also be referred to as mid-points or route points if the operating plan or the route is configured to travel through the points. Points may also be referred to as end points or final destination points if the operating plan or the route is configured to stop at the points.

Routes may be different based on the paths or segments that constitute the route. By way of example, a first route may extend from the point A to the point F and include the paths or segments 4002-4005. A second route, however, may also extend from the point A to the point F but include the paths or segments 4002, 4006, 4009, and 4005. In this example, although the first and second routes have a common starting point (point A) and a common end point (point F), the first and second routes are different because the first and second routes include different paths or segments. The first and second routes may have, among other things, different total trip distances and different geographies.

Under some circumstances, the vehicle system 4010 may be traveling along the path 4002 according to an operating plan that is based on the first route described above. As the vehicle system 4010 approaches an intersection at point B, however, the vehicle system 4010 may be instructed to modify the current route. For instance, the vehicle system 4010 may be instructed to change or switch routes so that the vehicle system 4010 travels along the path 4006 instead of the path 4003. This instruction to switch routes may be due to various reasons, such as traffic along the planned route (e.g., another vehicle system on the route), an obstruction along the planned route (e.g., stalled car at a crossing, boulder, snow, etc.), route closure (e.g., drawbridge is up, damage to roads or tracks, repair is being made to roads or tracks, etc.), and the like. As described herein, the vehicle system 4010 may receive or generate a transition plan for switching to the segment 4006 and, subsequently, a prospective plan that is implemented after the transition plan or when a designated operating parameter is achieved.

By way of one example, the vehicle system 4010 may be a rail vehicle that includes one or more locomotives and, optionally, one or more rail cars. The paths or segments 4002, 4003, and 4006 may be railroad tracks. While traveling along the path 4002, the operator of the rail vehicle system 4010 may be notified through a divergence signal (e.g., flashing light) by a signaling system 4011 (e.g., railway signal light) that the vehicle system 4010 must modify its course and change routes at a turnout switch located at point B. In order to change routes and move from the path 4002 to the path 4006, the rail vehicle system 4010 may be required to slow the current vehicle speed to a speed that is no greater than a designated speed (e.g., a speed limit). To this end, the transition plan may be configured to control operation of the rail vehicle system 4010 so that the rail vehicle system 4010 achieves the designated speed prior to reaching the point B. In other embodiments, the vehicle system 4010 may be instructed to increase or decrease the current speed of the vehicle system 4010 without changing routes. For example, the signaling system 4011 may notify the vehicle system 4010 that a speed limit for a designated portion of the route has changed or that the vehicle system 4010 is moving at a speed above the speed limit.

The subsequent prospective plan may be configured to control operation of the vehicle system 4010 so that the vehicle system 4010 arrives at a designated point (e.g., the point F) by a designated time (e.g., scheduled arrival time) or achieves one or more operating parameters (e.g., fuel efficiency, fuel emissions, etc.) by another point, by a certain time, for a designated portion of the trip, or for the entire trip. In some embodiments, the prospective plan may be a first prospective plan and a second prospective plan is generated to be implemented after the first prospective plan.

As shown in FIG. 40, the vehicle system 4010 may include a group of powered units 4012A, 4012B (e.g., locomotives or other vehicles capable of self-propulsion) and/or non-powered units 4014A, 4014B (e.g., rail cars, cargo cars, passenger cars, or other vehicles incapable of self-propulsion) that are mechanically coupled or linked together (directly or indirectly) to travel along the paths 4002-4009. The term "powered" refers to the capability of the units 4012A, 4012B to propel themselves and not to whether the units 4012A, 4012B or the units 4014A, 4014B receive energy (e.g., electric current) for one or more purposes. For example, the non-powered units 4014A, 4014B may receive electric current to power one or more loads disposed on-board the non-powered units 4014A, 4014B.

In FIG. 40, the powered unit 4012A may be considered a lead powered unit of a vehicle consist 4016, and the powered unit 4012B may be considered a remote powered unit of the vehicle consist 4016. The embodiment of FIG. 40 is provided for illustrative purposes only, as other arrangements, orientations, and/or numbers of powered units and/or non-powered cars may be used in other embodiments. In some embodiments, the lead powered unit 4012A may control the operations of other, remote powered units, such as the remote powered unit 4012B. In other embodiments, a powered unit other than the lead powered unit may act to control the operations of one or more other powered units. For example, the remote powered unit 4012B may control operations of the lead powered unit 4012A.

As shown in FIG. 40, the transportation network 4000 may include a network system or monitoring system 4020 that can be disposed off-board (e.g., outside) of the vehicle system 4010. For example, the network system 4020 may be disposed at a central dispatch office for a railroad company. The network system 4020 can generate and communicate the various operating plans described herein (e.g., current operating plans, transition plans, prospective plans, and the like). The network system 4020 can include a wireless antenna 4022 (and associated transceiving equipment), such as a radio frequency (RF) or cellular antenna, that wirelessly transmits instructions to the vehicles 4010. The vehicle system 4010 may also include a wireless antenna 4018 (and associated transceiving equipment). For example, the network system 4020 may transmit updated destination locations and associated arrival times to the vehicle system 4010. The network system 4020 may also receive information from the vehicle system 4010 to analyze or pass along to a central data store or analysis center.

In some embodiments, the vehicle system 4010 is or includes a vehicle consist or includes a plurality of vehicles consists. As used herein, a "vehicle consist" includes at least one powered unit that is capable of self-propulsion. In some cases, a vehicle consist includes a plurality of powered units that are directly or indirectly coupled to one another. The plurality of powered units in a single vehicle consist may be configured to operate as a single moving apparatus. For example, the multiple powered units may be controlled by a computing system that coordinates tractive and/or braking efforts to control operation of the vehicle system that includes the vehicle consist. A single vehicle system may be or include a single vehicle consist or include a plurality of vehicle consists that are directly or indirectly coupled to another. When a vehicle system includes multiple vehicle consists, the consists may be referred to as sub-consists. If the vehicle system includes multiple vehicle consists, the vehicle consists may be configured to operate as a single moving apparatus. For example, the multiple vehicle sub-consists may be controlled by a master computing system that coordinates tractive and/or braking efforts among the sub-consists to control operation of the vehicle system that includes the vehicle sub-consists.

In some embodiments, the vehicle system 4010 is characterized as having a distributed power system or being capable of operating in different modes. In a distributed power system, different powered units (or different vehicle consists) are capable of operating according to different instructions. For example, a single vehicle system may include first and second powered units (or first and second vehicle consists). A single master controller or computing system for the vehicle system may instruct the first and second powered units in a manner that coordinates tractive and/or braking efforts of the vehicle system. However, the master computing system may communicate different instructions to them. For example, the first powered unit may be instructed to operate at a high notch (or throttle) setting. At the same time, the second powered unit may be instructed to operate at a lower notch setting or to apply brakes to the powered unit.

As one specific example, a vehicle system may include a lead vehicle consist and a remote vehicle consist. As the vehicle system is traversing a mountain, the lead vehicle consist may crest the mountain top and travel on the downward slope of the mountain. At this time, the lead vehicle consist may be instructed to cease tractive efforts and commence braking. The remote vehicle consist, however, may not have passed the mountaintop and may still be climbing this mountain. If so, the remote vehicle consist may be instructed to maintain tractive efforts. By operating the lead and remote vehicle consists in a different manner, tensile forces at the mechanical couplers that connect the rail cars and locomotives may be reduced. As such, different powered units or vehicle consists of a single vehicle system may operate asynchronously or independent from each other. This may also be referred to as operating according to an asynchronous mode, independent mode, or decoupled mode.

Figure 41:
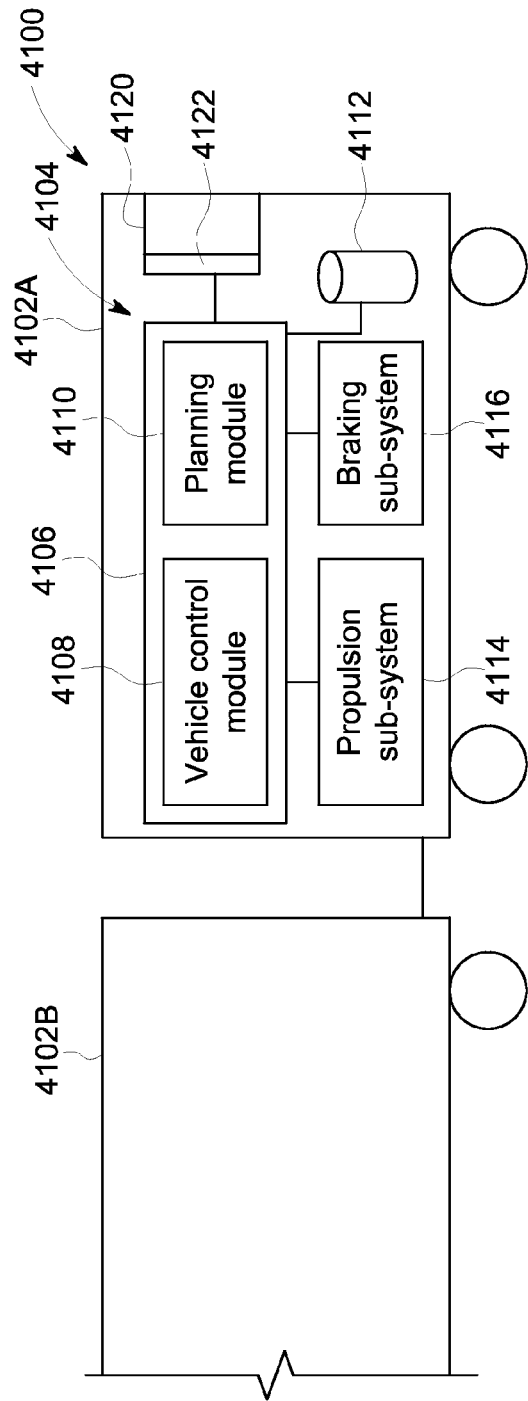
FIG. 41 is a schematic diagram of one embodiment of a powered vehicle that includes a vehicle control module and a planning module.

FIG. 41 is a schematic diagram of a vehicle system 4100 that includes a plurality of powered units 4102A, 4102B. The vehicle system 4100 may be similar to the vehicle system 4010 (shown in FIG. 40). The powered unit 4102A may be referred to as a lead powered unit and the powered unit 4102B as a remote powered unit. Powered units that control other powered units may be referred to as "lead" or "master" powered units, and powered units that are controlled by other powered units may be referred to as "remote" powered units. The powered units 4102A, 4102B may constitute or be part of a vehicle consist that may or may not be coupled with other vehicle consist(s) (not shown) in the vehicle system 4100. In the illustrated embodiment, the powered unit 4102A includes a control system 4104 that is configured to control operation of the powered units 4102A and 4102B. In other embodiments, the powered unit 4102B may include a control system that is configured to control operation of the powered unit 4102A. In such embodiments, the powered unit 4102B may be referred to as the lead powered unit. Alternatively, the control system may be distributed between the powered units 4102A, 4102B. For embodiments that include multiple vehicle consists, the control system 4104 may be configured to control operation of other vehicle consists.

The control system 4104 may include a user interface 4120 that is configured to interact with an operator (e.g., engineer) of the vehicle system 4100. The user interface may include hardware, firmware, software, or a combination thereof that enables an individual (e.g., the operator) to directly or indirectly control operation of the vehicle system 4100 and the various components thereof. As shown, the user interface 4120 includes an operator display 4122. The operator display 4122 may be one or more displays that are oriented to be viewed by the operator.

The user interface 4120 may be configured to receive inputs from the operator. The inputs may include, for example, instructions to deviate or diverge from a currently-implemented plan as described herein. To this end, the user interface 4120 may also include one or more input devices (not shown), such as a levers, switches, buttons, handles, and the like. The user interface 4120 may also include a touchpad or touch-sensitive display (e.g., touchscreen) that can detect a presence of a touch from an operator of the vehicle system 4100 and can also identify a location in the display area of the touch.

The control system 4104 may include a controller 4106 having a plurality of modules including a vehicle control module 4108 and a planning module 4110. The controller 4106 may be a computer processor or other logic-based device that performs operations based on one or more sets of instructions (e.g., software). The instructions on which the controller 4106 operates may be stored on a tangible and non-transitory (e.g., not a transient signal) computer readable storage medium, such as a memory 4112. The memory 4112 may include one or more computer hard drives, flash drives, RAM, ROM, EEPROM, and the like. Alternatively, one or more of the sets of instructions that direct operations of the controller 4106 may be hard-wired into the logic of the controller 4106, such as by being hard-wired logic formed in the hardware of the controller 4106.

The controller 4106 includes the vehicle control and planning modules 4108, 4110, which may perform the various operations described herein. The modules 4108, 4110 are shown as being included in or part of the controller 4106. The modules 4108, 4110 may include hardware and/or software systems that operate to perform one or more functions. Alternatively, one or more of the modules 4108, 4110 may include a controller (not shown) that is separate from the controller 4106, or may be combined to form a composite module or controller.

The vehicle control module 4108 is configured to control operation of the vehicle system 4100 according to one or more operating plans in which the operating plans designate at least one of tractive operations or braking operations to be implemented by the vehicle system 4100. In one embodiment, the control module 4108 may autonomously control operations of the vehicle system 4100 according to an operation plan. Optionally, the control module 4108 can provide instructions (e.g., textual instructions, graphical instructions, audible instructions, and the like) to an operator of the vehicle system 4100 in order to direct (e.g., guide or coach) the operator to manually control the vehicle system 4100 according to the operating plan. As shown, the vehicle system 4100 may include a propulsion sub-system 4114 and a braking sub-system 4116. The propulsion sub-system 4114 may include one or more engines (not shown) or motors for driving the vehicle system 4100. More specifically, the propulsion sub-system 4114 may provide a tractive effort or a tractive operation that moves the vehicle system 4100. The propulsion sub-system 4114 may be capable of operating the engines at different notch (or throttle) settings. In FIG. 41, the propulsion sub-system is part of the powered unit 4102A. In other embodiments, the propulsion sub-system 4114 that is controlled by the vehicle control module 4108 is distributed across multiple powered units or vehicle consists. For example, the propulsion sub-system 4114 may also be part of the powered unit 4102B.

The braking sub-system 4116 may include a plurality of systems or assemblies, including a brake assembly (not shown) on the powered units 4102A, 4102B and a brake assembly (not shown) on non-powered units. The braking sub-system 4116 may include air brakes and/or regenerative brakes. In some cases, the braking sub-system 4116 may be characterized as including a dynamic braking system. For embodiments that include air brake systems, the braking sub-system 4116 may be configured to supply air pressure to or controllably vent a pressurized brake pipe (not shown). The pressurized brake pipe may be in fluid communication with each of the non-powered units and/or other powered units in the vehicle system 4100 or a vehicle consist.

The propulsion and braking sub-systems 4114, 4116 are communicatively coupled to the vehicle control module 4108. The propulsion and braking sub-systems 4114, 4116 are configured to receive control signals from the vehicle control module 4108 that instruct the propulsion and/or braking sub-systems 4114, 4116 to operate in a designated manner. The propulsion and/or braking sub-systems 4114, 4116 may communicate information back to the vehicle control module 4108 regarding a status of the propulsion and/or braking sub-systems 4114, 4116 or other information, such as signals from sensors (not shown).

The planning module 4110 is configured to obtain one or more operating plans. The planning module 4110 may create the operating plans and/or receive the operating plans from an off-board location. For instance, the planning module 4110 may generate another operating plan in response to a deviation of the vehicle system from the operating plan that is currently being implemented. The deviation may be an actual or present deviation. For example, the vehicle system may detect that the operator has manually changed the speed of the vehicle system. The deviation may also be a planned deviation. For instance, the vehicle system may receive instructions to change routes at an approaching intersection. The detected change in speed or the instructions to change routes may constitute a deviation that triggers generation of another operating plan. In the illustrated embodiment, the planning module 4110 is disposed on-board the vehicle system 4100 with the vehicle-control module 4108. In other embodiments, the planning module 4110 may be disposed on-board the vehicle system 4100, but on a different powered unit. In yet other embodiments, the planning module 4110 is disposed off-board. For example, the network system 4020 (FIG. 40) may include the planning module 4110.

The planning module 4110 may generate operating plans that are based on at least one of an operating parameter (or characteristic), operating restriction (or constraint), and the like of the vehicle system 4100. Operating parameters (or characteristics) relate to the physical or mechanical operation relating to movement of the vehicle system or characteristics that are a result of such operation. Examples of operating parameters include, but are not limited to, vehicle speed, horsepower, notch (throttle) settings, brake settings, fuel usage, emissions, train weight, drag coefficients, friction modifier, etc. Operating restrictions (or constraints) may relate to the physical or mechanical limitations of the vehicle system or external limitations that are directed to the vehicle, such as regulations. Examples of operating restrictions include, but are not limited to, speed limits, lower and/or upper limits on notch (throttle) settings, upper cumulative and/or instantaneous emissions permitted in a region, etc.

The planning module 4110 is configured to use at least one of vehicle data, route data (or a route database), or trip data to generate the operating plan. In some cases, the vehicle data, route data, and the trip data include information relating to the operating characteristics, parameters, restrictions, and constraints described above. The vehicle data may include information on the characteristics of the vehicle. For example, when the vehicle system 4100 is a rail vehicle, the vehicle data may include a number of rail cars, number of locomotives, information relating to an individual locomotive or a consist of locomotives (e.g., model or type of locomotive, weight, power description, performance of locomotive traction transmission, consumption of engine fuel as a function of output power (or fuel efficiency), cooling characteristics), load of a rail vehicle with effective drag coefficients, vehicle-handling rules (e.g., tractive effort ramp rates, maximum braking effort ramp rates), content of rail cars, lower and/or upper limits on power (throttle) settings, etc. By way of one particular example, the planning module 4110 may consider information regarding the fuel efficiency of the vehicle system 4100 (e.g., how much fuel is consumed by the vehicle system 4100 to traverse different segments of a route), the tractive power (e.g., horsepower) of the vehicle system 4100, the weight or mass of the vehicle system 4100 and/or cargo, the length and/or other size of the vehicle system 4100, and the location of the powered units in a vehicle system (e.g., front, middle, back, or the like of a vehicle system having several mechanically interconnected units).

Route data may include information on the route, such as information relating to the geography or topography of various segments along the route (e.g., effective track grade and curvature), speed limits for designated segments of a route, maximum cumulative and/or instantaneous emissions for a designated segment of the route, locations of intersections (e.g., railroad crossings), locations of certain track features (e.g., crests, sags, curves, and super-elevations), locations of mileposts, and locations of grade changes, sidings, depot yards, and fuel stations. The route data, where appropriate, may be a function of distance or correspond to a designated distance of the route. The information related to the route to be traversed by the vehicle system 4100 may also include the existence and/or location of known slow orders or damaged segments of the route, and the like. Other information can include information that impacts the fuel efficiency of the vehicle system 4100, such as atmospheric pressure, temperature, and the like.

Trip data may include information relating to a designated mission or trip, such as start and end times of the trip, start and end locations, route data that pertains to the designated route (e.g., effective track grade and curvature as function of milepost, speed limits), upper cumulative and/or instantaneous limits on emissions for the trip, fuel consumption permitted for the trip, historical trip data (e.g., how much fuel was used in a previous trip along the designated route), desired trip time or duration, crew (user and/or operator) identification, crew shift expiration time, lower and/or upper limits on power (throttle) settings for designated segments, etc.

In some cases, a trip profile may be created by or provided to the planning module 4110. The trip profile may include the information that is associated with a designated trip. More specifically, the trip profile may include the vehicle data, route data, and the trip data described above for a designated route. The operating plan may be formulated by the planning module 4110 based on the trip profile. The planning module 4110 may analyze the train data, trip data, and track data corresponding to the designated route for a trip. Based on this analysis, the planning module 4110 may develop the operating plan. Methods to compute an operating plan may include, but are not limited to, direct calculation of the operating plan using differential equation models which approximate the train physics of motion. In other cases, the planning module 4110 may modify a known or previously-generated operating plan.

For example, if the trip profile requires the vehicle system 4100 to traverse a steep incline and the trip profile indicates that the vehicle system 4100 is carrying significantly heavy cargo, then the planning module 4110 may form an operating plan that includes or dictates increased tractive efforts to be provided by the propulsion sub-system 4114 of the vehicle system 4100. Conversely, if the vehicle system 4100 is carrying a smaller cargo load and/or is to travel down a decline in the route based on the trip profile, then the planning module 4110 may form an operating plan that includes or dictates decreased tractive efforts by the propulsion sub-system 4114 for that segment of the trip. In one embodiment, the planning module 4110 includes a software application or system such as the Trip Optimizer™ system developed by General Electric Company.

Figure 42:
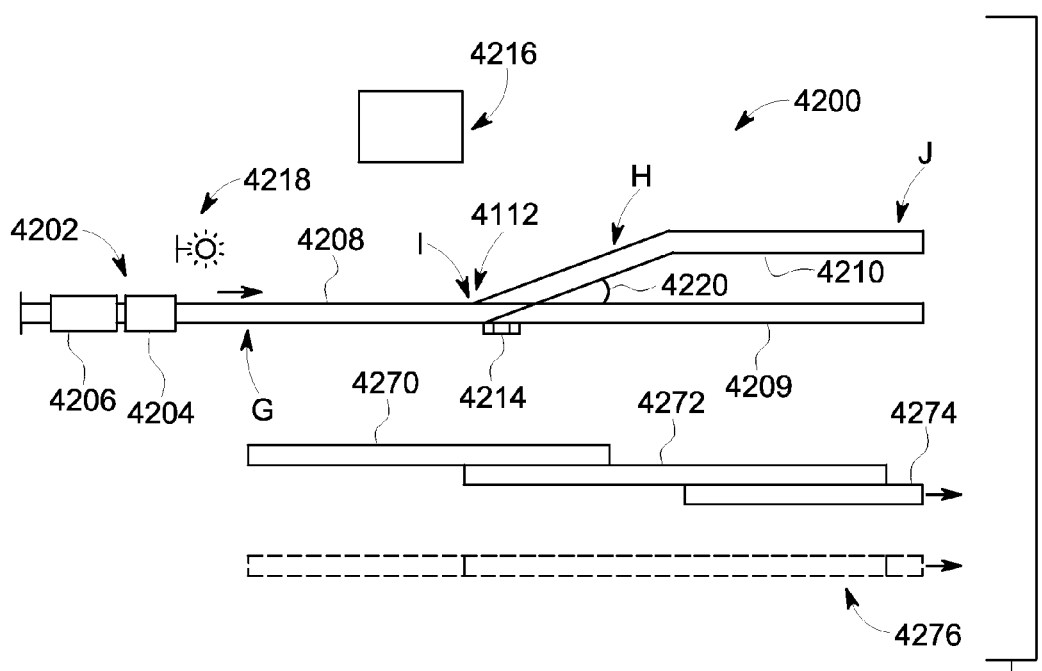
FIG. 42 is a schematic diagram of another transportation network and illustrates implementation of multiple operating plans during operation of a powered vehicle.

FIG. 42 is a schematic diagram of a transportation network 4200 that includes segments 4208-4210 and has a vehicle system 4202 that is capable of traveling along the segments 4208-4210. The vehicle system 4202 may be similar to the vehicle systems 4010 (FIG. 40) and 4100 (FIG. 41) described above. In the illustrated embodiment, the vehicle system 4202 is a rail vehicle system that includes at least a locomotive 4204 and a rail car 4206. As shown, the segments 4208-4210 intersect each other at an intersection or junction 4212. The intersection 4212 includes a turnout switch 4214 that guides the vehicle system 4202 in a designated manner. Also shown, the transportation network 4200 includes a network system 4216 and a signaling system 4218.

The turnout switch 4214 is configured to guide the vehicle system 4202 to the segment 4209 or to the segment 4210, depending on the state of the switch 4214 (e.g., a first state may cause the vehicle system 4202 to travel onto the segment 4209 while another, second state may cause the vehicle system 4202 to travel onto the segment 4210). In the context of railroad tracks, the turnout switch 4214 may have one or more mechanisms that change a configuration of the rails at the intersection 4212 so that the vehicle system 4202 is guided in a designated direction (e.g., either onto the segment 4209 or onto the segment 4210). The turnout switch 4214 may be any one of various types of turnout switches. Examples of turnout switches include slip switches (e.g., single slip, double slip, outside slip), crossovers, stub switches, plate switches, three-way switches, interlaced turnouts, wye switches, dual gauge switches, rack railway switches, switch diamonds, etc. Each of the above turnout switches may have a different mechanical configuration or a different mechanism for adjusting the rails to direct the vehicle system in the designated direction. At least some of these mechanical configurations or mechanisms may be considered when determining a crossover speed for the vehicle system 4202. For example, the turnout switch 4214 may have a diverging angle 4220. As the diverging angle 4220 decreases, the crossover speed may increase in accordance with one embodiment.

Figure 43:
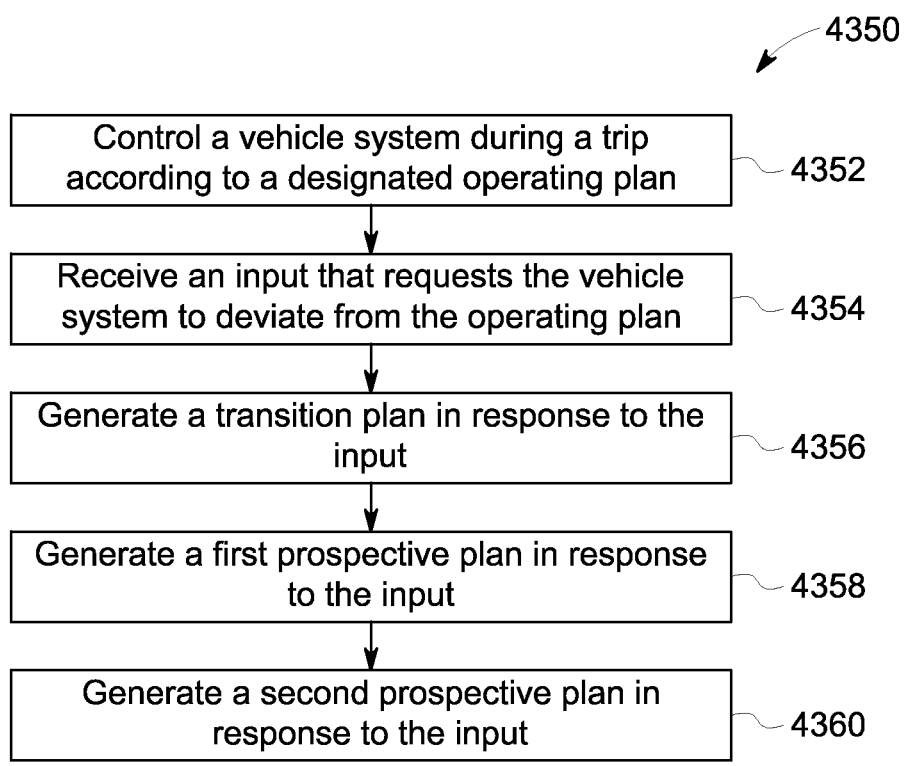
FIG. 43 is a flowchart of one embodiment of a method for generating multiple operating plans in response to a change in a currently-implemented plan.

FIG. 43 is a flowchart of a method 4350 for generating multiple operating plans in accordance with one or more embodiments. FIG. 43 is described with reference to the elements shown in FIG. 42. As shown, the vehicle system 4202 is heading in a direction indicated by the arrow while implementing an operating plan (referred to as the current operating plan). The current operating plan is based on, among other things, a designated route that includes the segments 4208, 4209. The vehicle system 4202 is approaching the intersection 4212 (which also may be referred to as the approaching location). In some embodiments, the approaching location may be relatively close. For example, the approaching location may be less than or equal to 3000 feet (e.g., 915 meters) from the vehicle system 4202 or less than or equal 2000 feet (e.g., 610 meters). In more particular embodiments, the approaching location may be less than or equal to 1500 feet (e.g., 457 meters) from the vehicle system 4202.

The method 4350 (FIG. 43) includes controlling (at 4352) the vehicle system 4202 during a trip according to a predetermined or designated operating plan. In some embodiments, the operating plan is generated by a planning module, such as the planning module 4110 (FIG. 41). The planning module may be on-board or off-board. For example, the planning module may be part of a control system on the vehicle system 4202 as described above or the planning module may be part of a master computing system (not shown) of the network system 4216 that is configured to send operating plans to the vehicle system 4202 and other vehicle systems in the transportation network 4200. The network system 4216 may also receive and/or provide information to the vehicle system 4202, such as the information required for generating the operating plans (e.g., vehicle data, route data, trip data, etc.).

The method 4350 may also include receiving (at 4354) an input that requests the vehicle system 4202 to deviate from the operating plan. The input may be a user input that is provided by an individual, such as the operator or engineer. For example, in the illustrated embodiment, the signaling system 4218 may include a flashing light or other indicator that informs the operator that the vehicle system 4202 should change to the segment 4210 at the intersection 4212 instead of proceeding onto the segment 4209. Upon seeing the flashing light, the operator may provide an input to a user interface of the vehicle system 4202. The input may include an instruction to modify the route by changing paths at the intersection 4212. For instance, the input may request that the vehicle system 4202 prepare for the turn onto the segment 4210. The vehicle system 4202 may determine that the segment 4210 is not part of the designated route and initiate generation of a transition plan and at least one prospective plan.

In some embodiments, the signaling system 4218 may include a flashing light or other indicator that informs the operator that the vehicle system 4202 should increase or decrease the current speed of the vehicle system 4202 without changing routes. Such a situation may occur when, for example, another vehicle system is on the same route and heading in the same direction as the vehicle system 4202, but at a different speed. If the other vehicle system is ahead of the vehicle system 4202 and traveling at a slower speed, it may be desirable to reduce the speed of the vehicle system 4202. If the other vehicle system is behind the vehicle system 4202 and traveling at a greater speed, it may be desirable to increase the speed of the vehicle system 4202. Such a situation may also occur when the vehicle system 4202 is traveling at a speed that is greater than a designated speed limit. After notification, the operator may provide an input to the user interface of the vehicle system 4202. The input may include an instruction to modify (e.g., increase or decrease) the current speed of the vehicle system 4202. The instruction may also indicate a designated point (e.g., an approaching location) by which the modified speed must be achieved.

In some embodiments, the input request is detected automatically when the vehicle system actually deviates from the operating plan. For example, if the operator or the control system of the vehicle system 4202 provides an instruction that is inconsistent with the operating plan or if the operator or the control system controls the vehicle system 4202 in a manner that is inconsistent with the operating plan, the vehicle system

4202 may automatically generate the transition plan and the prospective plan(s). Controlling the vehicle system 4202 in an "inconsistent manner" may include applying a brake effort or tractive effort when the currently-implemented operating plan did not have such an effort planned. Controlling the vehicle system 4202 in an inconsistent manner may also include the operator interrupting automatic control while the operating plan is being implemented to execute manual operations.

In other cases, the signaling system 4218 or the network system 4216 may communicate the input (e.g., instructions) to the vehicle system 4202. For instance, the signaling system 4218 or the network system 4216 may determine that the vehicle system 4202 should change routes and/or speed and communicate with the control system of the vehicle system 4202 such instructions. In other embodiments, the vehicle system 4202 may provide the input itself. For example, after receiving and calculating updated route or traffic information, the planning module of the vehicle system may determine that the vehicle system 4202 should turn onto the segment 4210 or reduce the speed while remaining on the same segment 4209. Accordingly, the vehicle system 4202 may receive an input from an individual or a remote system (e.g., the signaling system 4218 or the network system 4216) or the vehicle system 4202 may generate the input itself.

Accordingly, the method 4350 may include generating (at 4356) a transition plan 4270 in response to the input and generating (at 4358) a prospective plan 4272 in response to the input. The transition and prospective plans 4270, 4272 are operating plans that are applied to different portions or segments of the route. For example, the transition plan may designate one or more tractive or braking operations to be implemented by the vehicle system 4202 to achieve a designated operating parameter prior to the intersection 4212 or other location along the route. The prospective plan may designate one or more tractive or braking operations to be implemented by the vehicle system 4202 past the intersection 4212 (or the other location). In some embodiments, the prospective plan 4272 is generated as the transition plan 4270 is being generated and/or after the transition plan 4270 is generated. For example, the prospective plan 4272 may be generated at least partially concurrently with the transition plan 4270 or after the transition plan 4270 is generated.

The transition and prospective plans 4270, 4272 may be generated by a planning module as described above and be based on at least one of an operating characteristic or operating constraint and at least one of vehicle data, route data, or trip data. The transition and prospective plans may be based on at least one of (a) different factors (e.g., different operating parameters or constraints and/or different route or trip data); (b) a different number of factors; or (c) common factors, but the factors may be weighted differently.

As shown in FIG. 42, the transition and prospective plans 4270, 4272 correspond to different portions of the route. The transition plan 4270 begins at point G and extends to point H, which is located beyond the intersection 4212. The prospective plan 4272 may begin at a point I, which is approximately located at the intersection 4212, extend beyond point H to a point J. The transition plan 4270 may be shorter than the prospective plan 4272. By way of one specific example, the transition plan 4270 may correspond to about 5 to 7 miles (e.g., 8.0 to 11.3 kilometers) of railroad tracks, and the prospective plan 4272 may correspond to about 15 miles (e.g., 24.1 kilometers) of railroad track.

The transition and prospective plans 4270, 4272 may be configured for different purposes. For example, the transition plan may be configured to achieve a designated operating parameter prior to the intersection 4212 along the route. In the illustrated embodiment of FIG. 42, the designated operating parameter may be a crossover speed, which is a vehicle speed that allows the vehicle system 4202 to safely change paths at the intersection 4212. In particular, the transition plan 4270 may be configured to reduce the speed of the vehicle system 4202 so that the vehicle system 4202 can be safely guided by the turnout switch 4214 onto the segment 4210.

As described above with respect to the operating plans, the transition plan 4270 may be based on route data and vehicle data. For instance, the grade and curvature of the track between the points G and H may be considered in determining how to reduce the speed of the vehicle system 4202. Moreover, a total weight of the vehicle system may be considered. The transition plan may also be based on the type(s) of braking system(s) and effectiveness of the braking system(s) and whether the vehicle system 4202 is a distributed power system that is capable of operating in an asynchronous mode.

In some embodiments, the transition plan 4270 may be based on a route transition characteristic. The route transition characteristics are characteristics or factors that may be considered by the planning module in generating a plan to achieve the designated operating parameter prior to the approaching location (e.g., the intersection 4212). The route transition characteristic may be a characteristic that is based on the turnout switch 4214 (referred to as a switch characteristic). Switch characteristics can include, by way of example, the type of turnout switch (e.g., structure or mechanism of the turnout switch), a value of the diverging angle 4220, the age of the turnout switch 4214, and the like. Other route transition characteristics may be characteristics of the vehicle system 4202 that may be considered when changing paths (e.g., weight or type of the vehicle system 4202, number of units, direction of the vehicle system 4202 as the vehicle system 4202 approaches the turnout switch 4214). Other route transition characteristics may include weather conditions at the intersection 4212.

The transition plan 4270 may also be configured to reduce the vehicle speed in a safe manner so that the units of the vehicle system 4202 are not damaged or individuals harmed during the reduction in speed. More specifically, the planning module may consider a total weight of the vehicle system, individual weights of the units (e.g., rail cars and powered units), and a type(s) of mechanical couplers that join the individual units. Different mechanical couplers may be configured to withstand different levels of tensile force.

The prospective plan 4272 may be implemented after the transition plan 4270 has been implemented and/or after the designated operating parameter has been achieved. The prospective plan 4272 includes designated tractive and/or braking operations for the vehicle system 4202 after the approaching location (e.g., the intersection 4212). In the illustrated embodiment, the prospective plan 4272 corresponds to a portion of the route that begins at the intersection 4212 and extends therefrom. In other embodiments, the prospective plan 4272 may correspond to a location before the intersection 4212 and also correspond to a portion of the route that extends beyond the intersection 4212.

In particular embodiments, the prospective plan 4272 is generated with one or more operating characteristics or constraints being assigned a weight that is greater than the weight assigned to the one or more characteristics or constraints when the transition plan 4270 was generated. For instance, the prospective plan 4272 may be configured to reduce fuel usage and/or emissions generated by the vehicle system 4202 while satisfying other conditions (e.g., arrival time at the next scheduled stop). The transition plan 4270, however, may not be configured to reduce fuel usage and/or emission generation. Instead, the transition plan 4270 may include braking operations that reduce the speed of the vehicle system 4202 to the designated amount as quickly as possible while satisfying other conditions (e.g., without damaging the vehicle system 4202 or any cargo on the vehicle system 4202). In such embodiments, the vehicle system 4202 may achieve the designated speed a substantial distance before the turnout switch 4214. For example, if the vehicle system 4202 was 42000 feet (or 915 meters) from the turnout switch 4214 when the transition plan 4270 is initially implemented, the vehicle system 4202 may achieve the designated speed 40000 feet (or 457 meters) from the turnout switch 4214 instead of, for instance, achieving the designated speed immediately before or just at the turnout switch 4214. In other embodiments, the transition plan 4270 is configured so that the vehicle system 4202 achieves the designated speed immediately before or just at the turnout switch 4214.

In some embodiments, the transition plan 4270 may be generated using fewer computing resources than involved or used during generation of the prospective plan 4272. The transition plan 4270 may be generated in less time than the prospective plan 4272. For example, the planning module may generate the transition plan 4270 in approximately 5 seconds and generate the prospective plan 4270 in 45 seconds to a minute. More specifically, the transition plan 4270 may have fewer factors and/or number of calculations such that generating the transition plan 4270 may take less time than generating the prospective plan 4272. For example, the transition plan 4270 may correspond to a shorter distance along the route and, as such, fewer changes in track dimensions may be considered. The transition plan 4270 may also sacrifice fuel efficiency in order to achieve the designated vehicle speed more quickly.

By way of example, when a planned deviation from an operating plan is received (e.g., in the form of an instruction) and/or a deviation occurs or is performed, one or more embodiments described herein may relatively quickly generate a transition plan in order to get the vehicle system "back on track" to following the operating plan, or at least to another operating plan that also reduces fuel consumption and/or emissions generation. The transition plan may not be as efficient in terms of reducing fuel consumption and/or emissions generation, but can cause the vehicle system to move to a location in an amount of time that allows the vehicle system to follow a prospective plan. The prospective plan can allow the vehicle system to continue to travel over a longer distance (e.g., the remainder of the trip) while reducing fuel consumed and/or emissions generated. The transition plan may be considered as a relatively "quick fix" to a deviation from a previous operating plan so that the vehicle system can return to a prospective plan, which may be considered as a modified operating plan for at least a portion or the entirety of the remainder of the trip.

As described above, the transition plan 4270 may be triggered by a deviation in vehicle speed alone without diverging or changing routes. Under such circumstances, because the vehicle system is not changing routes, the planning module may also consider speed limits that exist beyond the approaching location by which the vehicle system must have the speed reduced. The planning module may analyze the route for any speed limits that are even less than the requested speed reduction. For instance, the planning module may examine the currently-implemented plan (or route data) to identify any speed restrictions that occur soon after the approaching location. By way of one specific example, the vehicle system may be instructed to reduce the vehicle speed to 40 mph by 42000 feet from the current location of the vehicle system. However, because the deviation does not include changing routes, the planning module may examine the currently-implemented operating plan (or route data) to identify any speed limits within a designated distance after the approaching location (e.g., after 42000 feet from the current location). For example, the planning module may analyze the currently-implemented operating plan to identify speed limits 5000 feet beyond the 42000 feet instruction. If the planning module identifies a speed limit within this designated distance that is less than the requested speed reduction (e.g., less than 40 mph), the planning module may generate a transition plan that reduces the speed further than instructed. For example, if the speed limit identified after the approaching location is 20 mph, the transition plan may reduce the vehicle speed to 20 mph.

The planning module and the vehicle control module may be configured to implement the operating plan, the transition plan 4270, and the prospective plan 4272 so that the vehicle system 4202 transitions continuously from the operating plan to the transition plan 4270 and from the transition plan 4270 to the prospective plan 4272. For instance, the planning module may determine that an initial speed of the vehicle system 4202 at a beginning of the transition plan 4270 is substantially equal to the speed of the vehicle system 4202 immediately before the operating plan was interrupted and the transition plan 4270 was implemented. Also, an initial speed of the vehicle system 4202 at a beginning of the prospective plan 4272 may be substantially equal to a final speed of the vehicle system 4202 at an end of the transition plan 4270. In some embodiments, the initial speed of the vehicle system 4202 at a beginning of the prospective plan 4272 is substantially equal to the speed of the vehicle system 4202 immediately before the transition plan 4270 was interrupted and the prospective plan 4272 was implemented.

In particular embodiments, the operating plan, the transition plan 4270, and the prospective plan 4272 are automatically executed by the vehicle control and planning modules of the control system. For example, after the input is provided to deviate from the operating plan, the vehicle system 4202 may not require or prompt the operator for additional information or instruction. Accordingly, automatic control of the vehicle system 4202 may be maintained throughout the track divergence even though the track divergence was not part of the original operating plan.

The method 4350 may also include generating (at 4360) another prospective plan 4274. The prospective plans 4272, 4274 may be referred to as first and second prospective plans. Like the prospective plan 4272, the prospective plan 4274 includes designated tractive and/or braking operations for the vehicle system 4202. However, the designated tractive and/or braking operations of the prospective plan 4274 may correspond to a portion of the route that extends beyond the point J. In some cases, the prospective plan 4274 may extend to the scheduled final destination of the trip plan.

The prospective plan 4274 is generated with one or more operating characteristics or constraints being assigned a weight that is greater than the weight assigned to the one or more characteristics or constraints when the transition plan 4270 was generated. Like the prospective plan 4272, the prospective plan 4274 may be configured to reduce fuel usage and/or emissions generation while satisfying other conditions (e.g., arrival time at the next scheduled stop).

In the illustrated embodiment, the transition plan 4270 and the prospective plans 4272, 4274 are configured to overlap each other. In some embodiments, a previous or prior operating plan may be configured so that the planning module has sufficient time to generate the subsequent operating plan. For example, because generation of the first prospective plan 4272 may require substantial computing resources and time, in some embodiments, the transition plan 4270 is configured so that a sufficient time exists for the planning module to generate the first prospective plan 4272. More specifically, the time used by the planning module to generate an operating plan may be referred to as the generation time. The generation time for operating plans may vary because the number of calculations for generating the plans may be based on a plurality of variables (e.g., length and topography of the route, turns along the route, regulations along the route, number of stops along the route, etc.). By way of example, the generation time for a relatively simple operating plan may be about 30 seconds, but a more complex operating plan may be about 5 minutes. Thus, the transition plan 4270 may be configured to be implemented for a designated time period and/or to a designated location along the route so that a sufficient amount of time exists for the first prospective plan 4272 to be generated. Depending upon the complexity of the first prospective plan 4272, the first prospective plan 4272 may be completely generated before the end of the transition plan 4270 with a larger amount of time remaining (if the first prospective plan 4272 is relatively simple) or with a smaller amount of time remaining (if the first prospective plan 4272 is relatively complex) in the transition plan 4270.

In some embodiments, the first prospective plan 4272 may be configured so that fewer calculations are used to generate the first prospective plan 4272. Such embodiments may facilitate completing the first prospective plan 4272 before the transition plan 4270 has been fully implemented. For example, the length of the route that the first prospective plan 4272 is based on may be limited so that the number of calculations for generating the first prospective plan 4272 may be reduced. Reducing the number of calculations for the first prospective plan 4272 may reduce the generation time of the first prospective plan 4272. In this manner, the first prospective plan 4272 may be generated before implementation of the transition plan 4270 has completed. By way of one example, the first prospective plan 4272 may only correspond to 10 to 15 miles (e.g., 16.1 to 24.1 kilometers) of the route.

Similar to the transition plan 4270, the first prospective plan 4272 may be configured so that the planning module has sufficient time to generate the second prospective plan 4274. Since the second prospective plan 4274 may correspond to a much greater distance than the first prospective plan 4272 (e.g., hundreds to thousands of miles or hundreds to thousands kilometers), the computing resources and/or time necessary to complete the generation of the second prospective plan 4274 may be even greater the computing resources and/or time that were used to generate the first prospective plan 4272. The first prospective plan 4272 may be configured to be implemented for a designated time period and/or to a designated location along the route so that a sufficient amount of time exists for the second prospective plan 4274 to be generated. Thus, in some embodiments, the generation time for the transition plan 4270 is less than the generation time for the first prospective plan 4272, which may be less than the generation time for the second prospective plan 4274.

When generating the first and second prospective plans 4272, 4274, the planning module may consider the previous operating plan to determine a location where the previous operating plan may be interrupted and replaced by the next operating plan. For example, while the transition plan 4270 is being implemented, the planning module may be generating the first prospective plan 4272. The planning module may analyze the transition plan 4270 and identify a point within the transition plan 4270 where the transition plan 4270 may be interrupted and replaced by the first prospective plan 4272. This point may be referred to as a plan interruption location. A plan interruption location may represent a location along a route being traveled by the vehicle system 4202 according to a first operating plan where the vehicle system 4202 may deviate from the operating plan. For example, a plan interruption location may represent an intersection or switch in the route or a location along the route where the vehicle system 4202 is at a modified speed. In FIG. 42, this location is at point I. Accordingly, at point I, the transition plan 4270 may be replaced by the first prospective plan. The first prospective plan 4272 may be characterized as being "stitched" onto the transition plan 4270. More specifically, the planning module may determine that an initial speed of the vehicle system 4202 at a beginning of the prospective plan 4272 may be substantially equal to a speed of the vehicle system 4202 at the point I. In a similar manner, the second prospective plan 4274 may replace the first prospective plan 4272.

After completing the transition plan 4270 and the first and second prospective plans 4272, 4274, in some embodiments, the vehicle system 4202 may store the "stitched" plans as a composite plan 4276. The composite plan 4276 may be communicated to the network system 4216. In some cases, the composite plan 4276 may then be recalled by the vehicle system 4202 (or other vehicle systems) if similar circumstances occur at a later time.

In one embodiment, a system is provided that includes a vehicle control module that is configured to control a vehicle system during a trip according to an operating plan. The operating plan designates one or more first tractive operations or braking operations to be implemented by the vehicle system along a route of the trip. The system also includes a planning module that is configured to generate a transition plan in response to a deviation of the vehicle system from the operating plan. The deviation may be, for example, a change in route or a change in speed (e.g., a designated increase or decrease in speed) or an instruction to do the same. The transition plan designates one or more second tractive operations or braking operations to be implemented by the vehicle system to achieve a designated operating parameter prior to an approaching location along the route. The vehicle control module is configured to control operation of the vehicle system according to the transition plan as the vehicle system travels toward the approaching location from a location where the vehicle system deviates from the operating plan. The planning module is further configured to generate a prospective plan in response to the deviation. The prospective plan designates one or more third tractive operations or braking operations to be implemented by the vehicle system when the vehicle system at least one of moves past the approaching location or completes the transition plan.

With respect to the tractive operations and braking operations of the plans described herein, the terms first, second, and third are merely labels to distinguish the operations of one plan from operations of another plan, and are not meant to indicate a particular order or that the operations of a given plan are necessarily the same.

In one embodiment, a system is provided that includes a vehicle control module configured to control a vehicle system during a trip according to an operating plan. The operating plan designates one or more first tractive operations or braking operations to be implemented by the vehicle system along a route of the trip. The system also includes a planning module that is configured to generate a transition plan in response to a deviation of the vehicle system from the operating plan. The transition plan designates one or more second tractive operations or braking operations to be implemented by the vehicle system as the vehicle system travels toward an approaching location from a second location where the vehicle system deviates from the operating plan. The planning module is further configured to generate a prospective plan in response to the deviation. The prospective plan designates one or more third tractive operations or braking operations to be implemented by the vehicle system when the vehicle system at least one of moves past the approaching location or completes the transition plan.

In one aspect, the transition plan may designate the one or more second tractive operations or braking operations to be implemented by the vehicle system to achieve a designated operating parameter prior to the approaching location along the route. The vehicle control module may be configured to control operation of the vehicle system according to the transition plan as the vehicle system travels toward the approaching location from the second location.

In one aspect, the planning module is configured to generate the transition plan in response to receiving an input request to deviate from the operating plan. For example, the input request may be received from on-board the vehicle system or from off-board the vehicle system. The deviation may be detected automatically when the vehicle system actually deviates from the operating plan. The input request may include an instruction to modify the route being traveled by the vehicle system by changing which route segments of the route are traveled by the vehicle system at an intersection at the approaching location.

In one aspect, the deviation includes an instruction to modify a current speed of the vehicle system to a different speed at or before the approaching location.

In another aspect, the planning module is configured to generate the prospective plan while the vehicle system is traveling according to the transition plan.

In another aspect, the designated operating parameter is vehicle speed.

In another aspect, the vehicle system transitions continuously from the operating plan to the transition plan and from the transition plan to the prospective plan. For instance, an initial speed of the vehicle system at a beginning of the prospective plan is substantially equal to a final speed of the vehicle system at an end of the transition plan.

In another aspect, the vehicle system is a rail vehicle system that includes at least one locomotive. The transition plan is based on a switch characteristic of a turnout switch that guides the rail vehicle system from a current track to a joining track. The switch characteristic includes at least one of (a) a diverging angle between the current and joining tracks or (b) a type of the turnout switch.

In another aspect, the planning module is configured, in at least one mode of operation, to analyze fewer factors while generating the transition plan than a number of factors analyzed while generating the prospective plan.

In another aspect, each of the operating and prospective plans is generated based on fuel usage. The transition plan may not be generated based on fuel usage.

In another aspect, the braking operations of the transition plan are configured to reduce a speed of the vehicle system to at least a designated amount before the approaching location.

In another aspect, the prospective plan controls the operation of the vehicle system for only a segment of the route. The vehicle control module is configured to receive another operating plan that controls the operation of the vehicle system for a remainder of the route. The remainder of the route being longer than the segment.

In another aspect, the vehicle control and planning modules are configured to be disposed on-board the vehicle system.

In one embodiment, a method is provided that includes controlling a vehicle system according to an operating plan. The operating plan designates one or more first tractive operations or braking operations to be implemented by the vehicle system along a route of a trip. The method also includes generating a transition plan in response to a deviation of the vehicle system from the operating plan. The transition plan designates one or more second tractive operations or braking operations to be implemented by the vehicle system to achieve a designated operating parameter prior to an approaching location along the route. The method also includes generating a prospective plan in response to the deviation from the operating plan. The prospective plan designates one or more third tractive operations or braking operations to be implemented by the vehicle system when the vehicle system at least one of moves past the approaching location or completes the transition plan.

In one embodiment, a method is provided that includes controlling a vehicle system according to an operating plan. The operating plan designates one or more first tractive operations or braking operations to be implemented by the vehicle system along a route of a trip. The method also includes generating a transition plan in response to a deviation of the vehicle system from the operating plan. The transition plan designates one or more second tractive operations or braking operations to be implemented by the vehicle system prior to an approaching location along the route. The method also includes generating a prospective plan in response to the deviation from the operating plan. The prospective plan designates one or more third tractive operations or braking operations to be implemented by the vehicle system when the vehicle system at least one of moves past the approaching location or completes the transition plan.

In one aspect, the one or more second tractive operations or braking operations of the transition plan are configured to achieve a designated operating parameter prior to the approaching location.

In another aspect, generating the transition plan is in response to receiving an input request to deviate from the operating plan. For example, the input request may be received from on-board the vehicle system or from off-board the vehicle system. The input request may be detected automatically when the vehicle system actually deviates from the operating plan. The input request may include an instruction to modify the route being traveled by the vehicle system by changing which route segments of the route are traveled by the vehicle system at an intersection.

In another aspect, generating the prospective plan at least partially occurs while the vehicle system is being controlled according to the transition plan.

In another aspect, generating the transition plan includes analyzing fewer factors than a number of factors analyzed for generating the prospective plan.

In another aspect, generating the prospective plan includes basing the prospective plan on fuel usage. The transition plan may not be based on fuel usage.

In another aspect, generating the transition plan uses fewer computing resources than generating the prospective plan.

In another aspect, the braking operations of the transition plan are configured to reduce a speed of the vehicle system to at least a designated amount before the approaching location.

In another aspect, generating the transition plan is executed by a processor disposed on-board the vehicle system.

In one embodiment, a tangible and non-transitory computer readable medium that includes one or more software modules is provided. The computer readable medium is configured to direct a processor to control a vehicle system according to an operating plan. The operating plan designates one or more first tractive operations or braking operations to be implemented by the vehicle system along a route of a trip. The computer readable medium is configured to direct the processor to generate a transition plan in response to a deviation of the vehicle system from the operating plan. The transition plan designates one or more second tractive operations or braking operations to be implemented by the vehicle system to achieve a designated operating parameter prior to an approaching location along the route. The computer readable medium is also configured to direct the processor to generate a prospective plan in response to the deviation from the operating plan. The prospective plan designates one or more third tractive operations or braking operations to be implemented by the vehicle system when the vehicle system at least one of moves past the approaching location or completes the transition plan.

In one embodiment, a tangible and non-transitory computer readable medium that includes one or more software modules is provided. The computer readable medium is configured to direct a processor to control a vehicle system according to an operating plan. The operating plan designates one or more first tractive operations or braking operations to be implemented by the vehicle system along a route of a trip. The computer readable medium is also configured to generate a transition plan in response to a deviation of the vehicle system from the operating plan. The transition plan designates one or more second tractive operations or braking operations to be implemented by the vehicle system prior to an approaching location along the route. The computer readable medium is also configured to generate a prospective plan in response to the deviation from the operating plan. The prospective plan designates one or more third tractive operations or braking operations to be implemented by the vehicle system when the vehicle system at least one of moves past the approaching location or completes the transition plan.

In one aspect, the one or more second tractive operations or braking operations of the transition plan are configured to achieve a designated operating parameter prior to the approaching location.

In another aspect, the processor is directed to execute the method operations described above.

In another embodiment, a system is provided that includes a vehicle control module that is configured to control a vehicle by implementing successive operating plans along a route of a trip. The operating plans may include an operating plan, a transition plan, and a prospective plan. The operating plan designates one or more first tractive or braking operations to be implemented by the vehicle until at least a remote point along a route of a trip. The transition plan is generated in response to an input that requests the vehicle to deviate from the operating plan. The transition plan designates one or more second tractive or braking operations to be implemented by the vehicle to achieve a designated operating parameter prior to a local point or location, such as an intersection, along the route. The prospective plan designates one or more third tractive or braking operations to be implemented by the vehicle past the local point along the route. In some embodiments, an additional prospective plan may be generated that follows the initial prospective plan.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

What is claimed is:

1. A method comprising:
   controlling a vehicle to travel along a route according to a trip plan that designates first operational settings of the vehicle as a function of one or more of time or distance along the route as the vehicle moves along the route;
   receiving plural requests to revise the trip plan as the vehicle moves along the route;
   classifying individual requests based on a determined necessity of the requests;
   determining a hierarchical order of the requests based on the determined necessity of the requests;
   revising the trip plan according to one or more of the requests based on the hierarchical order;
   comparing parameters of the requests that are received to identify a first optional request that corresponds to a first mandatory request;
   combining the first optional request and the first mandatory request into a combined request; and
   revising the first operational settings of the trip plan according to the combined request.

2. The method of claim 1, wherein at least two of the plural requests are not mutually exclusive, and wherein the trip plan is revised using the at least two of the plural requests that are not mutually exclusive.

3. The method of claim 1, wherein at least two of the plural requests are not mutually exclusive, whereby the revising the mission plan may be performed according to the at least some of the plural requests that are not mutually exclusive.

4. The method of claim 1, wherein revising the trip plan includes changing the operational settings designated by the trip plan such that an initial designated operational setting of the trip plan that is revised matches a current, actual operation of the vehicle.

5. The method of claim 4, wherein the current, actual operation of the vehicle differs from the trip plan during a time period that the initial designated operational setting of the revised trip plan is scheduled to be implemented by the vehicle.

6. The method of claim 1, wherein revising the trip plan includes designating second operational settings of the vehicle as a function of one or more of time or distance along the route, the second operational settings differing from the first operational settings, wherein the second operational settings include an initial designated operational setting that matches a current, actual operation of the vehicle at a time when the trip plan that is revised is implemented.

7. The method of claim 6, wherein the current, actual operation of the vehicle differs from the trip plan during a time period that the initial designated operational setting of the revised trip plan is scheduled to be implemented by the vehicle.

8. The method of claim 6, further comprising determining the current, actual operation of the vehicle system based on one or more models of the vehicle system.

9. The method of claim 1, wherein the vehicle is a rail vehicle.

10. A method comprising:
    controlling a vehicle to travel along a route according to a trip plan that designates first operational settings of the vehicle as a function of one or more of time or distance along the route as the vehicle moves along the route;
    receiving plural requests to revise the trip plan as the vehicle moves along the route;
    classifying individual requests based on a determined necessity of the requests;
    determining a hierarchical order of the requests based on the determined necessity of the requests;
    revising the trip plan according to one or more of the requests based on the hierarchical order; and
    operating the vehicle according to the operational settings designated by the trip plan that is revised, wherein operating the vehicle according to the trip plan that is revised causes the vehicle system to one or more of consume more fuel or generate increased emissions relative to the vehicle operating according to the operational settings designated by the trip plan prior to revising the trip plan, but also causes the vehicle to one or more of consume less fuel or generate fewer emissions relative to the vehicle returning to operating according to the operational settings designated by the trip plan prior to revising the trip plan.

11. The method of claim 10, wherein the vehicle is a rail vehicle.

12. A method comprising:
    controlling a vehicle to travel along a route according to a trip plan that designates first operational settings of the vehicle as a function of one or more of time or distance along the route as the vehicle moves along the route;
    receiving plural requests to revise the trip plan as the vehicle moves along the route;
    classifying individual requests based on a determined necessity of the requests;
    determining a hierarchical order of the requests based on the determined necessity of the requests; and
    revising the trip plan according to one or more of the requests based on the hierarchical order;
    wherein receiving the plural requests includes receiving plural different estimation re-plan requests, the estimation re-plan requests based on one or more differences between one or more expected values and one or more experienced values of a parameter used to previously generate the trip plan; and
    arbitrating between the estimation re-plan requests based on a state of the vehicle; and
    generating an arbitrated re-plan request based on arbitrating between the estimation re-plan requests, wherein the trip plan is revised according to the arbitrated re-plan request.

13. The method of claim 12, wherein the vehicle is a rail vehicle.

14. A method comprising:
controlling a vehicle to travel along a route according to a trip plan that designates first operational settings of the vehicle as a function of one or more of time or distance along the route as the vehicle moves along the route;
receiving plural requests to revise the trip plan as the vehicle moves along the route;
classifying individual requests based on a determined necessity of the requests;
determining a hierarchical order of the requests based on the determined necessity of the requests; and
revising the trip plan according to one or more of the requests based on the hierarchical order;
wherein revising the trip plan includes:
generating a transition plan that designates one or more second operational settings of the vehicle that differ from the first operational settings prior to an approaching location along the route, wherein the transition plan designates the second operational settings of the vehicle for a limited distance that is shorter than a remainder of a distance for which the trip plan was generated; and
generating a prospective plan that designates one or more third operational settings of the vehicle that differ from the first and second operational settings as a function of one or more of time or distance along the route as the vehicle system at least one of moves past the approaching location or completes the transition plan, wherein the prospective plan designates the one or more third operational settings at least until an end point of the distance for which the operating plan was generated.

15. The method of claim 14, wherein generating the prospective plan occurs and is completed while the vehicle is being controlled according to the transition plan.

16. The method of claim 14, wherein generating the prospective plan includes basing the prospective plan on fuel usage while the transition plan is not based on fuel usage.

17. The method of claim 14, further comprising receiving an input request as the deviation, the input request including an instruction to change the route being traveled by the vehicle in contradiction to the trip plan.

18. The method of claim 14, wherein the vehicle is a rail vehicle.

19. A method comprising:
controlling a vehicle to travel along a route according to a trip plan that designates first operational settings of the vehicle as a function of one or more of time or distance along the route as the vehicle moves along the route;
receiving plural requests to revise the trip plan as the vehicle moves along the route;
classifying individual requests based on a determined necessity of the requests;
determining a hierarchical order of the requests based on the determined necessity of the requests;
revising the trip plan according to one or more of the requests based on the hierarchical order, wherein revising the trip plan includes designating second operational settings of the vehicle as a function of one or more of time or distance along the route, the second operational settings differing from the first operational settings, wherein the second operational settings include an initial designated operational setting that matches a current, actual operation of the vehicle at a time when the trip plan that is revised is implemented; and
operating the vehicle according to the second operational settings designated by the trip plan that is revised, wherein operating the vehicle according to the trip plan that is revised causes the vehicle to one or more of consume more fuel or generate increased emissions relative to the vehicle operating according to the first operational settings designated by the trip plan prior to revising the trip plan, but also causes the vehicle to one or more of consume less fuel or generate fewer emissions relative to the vehicle returning to operating according to the first operational settings designated by the trip plan prior to revising the trip plan.

20. The method of claim 19, wherein the vehicle is a rail vehicle.

21. A system comprising one or more processors configured to: determine signals for controlling a vehicle to travel along a route according to a trip plan that designates first operational settings of the vehicle as a function of one or more of time or distance along the route as the vehicle moves along the route, receive plural requests to revise the trip plan as the vehicle moves along the route, classify individual requests based on a determined necessity of the requests, determine a hierarchical order of the requests based on the determined necessity of the requests, revise the trip plan according to one or more of the requests based on the hierarchical order, compare parameters of the requests that are received to identify a first optional request that corresponds to a first mandatory request, combine the first optional request and the first mandatory request into a combined request, and revise the first operational settings of the trip plan according to the combined request.

22. The system of claim 21, wherein at least two of the plural requests are not mutually exclusive, and wherein the one or more processors are configured to revise the trip plan using the at least two of the plural requests that are not mutually exclusive.

23. The system of claim 21, the vehicle is a rail vehicle.

* * * * *